(12) United States Patent
Jakobsson

(10) Patent No.: US 10,936,749 B2
(45) Date of Patent: Mar. 2, 2021

(54) PRIVACY ENHANCEMENT USING DERIVED DATA DISCLOSURE

(71) Applicant: Amber Solutions, Inc., Dublin, CA (US)

(72) Inventor: Bjorn Markus Jakobsson, Portola Valley, CA (US)

(73) Assignee: Amber Solutions, Inc., Dublin, CA (US)

( * ) Notice: Subject to any disclaimer, the term of this patent is extended or adjusted under 35 U.S.C. 154(b) by 0 days.

(21) Appl. No.: 16/774,832

(22) Filed: Jan. 28, 2020

(65) Prior Publication Data

US 2020/0159960 A1    May 21, 2020

Related U.S. Application Data

(63) Continuation-in-part of application No. 16/585,438, filed on Sep. 27, 2019.
(Continued)

(51) Int. Cl.
*G06F 21/00* (2013.01)
*G06F 21/62* (2013.01)
*G06F 3/0481* (2013.01)

(52) U.S. Cl.
CPC ...... *G06F 21/6245* (2013.01); *G06F 3/04817* (2013.01)

(58) Field of Classification Search
CPC ............ H04L 12/2829; H04L 12/2812; H04L 12/2838; G08B 19/00; G08B 21/0211; G06F 21/6245; G06F 3/04817
See application file for complete search history.

(56) References Cited

U.S. PATENT DOCUMENTS 6,160,689 A    12/2000  Stolzenberg
6,756,998 B1    6/2004  Bilger
(Continued)

FOREIGN PATENT DOCUMENTS

WO    2016010529 A1    1/2016
WO    2017196572 A1    11/2017
(Continued)

OTHER PUBLICATIONS

F. Stajano et al., "The Resurrecting Duckling: Security Issues for Ad-hoc Wireless Networks," International Workshop on Security Protocols, 1999, 11 pages.
(Continued)

*Primary Examiner* — Ojiako K Nwugo
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device is configured to determine a representation characterizing data from one or more sensor devices of at least one sensor network, to determine a privacy impact indicator for the data, to provide the representation and its associated privacy impact indicator for presentation in a user interface of a user device, and to control access to information relating to at least portions of the data by one or more third party service providers based at least in part on user permission feedback relating to the representation and its associated privacy impact indicator as presented in the user interface of the user device. Other illustrative embodiments include methods and computer program products.

20 Claims, 17 Drawing Sheets

Related U.S. Application Data

(60) Provisional application No. 62/797,550, filed on Jan. 28, 2019, provisional application No. 62/737,448, filed on Sep. 27, 2018.

(56) References Cited

U.S. PATENT DOCUMENTS

| | | | |
|---|---|---|---|
| 7,610,616 | B2 | 10/2009 | Masuouka et al. |
| 9,990,786 | B1 | 6/2018 | Ziraknejad |
| 10,469,077 | B2 | 11/2019 | Telefus et al. |
| 2007/0143826 | A1 | 6/2007 | Sastry et al. |
| 2009/0203355 | A1 | 8/2009 | Clark |
| 2010/0145479 | A1 | 6/2010 | Griffiths |
| 2013/0174211 | A1* | 7/2013 | Aad .............. G06F 21/604 726/1 |
| 2013/0300534 | A1 | 11/2013 | Myllymaki |
| 2014/0096272 | A1 | 4/2014 | Makofsky et al. |
| 2014/0246926 | A1 | 9/2014 | Cruz et al. |
| 2014/0266698 | A1 | 9/2014 | Hall et al. |
| 2015/0154404 | A1* | 6/2015 | Patel .............. H05B 47/18 726/26 |
| 2015/0282223 | A1 | 10/2015 | Wang et al. |
| 2015/0309521 | A1 | 10/2015 | Pan |
| 2015/0355649 | A1 | 12/2015 | Ovadia |
| 2015/0362927 | A1 | 12/2015 | Giorgi |
| 2016/0018800 | A1 | 1/2016 | Gettings et al. |
| 2016/0035159 | A1 | 2/2016 | Ganapathy Achari et al. |
| 2016/0110154 | A1 | 4/2016 | Qureshi et al. |
| 2016/0374134 | A1 | 12/2016 | Kweon et al. |
| 2017/0026194 | A1 | 1/2017 | Vijayrao et al. |
| 2017/0033942 | A1 | 2/2017 | Koeninger |
| 2017/0099647 | A1 | 4/2017 | Shah et al. |
| 2017/0171802 | A1 | 6/2017 | Hou et al. |
| 2017/0195130 | A1 | 7/2017 | Landow et al. |
| 2017/0212653 | A1 | 7/2017 | Kanojia et al. |
| 2017/0230193 | A1 | 8/2017 | Apte et al. |
| 2017/0366950 | A1 | 12/2017 | Abron |
| 2018/0061158 | A1 | 3/2018 | Greene |
| 2018/0174076 | A1 | 6/2018 | Fukami |
| 2018/0196094 | A1 | 7/2018 | Fishburn et al. |
| 2018/0301006 | A1 | 10/2018 | Flint et al. |
| 2018/0342329 | A1 | 11/2018 | Rufo et al. |
| 2018/0359039 | A1 | 12/2018 | Daoura et al. |
| 2018/0359223 | A1 | 12/2018 | Maier et al. |
| 2019/0028869 | A1 | 1/2019 | Kaliner |
| 2019/0036928 | A1 | 1/2019 | Meriac et al. |
| 2019/0050903 | A1 | 2/2019 | DeWitt et al. |
| 2019/0068716 | A1 | 2/2019 | Lauer |
| 2019/0086979 | A1 | 3/2019 | Kao et al. |
| 2019/0104138 | A1 | 4/2019 | Storms et al. |
| 2019/0165691 | A1 | 5/2019 | Telefus et al. |
| 2019/0207375 | A1 | 7/2019 | Telefus et al. |
| 2019/0238060 | A1 | 8/2019 | Telefus et al. |
| 2019/0245457 | A1 | 8/2019 | Telefus et al. |
| 2019/0253243 | A1 | 8/2019 | Zimmerman et al. |
| 2019/0268176 | A1 | 8/2019 | Pognant |
| 2019/0280887 | A1 | 9/2019 | Telefus et al. |
| 2019/0306953 | A1 | 10/2019 | Joyce et al. |
| 2019/0334999 | A1 | 10/2019 | Ryhorchuk et al. |
| 2019/0355014 | A1 | 11/2019 | Gerber |
| 2020/0014301 | A1 | 1/2020 | Telefus |
| 2020/0014379 | A1 | 1/2020 | Telefus |

FOREIGN PATENT DOCUMENTS

| | | |
|---|---|---|
| WO | 2017196649 A1 | 11/2017 |
| WO | 2018075726 A1 | 4/2018 |
| WO | 2018080614 A1 | 5/2018 |
| WO | 2018081619 A2 | 5/2018 |
| WO | 2019133110 A1 | 4/2019 |

OTHER PUBLICATIONS

L. Sweeney, "Simple Demographics Often Identify People Uniquely," Carnegie Mellon University, Data Privacy Working Paper 3, 2000, 34 pages.

A. Narayanan et al., "Robust De-Anonymization of Large Sparse Datasets," IEEE Symposium on Security and Privacy, May 2008, 15 pages.

M. Alahmad et al., "Non-Intrusive Electrical Load Monitoring and Profiling Methods for Applications in Energy Management Systems," IEEE Long Island Systems, Applications and Technology Conference, 2011, 7 pages.

U.S. Appl. No. 16/149,094 filed in the name of Mark Telefus on Oct. 1, 2018, and entitled "Circuit Interrupter with Optical Connection."

U.S. Appl. No. 16/527,826 filed in the name of Bjorn Markus Jakobsson on Jul. 31, 2019, and entitled "Managing Access Rights of Transferable Sensor Systems."

U.S. Appl. No. 16/589,999 filed in the name of Mark Telefus on Oct. 1, 2019, and entitled "Solid-State Circuit Interrupters."

U.S. Appl. No. 16/598,614 filed in the name of Bjorn Markus Jakobsson et al. on Oct. 10, 2019, and entitled "Configuration and Management of Smart Nodes with Limited User Interfaces."

U.S. Appl. No. 16/676,978 filed in the name of Bjorn Markus Jakobsson on Nov. 7, 2019, and entitled "Third Party Application Enablement for Node Networks Deployed in Residential and Commercial Settings."

U.S. Appl. No. 16/682,627 filed in the name of Bjorn Markus Jakobsson et al. on Nov. 13, 2019, and entitled "Managing Power for Residentail and Commercial Networks."

U.S. Appl. No. 16/718,157 filed in the name of Mark D. Telefus et al. on Dec. 17, 2019, and entitled "AC-Driven Light-Emitting Diode Systems."

U.S. Appl. No. 16/720,446 filed in the name of Mark Telefus et al. on Dec. 19, 2019, and entitled "Intelligent Circuit Breakers."

U.S. Appl. No. 16/720,485 filed in the name of Mark Telefus et al. on Dec. 19, 2019, and entitled "Intelligent Circuit Breakers with Air-Gap and Solid-State Switches."

U.S. Appl. No. 16/720,506 filed in the name of Mark Telefus et al. on Dec. 19, 2019, and entitled "Intelligent Circuit Breakers with Solid-State Bidirectional Switches."

U.S. Appl. No. 16/720,533 filed in the name of Mark Telefus et al. on Dec. 19, 2019, and entitled "Intelligent Circuit Breakers with Detection Circuitry Configured to Detect Fault Conditions."

U.S. Appl. No. 16/720,583 filed in the name of Mark Telefus et al. on Dec. 19, 2019, and entitled "Intelligent Circuit Breakers with Visual Indicators to Provide Operational Status."

U.S. Appl. No. 62/811,240 filed in the name of Bjorn Markus Jakobsson on Feb. 27, 2019, and entitled "Methods and Apparatus for Device Location Services."

U.S. Appl. No. 62/846,109 filed in the name of Bjorn Markus Jakobsson on May 10, 2019, and entitled "Privacy Control and Enhancements for Distributed Networks."

U.S. Appl. No. 62/892,883 filed in the name of Bjorn Markus Jakobsson et al.on Aug. 28, 2019, and entitled "Privacy and the Management of Permissions."

U.S. Appl. No. 62/900,951 filed in the name of Bjorn Markus Jakobsson et al. on Sep. 16, 2019, and entitled "Performance, Privacy and Permissions."

U.S. Appl. No. 62/963,230 filed in the name of Bjorn Markus Jakobsson on Jan. 20, 2020, and entitled "Infrastructure Support to Enhance Resource-Constrained Device Capabilites."

U.S. Appl. No. 62/964,078 filed in the name of Mark Telefus et al. on Jan. 21, 2020, and entitled "Intelligent Power Receptacle with Arc Fault Circuit Interruption."

* cited by examiner

PRIVACY ENHANCEMENT USING DERIVED DATA DISCLOSURE

RELATED APPLICATIONS

The present application is a continuation-in-part of U.S. patent application Ser. No. 16/585,438, filed Sep. 27, 2019 and entitled "Methods and Apparatus for Determining Preferences and Events and Generating Associated Outreach Therefrom," which claims priority to U.S. Provisional Patent Application Ser. No. 62/737,448, filed Sep. 27, 2018 and also entitled "Methods and Apparatus for Determining Preferences and Events and Generating Associated Outreach Therefrom," both of which are incorporated by reference herein in their entirety. The present application also claims priority to U.S. Provisional Patent Application Ser. No. 62/797,550, filed Jan. 28, 2019 and entitled "Privacy Enhancement Using Derived Data Disclosure," which is incorporated by reference herein in its entirety.

FIELD

The field relates generally to information processing systems, and more particularly to systems that process sensor data.

BACKGROUND

Traditional sensor-based systems, such as alarm systems, are not intelligent and require the triggering of sensors connected to a controller that generates alarms in response. Although various types of artificial intelligence (AI) using inputs from sensors are also known in the art, a need remains for accurate and efficient techniques that can provide deeper analysis, without requiring vast amounts of tagged data. For example, it would be highly desirable to have techniques that can both provide an understanding of an observed space as well as react to the derived understanding in a manner that provides optimal benefit to users, which includes ensuring that users are provided with expected levels of privacy relating to sensor data.

SUMMARY

Illustrative embodiments provide techniques for privacy enhancement using derived data disclosure. Some of these embodiments further involve determining preferences and events and generating associated outreach therefrom. Such outreach illustratively comprises various types of automated actions that are performed based at least in part on predicates each computed using data generated by multiple sensor devices.

In one embodiment, an apparatus comprises at least one processing device comprising a processor coupled to a memory. The processing device is configured to determine a representation characterizing data from one or more sensor devices of at least one sensor network, to determine a privacy impact indicator for the data, to provide the representation and its associated privacy impact indicator for presentation in a user interface of a user device, and to control access to information relating to at least portions of the data by one or more third party service providers based at least in part on user permission feedback relating to the representation and its associated privacy impact indicator as presented in the user interface of the user device. The "information relating to at least portions of the data" in some embodiments illustratively comprises predicates computed from at least portions of the data, results of functions applied to at least portions of the data, and/or at least portions of the data itself. Such related information as the term is used herein is therefore intended to be broadly construed.

The processing device in some embodiments implements at least one node of a plurality of interconnected nodes coupled to at least one of the one or more sensor networks. Additionally or alternatively, the processing device can implement at least one pre-processor coupled between at least one of the one or more sensor networks and one or more servers of the one or more third party service providers. Numerous other arrangements of one or more processing devices associated with one or more sensor networks, possibly involving nodes of one or more node networks, are possible in other embodiments.

In some embodiments, determining a representation characterizing data from one or more sensor devices of at least one sensor network comprises receiving data generated by one or more of the sensor devices, computing one or more predicates based at least in part on the received data, and determining the representation based at least in part on the one or more computed predicates. For example, computing one or more predicates illustratively comprises computing at least one first-order predicate comprising information indicative of at least one of presence, layout and activity within an area that includes at least a subset of the sensor devices of said at least one sensor network. Computing one or more predicates in some embodiments further comprises computing at least one second-order predicate based at least in part on at least one of the one or more first-order predicates.

The representation can comprise, for example, information specifying a particular visual icon for presentation in the user interface of the user device wherein the visual icon conveys information regarding a type of data from the one or more sensors without identifying the data itself. The representation can further comprise, also by way of example, a description of a service provided by a given one of the third party service providers, where the given third party service provider requires access to information relating to one or more particular portions of the data in order to provide the service.

In some embodiments, providing the representation and its associated privacy impact indicator for presentation in a user interface of a user device comprises transmitting to the user device information sufficient to allow the user device to obtain in a browser of the user interface at least one window that includes the representation and its associated privacy impact indicator. For example, providing the representation and privacy impact indicator in some embodiments involves sending a link to the user device, which allows the user device to retrieve a web page that includes the representation and privacy impact indicator. Alternatively, at least one of the representation and the privacy impact indicator may be sent directly to the user device. Numerous other arrangements are possible.

The privacy impact indicator may be configured to identify a particular level of privacy associated with the data, with the particular level being selected from a scale ranging from a relatively low level of privacy to a relatively high level of privacy.

In some embodiments, controlling access to information relating to at least portions of the data by one or more third party service providers based at least in part on user permission feedback comprises receiving data generated by one or more of the sensor devices, computing one or more predicates based at least in part on the received data, and providing a given one of the third party service providers with access to at least one of the one or more predicates in a manner consistent with the user permission feedback.

Additionally or alternatively, controlling access to information relating to at least portions of the data by one or more third party service providers based at least in part on user permission feedback comprises receiving data generated by one or more of the sensor devices, applying at least one function to the received data to generate derived data, and disclosing at least portions of the derived data to a given one of the third party service providers in a manner consistent with the user permission feedback.

Some embodiments disclosed herein implement methods to maintain user security and privacy, which are poised to be problems of increasing importance, particularly as people deploy increasing numbers of IoT devices in their home, where IoT denotes Internet of Things. The configuration, maintenance and use of such devices potentially pose risks to end users unless properly managed.

These and other illustrative embodiments include but are not limited to systems, methods, apparatus, and computer program products. The illustrative embodiments are advantageously configured to address and solve one or more significant problems of conventional approaches, as outlined in more detail elsewhere herein.

DETAILED DESCRIPTION

Figure 1:
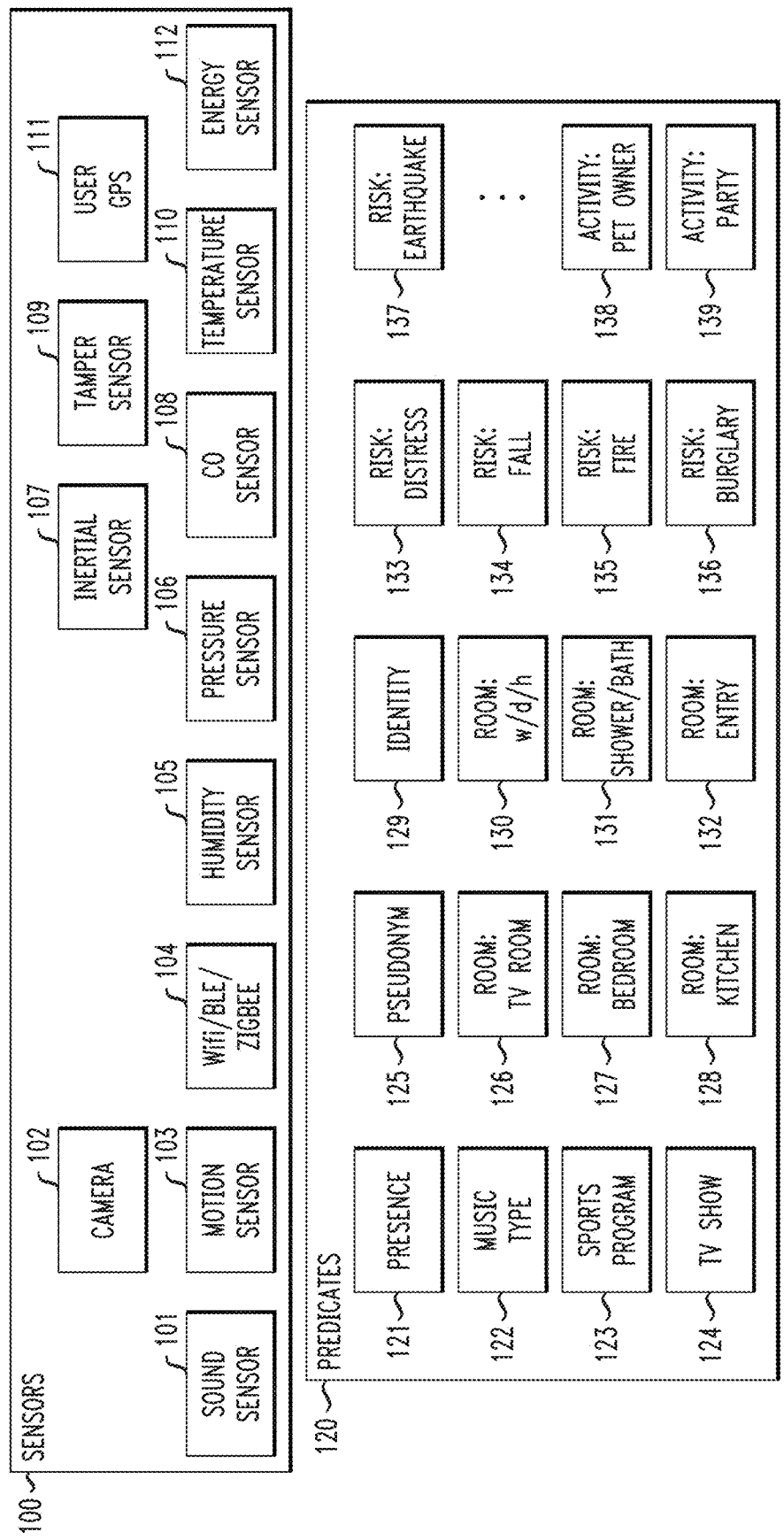
FIG. 1 is a block diagram of an information processing system comprising a set of sensors and a corresponding set of predicates that can be generated using outputs of the sensors in an illustrative embodiment.

Illustrative embodiments will be described herein with reference to exemplary information processing systems and associated computers, servers, storage devices and other processing devices. It is to be appreciated that the embodiments described below are presented by way of example only, and should not be construed as limiting in any way.

Some of these illustrative embodiments can make use of one or more of the techniques described in one or more of the following patent applications, each incorporated by reference herein in its entirety:

U.S. patent application Ser. No. 16/527,826, filed Jul. 31, 2019 and entitled "Managing Access Rights of Transferable Sensor Systems,"

U.S. patent application Ser. No. 16/598,614, filed Oct. 10, 2019 and entitled "Configuration and Management of Smart Nodes with Limited User Interfaces,"

U.S. patent application Ser. No. 16/676,978, filed Nov. 7, 2019 and entitled "Third Party Application Enablement for Node Networks Deployed in Residential and Commercial Settings,"

U.S. patent application Ser. No. 16/682,627, filed Nov. 13, 2018 and entitled "Managing Power for Residential and Commercial Networks,"

U.S. Provisional Patent Application Ser. No. 62/811,240, filed Feb. 27, 2019 and entitled "Methods and Apparatus for Device Location Services,"

U.S. Provisional Patent Application Ser. No. 62/846,109, filed May 10, 2019 and entitled "Privacy Control and Enhancements for Distributed Networks," U.S. Provisional Patent Application Ser. No. 62/892,883, filed Aug. 28, 2019 and entitled "Privacy and the Management of Permissions," and U.S. Provisional Patent Application Ser. No. 62/900,951, filed Sep. 16, 2019 and entitled "Performance, Privacy and Permissions."

The example embodiments described herein are for purposes of illustration only. Numerous other arrangements and associated operating scenarios are possible in other embodiments.

The disclosed technology in some embodiments addresses several long-felt needs in the context of the rapidly developing area of home and office automation. One of these aspects include methods addressing how to automatically extract valuable information regarding preferences, events, layout, space use, and the like, without the need for massive quantities of tagged data. Another relates to how to selectively share data with both trusted and untrusted service providers with the goal of enhancing the user value of system ownership, defraying the cost of services, customize content and services, and providing numerous other desirable features. A third aspect relates to security and privacy aspects related to the processing, communication and sharing of data, a core aspect of which is an abstraction of sensitive user data to create anonymized predicates related to the preferences and needs of users, as well as to events related to the system.

In one embodiment, a likely location of a user is determined by computing a presence predicate relative to one or more nodes in a network, where sensor data from one or more nodes is processed and a node is selected in a manner that maximizes the probability that an observed event, observed using the sensors of one or more nodes, is best observed at the node for which the presence is determined. Here, "best" may correspond to the strongest signal, the signal with the least attenuation, a signal corresponding to multiple correlated sensor values that are strongly correlated and for which the signal is strong, or related techniques. In addition, triangulation techniques can be used to determine relative position and movement.

The system illustratively establishes a physical layout of the network of nodes based on multiple presence determinations over time, e.g., a determination of the sequence of selections of one node being the one with the greatest likely proximity to a given observed person. This does not have to be the same person, as the system can determine, using statistical methods, that two nodes are co-located due to them often being selected in temporal series as the most likely location of a user.

Given a network map corresponding to the layout of a space, established in this way, the system also can determine with high precision the location of a user as he or she moves through the space by looking at historical or common movements, and observing a series of presence determinations, in addition to using the outputs of the sensor of the nodes in the network. This increases the accuracy of the determination, and allows predictive capabilities that are useful to proactively respond to likely events, e.g., lighting a path ahead of a person walking through a building, but only lighting areas where the user is, has just been, or is likely to go next. The same predictive provision can also be made to audio content, allowing the user to experience a speaker phone that follows him or her around as he or she moves through an apartment or office, as well as other features based on predictive establishment of location. This is useful both for convenience and for security, where first-responders such as law-enforcement and firemen can benefit from the use of the security features.

Although the location in some embodiments can be computed by either a third party service provider or the system, it may be beneficial for the location to be computed by the system, which then shares the corresponding predicate with the service provider (assuming the user has granted permission to that) since that illustratively reduces the amount of information that has to be disclosed to the third party service provider, and provides or enables other benefits as described in this disclosure.

A user pseudonym can be generated using two types of inputs: a presence assertion, as established above, and an observation, illustratively an event that is associated with one user. Here, one such event is the transmission of a media access control (MAC) address or other hardware identifier, or use of a session key or other software identifier, by a mobile user, where the observation is made using a node equipped with a radio unit, which is an example of what is more generally referred to herein as a "radio sensor."

This observation can be made independently of whether the node is actively engaged in the transmission or only is a passive recipient. Note that radio signals will be strongest in close proximity to a node (and its associated sensors), and especially so if the power of the radio is very limited. This way, the system correlates location assertions (which may be made in a probabilistic manner with multiple rather likely options being output along with their assessed probabilities) and radio proximity locations. This correlation can also use triangulation, and will benefit from the map of network nodes described above. When there is a strong correlation between the location as asserted by the proximity predicate and the observation using the radio of a sensor, then the MAC address or other identifier is associated with the person whose location was assessed to correspond to the location of the presence assertion.

Multiple identifiers can be assigned with one and the same user, as illustrated in FIG. 1. Multiple users may use one device as well. The pseudonyms generated in this way, which may be simple local identifiers associated with MAC addresses and other identifiers, correspond to tagged data. This tagged data can be used to train machine learning (ML) components that take other sensor data such as sound and motion data, and correlates the user pseudonyms with such data in order to generate a classifier that, given the sensor data such as sound and motion alone, and without any MAC address or other signal received by a radio unit, assigns a set of sensor observations to a pseudonym.

Having profiles associated with pseudonyms permits the system to personalize the treatment of users, which has both convenience benefits and security benefits. These benefits will be further detailed below. A pseudonym can be an identifier, such as a MAC address, or a locally unique value that is associated, in a database, with one or more identifiers, such as MAC addresses. A user can be given multiple pseudonyms, where these pseudonyms may either correspond to the likely user or the likely device. The system can detect that one identifier is used by multiple users, possibly using Global Positioning System (GPS) data to disambiguate the users. For example, knowing that user A is in Chicago based on user A's phone being there, and noticing that user A's iPad is used in user A's home, in the living room, the system knows that somebody else uses user A's iPad. If the use of it is also associated with user B's phone, location-wise, then the system associates user A's iPad with both user A and user B. The system can determine which user it is based on additional sensor data, such as GPS data, distinguishing sound data, data that the system obtains from accessing the user's calendars and email, and other types of data. This enables the system to identify common use, for purposes of convenience, configuration, but also, for enhanced security, where the latter is enabled by detecting anomalies.

In the context of privacy, the sharing of pseudonyms is beneficial in comparison to the sharing of the underlying data that is required to compute the pseudonym predicate. This is generally in accordance with the same principles as for other predicates. However, in the context of pseudonyms, there are further advantages of sharing of predicates. For example, different service providers can be given different pseudonyms for one and the same user, the pseudonyms can be session based (where a session may be a period of presence, a day, or any selected period of time), and/or one pseudonym can correspond to multiple devices of the same believed end user. Pseudonyms can therefore provide additional privacy advantages in illustrative embodiments, as will be understood by a person skilled in the art.

The disclosed system introduces privacy-protecting methods to classify sound content, thereby identifying user preferences. The system distinguishes, for example, the sound profiles of different sports and different music genres from each other, and is configured to store information deduced about these predicates; however, the system illustratively does not store sound recordings, and therefore actively ignores conversations in the observed space, except for voice input that is determined to correspond to voice commands to the system. These are illustratively placed in the context of the observed events. For example, it is important for the classification of an observed sound sample that is "help help help" to know (a) whether this is being said in the context of a higher-than-normal risk for distress; in the context of a known movie that contains this voice segment; or in the context of apparent children's laughter. Thus, the system identifies and classifies contexts, events and situations, and use these classifications to perform actions while minimizing the risk for false positives and false negatives.

The disclosed system is further configured to detect the location of and operation of various appliances, such as washer, dryer, water heater, HVAC (heating, ventilation and air conditioning) appliances, refrigerator, oven, microwave, dishwasher, fans, etc.; and to identify rooms based on the use of identified appliances in these rooms. If the system identifies that an appliance has a change in its usage profile, e.g., generates a sound that was previously not observed; consumes energy in a manner that was not previously observed, and the like, then this is indicative of a risk of malfunction. In addition, if the sensor outputs associated with such appliances are indicative of a known type of malfunction, then this comprises an estimate of a classification of a potential need for maintenance, a potential risk, a potential need for the replacement of the appliance, and/or the need for a user action.

Such information is very important to derive and act on, and accordingly, the system determines events that are likely to match such situations or needs, based on the sensor output profiles observed by the system. These profiles can be in the time range, for example, as in a typical reporting of sensor output values, or in the frequency range, for example, as in the reporting of a Fast Fourier Transform (FFT). The use of correlation between outputs is useful whether the values being processed are in the time or frequency range. Correlation between multiple types of sensor outputs is beneficial to obtain derived sensor profile data taking multiple dimensions of sensor data into consideration.

The benefits of the disclosed technology for explaining data disclosure needs, request permissions, and grant permissions are readily appreciated in this context, as these associated predicates are much less intrusive in terms of the privacy impact than the associated raw data, but also much easier to conceptualize for an end user asked if he or she wishes to grant access to the information. When it comes to static classifications, or mostly static classifications, such as "this is a TV room," or "this is a room with a laundry machine," the benefits are also particularly evident, as the disclosure of information occurs only once (assuming no change of classification), and no further sharing of associated data is required once that has been done.

Other risks, such as earthquakes are also detected by the disclosed system, along with associated responses to minimize the risk of such events, and methods to streamline and aid the work of emergency responders. A person skilled in the art will recognize that the disclosed methods are only exemplary, and that they are used to illustrate the operation of the system and the benefits of the system.

The earthquake detector can use inputs from multiple homes in a related geographic area, and, as such, be used as part of an early prediction system. There are many benefits with such systems, including being able to automatically shut off gas, automatically secure elevators, and more; and even just a notice of a fraction of a second can save lives and property. However, the accurate detection of earthquakes illustratively takes into account many sensor data types, from many nodes within many homes, businesses and other installations. Therefore, the theoretical privacy impact is significant in the context of a traditional approach wherein a data consumer receives all data necessary for the computation from the multiple data sources and makes the assessment. Unless this data consumer is trusted by all parties involved, this will not be acceptable.

Accordingly, illustrative embodiments may be configured, for example, to compute, by one or more collaborating systems, a set of predicates indicative of earthquake movement, and to transmit such predicates to a third party in charge of making rapid classifications and issuing alerts, thereby providing significant privacy benefits. This is a good example of a situation where privacy concerns, should traditional approaches be used instead of the disclosed technology, could block the widespread participation by end users, and therefore significantly limit the accuracy and, as a result, benefits of the detection system. Thus, the disclosed system directly improves privacy, but also indirectly improves the safety of users.

The system in some embodiments is configured to convey predicates selectively to trusted third parties, such as one or more advertisers or advertisement providers, and is also configured to enable the outreach to individual third party service providers, e.g., for purposes of predictive maintenance. We disclose methods to make such connections in a way that is compatible with the existing advertisement infrastructure, which is famously demanding in terms of the time constraints it poses on its components in terms of enabling rapid auctions of advertisements based on known criteria and user profiles.

In one embodiment, this is achieved by establishing a connection between a user device and an advertisers or advertisement provider, and to either piggyback or separately convey profile data such as classifications of user actions, needs, spaces, and the like, to the advertiser or advertisement provider. This enables the integration of physical systems such as smart homes and smart offices into the traditional advertisement infrastructure in a backwards compatible manner, and without re-architecting how existing systems operate. For purposes of predictive maintenance, this can be offered to the user by notifications and discount coupons tied to third party trusted service providers, where such third party trusted service providers are billed as they connect to the service provider to obtain details related to the needs of the user. Such needs identify the believed source of the problem, the type of equipment, when known, and what parts may be needed based on such analysis. In addition, the third party trusted service provider is given access to location information and contact information of the user, which the user consents to being provided by enabling the received coupon or other offer.

These are new structures enabling substantial economic benefits for all parties involved, and significant improvements in the precision with which assessments can be made, translating into savings in time and convenience for those involved. In the case of the predictive maintenance scenario, it is also enabling a tight-knit reputation system leveraged by a feedback channel from the user and a measurement-based feedback channel from the sensors associated with the nodes associated with the predictive maintenance or other system modifications, as applicable. Namely, the service provider can determine when the representative of the third party service provider started making modifications; when the modifications concluded; and that the installation resulted in a non-anomalous operational profile. If defective parts were mistakenly or backhandedly used, the service provider would in many instances be able to detect this based on the energy consumption profiles observed in context of the expected profiles.

Thus, third party service providers that do not provide quality service can be excluded by the service provider, or given lower priority, lower pay for the negotiated service, or other discouraging mechanisms for enforcing desirable behavior; analogously, highly dependable and reliable third party service providers can be given priority, bonuses, or other encouragements. This weeding of third party service providers produces an improved service provision to the end user. As will be understood by a person skilled in the art, these are just exemplary embodiments of which there are a large number of variations of related benefit. More generally, commercial offers, including advertisements are illustratively generated in response to detected needs, which comprise needs for maintenance, needs for products, needs for service as well as other needs identified based on the determined example predicates, as will be understood by a person skilled in the art.

A user can choose between two or more versions of an application, e.g., a paid application version (costing, say, $10 a month or a flat fee of $25, etc.) and an advertisement-supported version. The latter may correspond to additional permission requests, e.g., to obtain access to data classifying interests, obtain demographic information, etc. The requests can be presented as a main set of requests corresponding to the common aspect of the two versions and then an optional aspect corresponding to the advertisement version. Alternatively, two separate application descriptions with their corresponding permissions can be presented.

In addition to using heuristic methods for classification, the system illustratively also uses ML models, which are illustratively bootstrapped by training them on the output from heuristic models. These heuristic models for classification can be used to generate predicates. This is another benefit of the disclosed approach, as it increases the convergence speed of the ML model while minimizing the amount of externally provided tagged data and the quantities of sensor data that is needed for the ML model to become accurate.

The predicates that are output from the above-noted ML models can be given practical descriptions that correspond to their conceptual meaning, making it easy for end users to understand the meaning of these predicates, in spite of it most likely not being easy to understand the manner in which the predicates were derived. Thus, as ML and other artificial intelligence becomes more prevalent, the disclosed technology helps protect privacy by creating conceptually comprehensible quantities from raw data, and by pegging permissions and controls to these quantities.

The disclosed system operates well in isolation, as described above and in the details provided with the figures, but does also benefit from interaction with components that are not part of the sensor networks, but which can be accessed using an application programming interface (API) or other feed. For example, knowledge of the GPS location of a registered user is beneficial for predicting when that user will return home (or arrive in the office, for a space corresponding to an office as opposed to a home). This can be obtained using an API to a service provider that reads GPS location, such as some search engines do for example, as well as directly from the user's cellular phone, on which the user has an application ("app") that can be used to control the space and to query the space about environmental data.

Moreover, the system can also integrate with cleaning robots, such as Roomba™ units, many of which provide layout information as a service. However, even without the active participation of the cleaning robot, the system can infer the layout of the space and the location and shape of obstacles. That is because typical cleaning robots have wireless capabilities, and therefore, can be detected and identified based on their MAC address or other hardware identifier. This detection is illustratively made by multiple nodes equipped with radio units, thereby allowing these to collectively triangulate the location of the cleaning robot with frequent intervals, simply based on signal strength of the observed cleaning robot radio as observed by one or more nodes equipped with a radio unit. The corresponding outputs of processing of this type can be in the form of raw data, or illustratively, predicates that correspond to conceptual quantities.

In one embodiment, at least some nodes comprise an IR transmitter compatible with typical consumer electronics (TVs, stereos, DVD players, etc.), just like universal remote controls, and are used to control associated equipment. In one embodiment, a user indicates in a portal associated with the service provision that a new piece of equipment has been plugged in, along with its position and an identification of its type (such as "Samsung TV, 55-inch flat screen" or "Philips DVD player"). The backend service consults a database to determine the encoding of signals for the corresponding device, and then provisions associated user apps on phones, tablets and similar devices to enable the operation of the introduced equipment.

The location can be determined by the user turning on the equipment in response to a challenge from the system, resulting in a detectable change in the energy consumption or load on the corresponding outlet, assuming the equipment is plugged in to a smart outlet supported by the backend. Alternatively, the user indicates the location of the new equipment from a pull-down list of locations, each location which corresponds to a system identified room; or indicates a location by making a loud noise in the room, or by otherwise responding to a challenge by the system that results in the detection of an action by the user. One such action is to hold up the user's phone or tablet to an outlet or switch or other type of node in the proximity of the installed equipment. Another alternative is that the system cycles through all possible power-on sequences for the IR transmitters in the space associated by the system, and determines from the power consumption, load determination, or sound output from the equipment when the new equipment has been turned on. This is illustratively not done in a way that activates already introduced equipment.

These processes, and variants of these, are used to establish a node in the proximity of the new equipment, and the encoding to be used to control the new equipment, thereby enabling the remote control, using a software remote control in the form of an app, to be used to control the equipment. This can be combined with parental control techniques to limit screen time, whether on an equipment basis, location basis, depending on the individual app or device used to control the equipment, or other techniques.

It can also be used for automated control of equipment, e.g., for using a stereo system as an alarm clock, but without the stereo system having to be able to determine the time. This can be done from a central location of control to which the user establishes and enables the alarm. A person skilled in the art will recognize that this approach can be used for a large array of consumer equipment that is controllable by remote controls, including audio equipment, TVs, recorders, disc players, free-standing and built-in fans, heaters and air conditioners, smart locks, pet doors, pet feeding systems, plant watering systems, and so on.

An important enhancement associated with the disclosed technology is the simple process of introduction of the equipment into the system, requiring a minimum of effort and knowledge; another is the enhanced functionality and control made possible by the connection of the disclosed system to compatible units that can be remote controlled. The latter enables the node network and the associated control structure to advance the benefits of the users greatly while maintaining simplicity, controlling cost, and maintaining centralized management that simplifies security and privacy in an array of ways.

Users would not grant access to control all devices corresponding to an installation, but would instead selectively grant access to the control. Thus, capabilities for control of equipment that are not part of the network can be granted, where this equipment instead is connectable to by the nodes of networks corresponding to the system.

The disclosed techniques can be used to gain information about users that is both privacy sensitive and much more insightful than current methods. For example, the system can determine the presence of one or more users in a TV room, and can determine the programming; then infer the time of the commercial, if applicable; and determine the user actions during the commercial. Did one or more users leave the room at the time of the commercial? Was it to get a snack (go to the kitchen), go to the bathroom, etc.? To the extent that the identity of one or more users leaving the room can be determined, what are their known genders and ages, based on demographic information collected, MAC address and other device identifiers? Was the volume turned off? Based on the sound associated with the programming, and based on the sound in the TV room, was there conversation? Was that timed towards the end of the commercial? Was there laughter? These are important types of insights that can be gained, and in terms of statistics, shared with advertisers, TV networks, and others.

Similarly, it is of relevance to know, both for programming and commercial segments, the information relating to the people in the TV room. Based on motion sensor data and traces from presence data, how many users are present? Based on MAC addresses and other device identifiers, what are the pseudonyms and/or identities of these? Based on collected demographic information and information obtained from user behavior, what are the demographics of these users, and what are their previously observed preferences and behavior? This is valuable to know to determine what programming is appreciated for various users, both on an individual basis in order to determine user preferences and improve recommendations, and in terms of statistical determinations. The disclosed system enables these and other related queries to be answered, based on the disclosed stricture, as will be appreciated by a person skilled in the art.

Using the disclosed permissions-based system, predicates corresponding to the events can be used to improve functionality, while protecting the privacy of the underlying user data. This results in a better system, whether it provides, for example, more relevant advertisements selected based on the context and presence, or otherwise better responds to the situational needs determined from the context.

One benefit of the disclosed technology is how it can inform first responder decisions. Examples of such decisions include firemen prioritizing rescues, police rapidly confronting gunmen, and helping search-and-rescue teams find earthquake survivors trapped in the rubble of collapsed buildings. For all of these, an automated and immediate understanding of the likely location of people is significant; for a case involving active shooters, it is also vital to know the location of offenders as opposed to potential victims. This can be achieved by detection of gunshots and an immediate tracking of the associated location of all people in the presence of the detected shootings, and, as previously explained, while also protecting raw data and the associated user privacy, thereby aligning needs with understandable permission requests.

It may be impossible to eliminate active-shooter situations; but it is possible to provide real-time insights to the professionals that jump into active-shooter situations. An important goal of the system in the present embodiment is to aid the responders and help protect lives. The combination of discretely-placed IoT devices, gunshot audio detection, and cloud-based analysis, control, and notifications enables the following benefits during active-shooter situations:

1. Real-time gunshot detection
2. Real-time gunshot location identification and tracking
3. Estimation of number of active shooters
4. Identification and communication of shelter-in-place warnings
5. Enable identification and communication of areas for safe and urgent evacuation
6. Identification and communication of ideal evacuation routes
7. Remote and secure electrical power control of buildings, circuits, lighting, and individual plugs
8. Estimation of number and types of gunshots for medical first-responders
9. Assistance and testing during active-shooter trainings The disclosed system may be deployed within the confines of the existing building electrical system. There is no need to deploy a stand-alone, expensive, and difficult to conceal shooter detection system. Identification and location of gunshots is primarily made through audio detection with fixed-location devices; though this technology is greatly aided with the addition of multiple types of sensors. Algorithms which process a sensor signal automatically predict future sensor states and perform alerts and notification through software and/or other functionally equivalent firmware, hardware, or electronics, for processing data and digitally performing tasks. Notifications and predictions are enabled through smart computing such as artificial, deep learning, forward chaining, inductive reasoning, and machine learning.

This smart computing accesses past data, such as a device configuration and associated data over time, and analyzes that data with software, such as an algorithm, to identify patterns. For example, the described system, when installed pervasively, and paired with active-shooter training scenarios will intelligently improve its performance over time. While much less common, this same technology can be utilized to detect explosions. The disclosed system enables advanced sensing, communication, and control through outlets and wall switches, and enables a low-cost and discreet gunshot detection system that, when paired with advanced cloud-based functionality, provides valuable insight and control to teachers, students, administrators, and first responders during chaotic active shooter situations. The system, fully integrated into a building's existing infrastructure, is also capable of monitoring environmental conditions, energy usage, movement, and other human behaviors.

First responder services and insights include but are not limited to:
1. Real-time gunshot location identification and tracking
2. Estimation of number of active shooters
3. Identification and communication of shelter-in-place warnings
4. Enable identification and communication of areas for safe and urgent evacuation
5. Identification and communication of ideal evacuation routes
6. Remote, secure, and arc-free electrical power control of buildings, circuits, lighting, and individual plugs
7. Estimation of number and types of gunshots for medical first-responders
8. Assistance and testing during active-shooter trainings
9. Automatic generation of structure interior map
10. Dog presence alert
11. Number of souls in structure
12. Automatic remote door lock/unlock
13. Car running in garage
14. Whole structure lighting control The disclosed system processes often sensitive sensor data and generates from it user predicates, most of which are not sensitive and which therefore can be shared with third party service providers such as home security companies, contractors performing predictive maintenance, advertisers interested both in understanding individual users better for reasons of improved product suggestions, and in gaining a better understanding of users as a collective. The latter is enabled by deep insights into the causes and effects related to user observations; how users respond to advertisements and product placements; what motivates end users; and numerous other insights. The disclosed predicates rely on heuristics, which means that they do not depend on large-scale deployments or tagged data.

From these first-level predicates, more complex predicates matching user personalities can be generated. For example, knowing how individual users spend their day at home in the context of their location, actions, search queries, web-site visits, TV shows watched, eating habits, entertainment preferences, as well as their responses to commercials, news and other content, allows unprecedented insights into what motivates people. This will, in turn, improve the provision of services to these users, as well as to others, based on correlation of behaviors and an improved consumer understanding.

This functionality could not have been provided using traditional technology, as existing methods fail to safeguard user privacy and the computation corresponding to most functionalities require either access to large quantities of low-level data (which would be used, at the cost of privacy, in traditional systems) or predicates and an associated permissions-based system, as described in this disclosure.

The disclosed system determines the use of various spaces based on identified use, detected temperature, pressure, humidity, associated energy consumption, and possibly additional or alternative information. This enables the automated distinction of a bedroom from a TV room, for example. It can also be used to identify a space as a basement, attic, garage or an outdoor area. For example, an attic may be very warm in the summer. The direct benefits of installing an attic fan can be computed based on temperature swings of a detected attic space and the associated heating of interior rooms, compared to detected or reported outdoor temperatures, and a resident can be presented with offers for purchase and installation of attic fans, where such offers could potentially be subsidized by electricity service providers wishing to curb mid-day electricity consumption, or simply acting as an aggregator of offers to reach scale. Detecting temperatures in a garden is helpful to determine what plants may be most suitable, to augment national weather forecast data by a dramatic expansion of the number of sensors. Temperature and humidity measurements can be used to identify high fire risk zones.

By limiting the privacy impact of data sharing by use of predicates instead of raw data sharing, and by making both the quantities and the permission requests comprehensible, the end user is able to become responsible for his or her own privacy, being able to make informed decisions that are later policed by way of granting (or not granting) selective access to predicates and capabilities. Accordingly, such techniques will not only help improve privacy, but will also enable the comfortable sharing of data and the creation of new services that would not have been possible without the disclosed system, as end users would not have felt comfortable with the potential risks posed to their privacy. The current system limits the required trust of users to the system coordinating their data collection (referred to herein as "the system"). By the introduction of oversight (e.g., auditing by third parties into the data sharing) and privacy scoring (e.g., by ombudsmen determining the impact of sharing select predicates), as well as making privacy a quantity that third party companies can compete in terms of, the system improves privacy in fundamental ways.

The disclosed system further detects a running engine, whether by sound or by carbon monoxide detection, and automatically opens garage doors or starts exhaust fans. The disclosed system further determines the need for a new muffler or other car repair based on garage-centric sound profiles. It determines what a garage is likely used for, e.g., storing cars, motorcycles, or neither, based on sound profiles. The system further determines that a room is likely a garage based on temperature swings and the sound of garage door openers, and offers to connect the garage opener to user-controlled apps, using IR transmitters in outlets or switches to communicate with the garage door opener.

This, again, can be done using the computation of predicates, which serve as building blocks of functionality, and which will spur innovation and development by enabling third parties to provide services. Some of the generation of predicates will be managed by the system, and others by third party vendors that, illustratively, are operating on a platform controlled by the system; some of the predicates may be available for free to vendors, whereas other predicates may require subscriptions, licenses, or payment per unit of information. As functionality is exposed to third parties, this will lead to growth of services, and as data is monetized, end users will benefit from the onslaught of services driven by the opportunity.

The heuristic techniques work as a rule-based system, where the computation of predicates is based on sensor output, user registration data, already computed predicates, the time of the day, and profile data determined for the user(s) associated with the sensors of a space. For example, when determining the location of a user present in the space. A collection of nodes report measurements to a backend or other data collector. This is either raw sensor data or functions of such data, where the functions are locally computed at nodes or aggregators associated with the network. In our example, several nodes detect a sound, but three of them detect the sound much stronger than the others. Two of the nodes in the network detect a motion that is correlated with the sound, and two other nodes detect motions that are not correlated with the sound. Among the two nodes that detected the correlated motion, the one with the strongest sound signal is selected as being most strongly associated with the location of the present user, and that node is output as corresponding to the location of the presence of the user.

In a network where relative location of nodes has been established, e.g., from series of measurements as the above, a collection of sensor measurements are used to triangulate the location of the user, based on a selection of a small set of the nodes having been selected as being close to the user. If there are several users that are active in a space, the above algorithm generates multiple locations based on correlations between sounds and motion data. Other sensor data can also be used, e.g., an inertial sensor can be used to detect vibration associated with a person walking, and correlated with sound data. In another example, sound data is available, but no motion sensor data. This still enables the system to determine a likely location of a user, by correlating detected sounds with each other and identifying the location of the strongest signal or the signal with the greatest correlation with the others.

Correlation is illustratively performed both in the temporal and frequency spectrum, just as for other embodiments. The node with the strongest signal or correlation is selected as the location of the user. The system can also detect location by identifying mobile hardware, such as phones, based on changing location (in terms of node identity) of the signal strength associated with the mobile hardware, as identified, for example, by determining what node has the greatest signal strength for the reception of radio signal, wherein a pseudonym is extracted from the radio signal or two different radio signals are distinguished from each other based on the different signals they correspond to. The node with the strongest radio signal is selected as the location of the user corresponding to the mobile hardware.

In some embodiments, the system integrates multiple location determinations such as the ones described here and selects a location using a voting strategy, where each node that "wins" one of the described "competitions" receives one vote and the node with the maximum number of votes is selected as the location of the user. A more advanced version of this algorithm assigns three votes to the winner, two votes to the runner-up node, and one vote for the node with the third-highest value of the location assertion, whether based on the signal strength of one type of sensor or multiple types. The node with the largest number of votes wins. This is illustratively performed for each detected signal. For example, if there are two users in a space, and both emit sounds, make moves, interact with radios using hardware they transport, and exhibit other similar behaviors, then the signal collections are clustered based on the correlation of the inputs, after which the above determinations are made for each one of the clusters.

In addition to determining the approximate location of a user, a pseudonym is illustratively computed for each user. The pseudonym can be short-lived, and simply used to correlate one location detection to one that is made right afterwards. Such a pseudonym can be determined based on the FFT of the sound data detected, for example. This allows the system to "follow" a user as she moves around in the space, determining a series of locations. This is helpful to determine what the user is doing, whether the user is stressed, and how the locations are related to each other, among other things.

A better and more long-lived pseudonym is one that is based on a MAC address or other hardware identifier, or a session identifier associated with a WiFi connection or a software identifier based on the profile of the data being communicated using the detected device; for example, this profile can be used to distinguish watching a movie or listening to streamed music from being on a phone call or simply walking around without actively transmitting data, the only signals corresponding to automated maintenance connections between the mobile hardware and the system. In addition, the system uses available DNS data to determine sessions and to identify likely activities. To the extent that search data is available in an unencrypted format, e.g., in the URLs being requested, such data is also used both to identify sessions and to determine preferences, interests and activities.

All these kinds of data can be made available in the form of predicates. A predicate, in other words, is a type of data that could be a raw data type, but in almost all instances, is a derived data type, generated by combining two or more types of data (including predicates), and/or by aggregating data from one or more data sources, by applying a function, such as FFT, to one or more data sources, or a combination of such methods.

Once a location (corresponding to the "presence" predicate) and a pseudonym are computed, these two predicates may be used to compute other predicates, along with raw sensor data. Many of these derived predicates use multiple previous predicates in the form of a history. For example, the determination of what is likely to be a bedroom is performed based on detecting a long-term presence with a very weak signal (not much movement, not much sound, and with periodic lack of signal), illustratively during the same time of the day (or night) for a series of days. For example, the system may determine that a user enters an area at 10:35 pm, and that a user, presumably the same user, exits the area at 6:00 am, and that there is intermittent minor movement and sound in between. On a second day, the system, may detect the arrival of a user at 10:25 pm and the departure of a user at 5:52 am, with a low-strength sensor signal associated with the space in between. After a few days of largely consistent determinations of this type, this area, defined as the space covered by a small set of nodes and associated sensors, is determined tentatively to be a bedroom. As more classifications that are consistent with this classification are made, the certainty of the classification improves. This can be expressed as a score, a probability, or as a variance computed from different individual observations.

The classifications can be made available as predicates. As part of predicates, there can be an aspect describing an estimate of the accuracy of the classification, such as the score, probability or variance. This applies to most types of classifications, and associated predicates.

The energy profile associated with an outlet is indicative of the use of the outlet. By computing FFTs of the energy consumption, the system distinguishes common appliances (such as refrigerator, microwave, hair dryer, and dishwasher) from each other, and associates these with the outlet used. This is done by comparing the computed FFTs to stored FFTs obtained from known appliances and stored in a database associated with the backend. This database illustratively contains FFT profiles associated with multiple brands and models, and also, FFT profiles associated with common types of malfunction or needs for repair. In addition to FFTs, the system also stores temporal data indicating the periodicity with which power is drawn, e.g., every 30 minutes (as might be typical of a compressor for one freezer, during a time the freezer door is not opened) or every morning around 7:00 am (as may be associated with a toaster, a hair dryer, or an on-demand water heater).

This profile data is used to determine the likely function of the area where the node is located (e.g., kitchen or bathroom); the likely type and model of the appliance; the likely state of the appliance, including being recently introduced in the system, having recently changed in terms of its power consumption profile; and other features and characteristics. This is illustratively correlated with the pseudonym of the user associated with the appliance, as applicable, generating one or more predicates accordingly.

The system determines preferences of users associated with a space by identifying sound signals, illustratively based on their FFTs, as being correlated with genres or individual content pieces. For example, the system identifies likely music based on the FFT spectrum associated with the detected sound matching a general music FFT profile. This will also overlap with the spectrum of many movies. However, temporal aspects can be used to distinguish the two. For example, music is commonly broken into series of a length of a few minutes, where two series are commonly separated by another FFT profile, such as that of conversation or one of relative silence. Music commonly also changes in terms of spectrum every few minutes. In contrast, a movie does not exhibit these temporal aspects, but commonly has other indicators. For example, comedies can be detected by the sound profile associated with laugh track.

A more fine-grained determination can be made as well, wherein the system distinguishes likely jazz music from likely rock, and distinguishes a sitcom from a tennis match, based on FFT comparisons with representative segments of content stored on the backend, and based on temporal determinations such as the periodicity of detected sounds (whether laughter; a tennis ball smack; a drum; etc.) Furthermore, the detection and classification of the sound is also done in the context of multiple nodes, enabling an improved determination of the layout of the space. Furthermore, as the system identifies the likely location of the sound source, this is used as input to the determination of the use of a space, e.g., a TV room is where TV sound is commonly heard. Since people may have a TV in other rooms as well, each room can have multiple classifications, e.g., a room may be both a bedroom and a TV room, or both a kitchen and music listening room.

The system correlates the energy consumption patterns with the use of a TVs, stereos, etc., in order to determine the location of the associated equipment. This is useful for control of the system. For example, when the system determines that nobody is at home, some appliances such as TVs may have their power supply reduced or turned off by the system in order to reduce the consumption of phantom power. However, the system would not turn off the power supply to a router, a refrigerator or a yet-unclassified appliance. This demonstrates another type of benefit associated with an automated determination of functionality, whether of appliances or areas of use. The determinations described above can be shared with third party service providers, assuming the data owner grants permission.

The determination of the type of room a node is associated with is helpful for the system to interpret sensor output associated with this space and initiate actions. For example, determining that a space is a garage simplifies the classification of observations made after that. The sound of a motorcycle in a garage, for example, suggests that the resident may have a motorcycle; the same sound in a TV room does not imply the same conclusion. Similarly, the sound of a broken muffler in a garage is a meaningful observation in the sense that it could lead to the generation of a coupon for a replacement muffler; the same sound in the kitchen does not have the same meaning. The sound of cries for help are important if the TV is not on, but should be ignored if the TV is on and the system identifies the movie as one in which somebody cries for help. The motion and inertial sensor output associated with a fall is much more likely to correspond to a fall if it is observed in a room that is identified as the shower room, bathroom, or stairway, and following the sound of water being used. In contrast, the sound of impact and inertial sensor output suggesting a correlated crash to the floor is likely to be less risk in a children's playroom, as it may simply correspond to a child jumping off a bed. The detection of correlated inertial sensor output for all sensors is likely to correspond to an earthquake, or possibly, an explosion; however, the localized detection of such output is likely to mean that something or somebody fell to the floor.

Observing series of detections helps disambiguate high-risk events from their potential false positives. For example, detecting a series of impacts in a playroom is much less indicative of the risk of a person falling that the detection of one such impact. Detecting loud voices or cries before a fall is much more likely to correspond to an altercation than a detected fall without loud voices or cries. Similarly, the same detection in the context of a space with only one detected user is almost certain not to correspond to an altercation. However, a risk of falling is much more significant for a space with only one apparent occupant than a space with multiple occupants, just like the risk of falling is not of great concern if it is followed by normal motion, such as walking around than if it is followed by a user being stationary or near-stationary. The detection of cries for help is more significant in context of higher risk. Thus, to suppress false positives, the system illustratively determines the degree of risk, based on heuristics such as these, when evaluating potential indicators of a user needing help, such as cries for help.

The use of predicates can be customized to conveying select events and signals, with the permission of end users. Anonymized data can also be shared based on granted permissions, as described in this disclosure.

The raw sensor data is typically sensitive from a privacy perspective. For example, moment-by-moment motion data may be uncomfortable for many people to share with non-trusted parties, as is sound data potentially revealing conversations. However, general needs such as a need for a new muffler; general preferences such as a preference for R&B over classical music and tennis over football; risks such as the risk of burglary; as well as locations such as a bedroom being adjacent to a study, are not very sensitive in terms of their privacy implications. At the same time, advertisers and service providers find these non-sensitive predicates much more valuable than the raw sensor signals, as the predicates correspond directly to needs and opportunities. For the same reason, users are more likely to be willing to share such data, as it helps them obtain benefits such as predictive maintenance, get discount coupons for events and products of relevance, and get help and protection when needed.

The disclosed system creates a platform for sharing of non-sensitive predicate data, and the protection of sensitive sensor data and user registration data. The system helps selectively share such predicate data in the same way that the current smart phone architecture invites app creators to access some device data while protecting other types of data, thereby enabling a new economy based on secure and privacy-respecting sharing of curated data. External service providers such as burglar alarm services benefit from this, as do service providers such as contractors performing maintenance, and landlords interested in making sure that their property is protected.

In one embodiment, sensor data is locally processed, e.g., one or more nodes comparing the sensor outputs they observe to determine the location of a user. In another embodiment, sensor data is centrally processed, e.g., all sensor data being transmitted to a cloud computing resource or centralized server. In a third embodiment, a combination is performed, e.g., local nodes determining what signals to transmit based on one or more criteria, and based on the phase of the system, where the system may transmit more data in a discovery or configuration phase than what it would in a later "usage" phase.

The central processing corresponds to at least one of a cloud computing environment managed by the system; one or more servers under control by the system; one or more servers associated with a third party service provider; or a combination of these. In addition to the processing of sensor data, other types of data can also be processed in these contexts. For example, data from a data source such as a social networking account or an email mailbox can be processed as described above, whether along with sensor node data or in a context that does not include sensor node data. The disclosure may refer to a specific data source, such as a microphone or other sensor associated with a node, to illustrate a principle and describe functionality that can be achieved using the described principles. However, although the functionality may be very different when applying the same or similar principles to other types of data, the underlying principles disclosed herein can be similarly applied and will have similar benefits for other types of data. For example, the principle of creating predicates and aligning permissions with these is not specific to the context of sensor data, as a person of skill in the art will readily recognize and appreciate; and the examples herein are not in any sense intended to limit the scope of the invention to the illustrative embodiments herein.

In some embodiments, at least a portion of the processing is performed locally, on the system, as opposed to on a backend. This is to ensure adequate performance of the system even in the case of degraded or disrupted Internet connection. In the case when determinations, classifications or generations of predicates, as described in this disclosure, are performed on a local system, it is beneficial to transmit the inputs (or a description of these) that caused a decision to be made, along with the decision or a description of this, to the backend, once this is possible. This enables an audit trail that is important in case of catastrophic situations and system failures, as well as the opportunity for the system to fine-tune the functionality and respond to end-user complaints relating to perceived failures. This is due to the fact that the situations can be re-enacted, simulated and analyzed on the backend.

Thus, such information is illustratively transmitted, to the extent it is possible, and stored in a log associated with the end-user system. To the extent that the processing leading to the determination is made by the backend in the first place, the saving of the relevant inputs and the resulting output or decision are likewise stored in the log. In both of these contexts, an input is considered relevant if it is commonly or always a factor associated with the decision of the associated type, is used as an input to the rule, or is otherwise associated with the decision.

The local processing may generate predicates that are transmitted to a central server corresponding to the system or a third party service provider, and may also be used locally, as part of computation that influences the state of the local system, whether with the participation of the central system, one or more third parties, a combination thereof, or without such participation.

Additional illustrative embodiments will now be described with reference to FIGS. 1 through 8.

FIG. 1 shows a collection of sensors 100 and a set of predicates 120 derived from at least some of the data provided by sensors of the collection of sensors 100. The collection of sensors 100 illustratively corresponds to one or more network nodes, which may comprise, for example, an outlet, a switch, a breaker, or an appliance such as a router, a smart appliance, a portable user device, etc. A given network comprising multiple such network nodes may correspond to multiple distinct collections of sensors from which data is being obtained and analyzed. The analysis can be performed, for example, on the individual node generating the data, on a node or other device that connects to one or more nodes that generate the data, or on a backend server that is connected to the network of nodes. The connections can be made at least in part using built-in radio units, such as a radio unit that is both a sensor in that it detects radio signals, and a communication port from one node to another, forming a local network that is connected using the Internet or other network to a backend server.

The collection of sensors 100 comprises one or more sensor units, where example sensor units include a sound sensor 101, a camera 102, a motion sensor 103, a radio unit 104 that may use WiFi, Bluetooth, Bluetooth low energy (BLE), near-field communication (NFC), ZigBee, and other types of radio; and which may comprise one or more of such units mounted on one or more separate boards associated with the collection of sensors 100. Additional sensors of the collection of sensors 100 comprise a humidity sensor 105, a pressure sensor 106, an inertial sensor 107, a carbon monoxide (CO) sensor 108, a tamper sensor 109 that detects that one or more of the sensors associated with the collection of sensors 100 is physically manipulated, or that the conveyance of the signals from the collection of sensors 100 is physically manipulated. The collection of sensors 100 further comprises a temperature sensor 110 and an energy sensor 112. The energy sensor 112 is configured to detect energy consumption or other types of energy use. Also included in the collection of sensors 100 is a user GPS sensor 111. Such a sensor is illustratively accessible via an API, and in some embodiments comprises a device that has GPS functionality and is associated with a user of the system. An example user GPS sensor 111 is the GPS unit of a handheld device such as a phone, which is accessed by the system via an API to access the location of the user. Although single instances of these and other sensors are shown in the collection of sensors 100, there can be multiple instances of one or more of the sensors, as well as multiple collections of different sensors, in other embodiments.

The various sensors illustrated in the collection of sensors 100 are examples of what are also referred to herein as "sensor devices." One or more of the different sensor types shown in the collection of sensors 100 can be configured to provide proximity information, and a given such sensor is an example of what is more generally referred to as a "proximity sensor." Other types of proximity sensors can be used in other embodiments. Some sensors disclosed herein are implemented as respective IoT devices.

It should be noted that the term "predicate" as used herein is intended to be broadly construed, so as to encompass, for example, various types of information in various formats, including those illustrated in the set of predicates 120 of FIG. 1, that are each computed using outputs from multiple sensors. A predicate in some embodiments therefore comprises, for example, information computed as a function of outputs of two different sensors of different types, such as a proximity sensor and a radio sensor.

One or more instances of a presence predicate 121, each also referred to as a presence 121, may be computed as a function of outputs from sound sensor 101, camera 102, motion sensor 103, as well as other sensors belonging to the collection of sensors 100. For example, if a first instance of sound sensor 101 registers a louder sound than a second instance of sound sensor 101 of the same network, such an event is likely to correspond to the sound source being closer to the installation of the node corresponding to the first instance of sound sensor 101 than to that of the second instance of sound sensor 101. At the same time, if motion sensor 103 or camera 102 associated with the same node as the first instance of sound sensor 101 registers the presence or change of location of an entity, this is likely to correspond to a user being in the proximity of the associated node. If there is no output from the sound sensor 101 instance of a first node but there is output from motion sensor 103 or changing output from camera 102 associated with the first node, then this is also indicative of the presence of a user.

In addition, other sensors can be used to improve the estimate corresponding to the presence 121 of a user, e.g., the inertial sensor 107 can be used to detect heavy footsteps; this is particularly useful if the output of the inertial sensor 107 is correlated with the outputs of sound sensor 101 or with motion sensor 103, etc. Thus, by detecting strong correlated signals from multiple sensors associated with a node, a presence predicate is determined, where the signals correspond to the arrival of a person close to the node of at least one sensor of the collection of sensors 100.

By keeping state of the location of the user, and determining what collection of sensors, at any point in time, registers the strongest confidence that a person is present, based on the strength of the signals and their match to the signal profiles typically corresponding to the arrival or presence of a person, the system can maintain an understanding of the presence of users even if they are still and silent, and potentially not visible to a camera. This is because the presence of the user will be detected as the user arrives, but there is no signal from the collection of sensors 100 of the associated node or another node that the user in question has moved away. Having access to serial presences, in terms of the nodes that register presence, of one or more users, the system establishes a physical layout of the network of nodes and their associated collection of sensors 100. This is illustrated in the example arrangement of FIGS. 2 and 3.

One or more instances of a pseudonym predicate 125, each also referred to as a pseudonym 125, may be derived from the MAC address of a device physically associated with a user, as determined by the presence predicate described above and the strength of the input to radio unit 104. A particular user may be associated with multiple MAC addresses. The system determines the common patterns of movement of devices, as represented by MAC addresses or other hardware identifiers, and associates MAC addresses that commonly travel together as being associated with the same user. Additionally, the pseudonym associated with this user, which comprises a locally unique identifier, is illustratively also associated with the types of devices that the MAC addresses correspond to, the nodes where this user is typically active, and potential activities, preferences and other determinations associated with this node and its surroundings.

When a previously unseen MAC address is detected by the system in the form of transmissions observable with an instance of radio unit 104 of any of the nodes in a network, a profile is illustratively created, and information associated with this user is stored. This is beneficial for purposes as distinct as enabling guests to get partial access to the network (such as remote control access to light switches in the room the guest is located, WiFi access, and access to functionalities such as voice-operated alarm clocks for the space the guest is associated with) and for detection of anomalies associated with burglary. In addition, the information can also be used as later evidence of a burglary.

Figure 2:
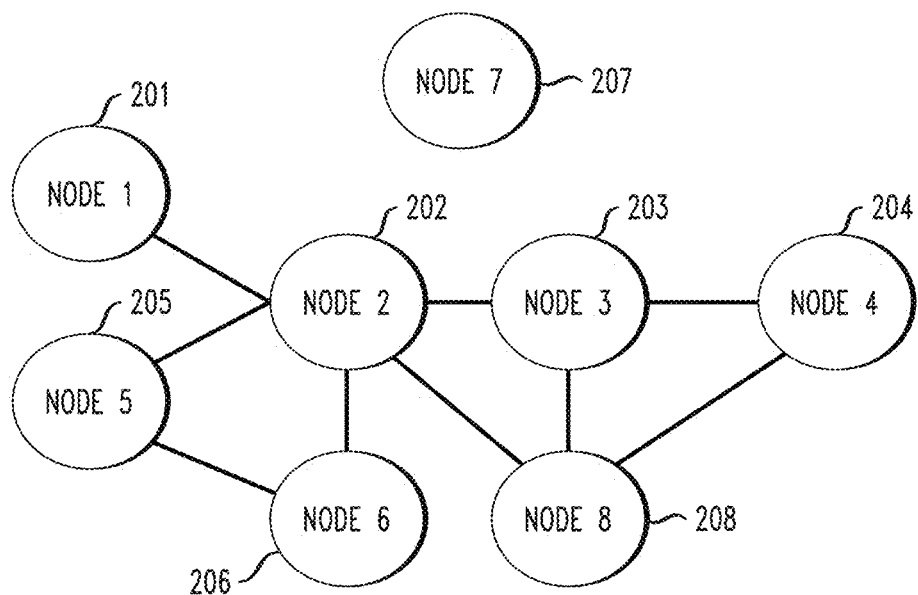
FIG. 2 shows a plurality of network nodes of an information processing system in an illustrative embodiment.
Figure 3:
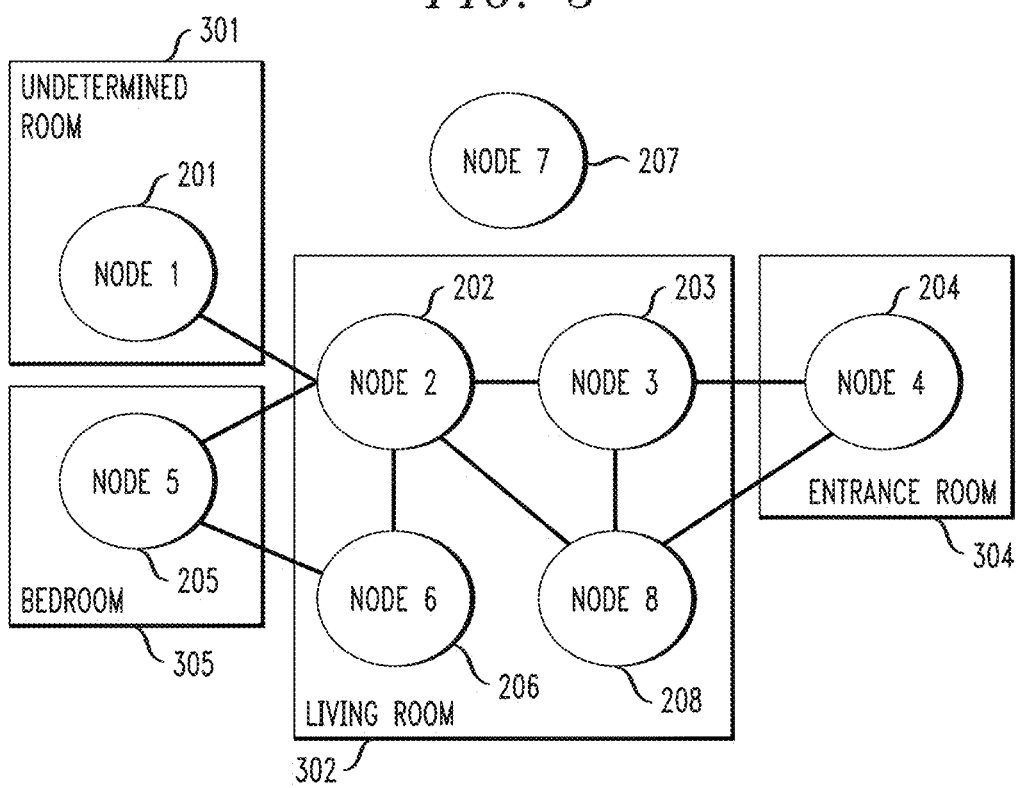
FIG. 3 illustrates association of the network nodes of FIG. 2 with particular rooms of a home in an illustrative embodiment.

The detection of a previously observed pseudonym (whether in the form of a MAC address or other associated indicator) is helpful for purposes of automated configuration and personalization, while the detection of a pseudonym that is not commonly seen in the network associated with its detection is an indication of a potential anomaly, and could be used for purposes of security as well as for audit purposes, where one audit purpose is the collection of evidence of an intrusion. If the tampering of a node is detected via an instance of tamper sensor 109, this is illustratively used along with the detected anomaly to generate alarms and produce information about the likely intruder. Intruders can be tracked throughout the space, according to an understanding of the layout of the space (as illustrated in FIGS. 2 and 3), and optionally, locks can be automatically engaged, lights turned on or off, legitimate residents alerted, police alerted, and warnings played on the audio system, including on speakers associated with the nodes, separate appliances, etc.

The system can assign a likely identity to a pseudonym by using identity data provided by a user during a setup session such as a time when the user installs a remote control app on his or her mobile device, requests WiFi access, during initial system setup or configuration, as well as other methods. During such sessions, and while accessing any portal associated with the system, the user typically would use a wireless device in range of one or more of the nodes, and therefore, the traffic and the MAC address would be associated with the identity information from the user, illustratively resulting in a record of a given instance of an identity predicate 129, also referred to herein as an identity 129. This record may also include or be associated with demographic data provided by the user.

The system illustratively detects the presence of one and the same user, as identified by her pseudonym and/or identity, over several networks. This enables cross-system customization opportunities, and provides the system with unique insights related to the relationships between different installations. As the system detects the presence of a user with a known pseudonym and/or identity, the system associates detected events, preferences and other predicates derived from the sensor inputs, with the pseudonym or identity, storing this information in a database that can be maintained locally and associated with the network of installed nodes or at a central location with a server that maintains multiple installations of networks of nodes.

The system can determine music type by comparing the sound spectrum to spectrums of different genres of music, e.g., by comparing FFTs or performing image recognition of FFT plots. The system can also maintain identifying segments or FFTs of a set of common songs and match the sound associated with a space with these identifiers. This enables the automated generation of a music type predicate 122. This determination will illustratively be done in the context of the determination of either pseudonym or identity, allowing the system to improve the automated selection of music, or of advertisements related to the musical preferences of the user, such as notifications or discount coupons associated with local performances, as well as other correlated preferences.

It is not always important for the system to determine that a person who is known to be currently present is also listening to the music, but close temporal association is sufficient. Therefore, if the system detects the likely presence of a user within a threshold amount of time, such as 10 minutes, and a musical event such as the detection of a particular genre, then the user pseudonym or identity, and the associated profiles, can be associated with the music type predicate 122. In the case where individual songs are detected, the system can go further than general genre detection, and also identify likely preferred artists, pieces, and the like. This is also information that will be stored with the music type profile of a user.

It is important to recognize that this approach is not invasive of a user's privacy: whereas the system will identify the sounds associated with a space, it will not store these sounds, but only descriptions associated with the determinations. That means that conversation that takes place at the same time as the identified music (or at any other time) will not be stored or interpreted, but will only be noise in the background of the classifier that determines the music type. If the conversation is more prominent than the music, the determination of music type predicate 122 may fail where it otherwise, in the absence of the conversation, would have succeeded. However, whether it succeeds or not, the conversation is not processed, and is not stored. To the extent that the sound sensors are used for detection of voice commands, of course, the system will attempt to identify the presence of such voice commands, whether occurring in silence or in the presence of music, at the same time as it may also be attempting to determine the type of music being played. To the extent that the system has a baseline truth for any observation, e.g., the system was used as a remote control to select the music, this constitutes a tag that allows for the use of additional machine learning, and the determination of the success rate of the heuristics based simply on comparison with FFTs or time segments of sound inputs.

Similar techniques are also used to identify sports programs using sports program predicate 123. For example, a soccer match has a sound profile that is very distinct from that of a tennis match, enabling the use of FFTs to compare the sound associated with a space and that of a known sport or other generator of sound profiles. In addition, the system can compare the sound profiles observed with known broadcasting taking place at the time of the observation, e.g. using standard correlation methods between the broadcast stream (slightly delayed to account for the transmission) and the observed sound sequences associated with one or more sensors. Such arrangements can make use of not only sound sensors, but also, for example, inertial sensors (which detect low-frequency sounds), as well as motion sensors to find correlations between user actions and the broadcast sound profile. For example, the user may cheer after a goal is made, as will the on-site audience of the soccer game.

The system therefore maintains sound profiles associated with multiple sports and other sound-generating events, and compares these to observed sound (and other) sensor data; as well as correlating current broadcast sound levels with observed sound levels. This also enables the detection of other TV shows being watched, using one or more instances of TV show predicate 124. This can either be by type (e.g., identifying a comedy by the tell-tale laugh track signature) or by unique program (by sound profile or by comparing time segments of sound data between an observed sample and a stored sample). It is not necessary to limit this to comparison with programming that is currently broadcast, but the same methods can be used to identify on-demand programming. It is beneficial, as described before, to associate music, sports and other programming preferences with pseudonyms, identities, times of the day, other ongoing activities being detected, etc. This can be used for prediction of preferences as well as for detection of anomalies, which signals that a user is maybe not feeling well or has different needs than previously established.

It is beneficial to associate apparent TV programs with a location, which enables the determination, based on signal strength and presence detection, of a room being a TV room 126. As rooms are identified, the data is associated with a set of nodes, which are determined to be in that room or close to that room based on signal strength and consistency of signal strengths for detected sounds and other sensor data. As this is done, the system automatically clusters nodes in terms of their relative distance. The system can also store information relating to the certainty of such a classification. In addition, the system illustratively determines the relative location of nodes that are not in the absolute physical area of each other, but maybe in rooms that open up into each other. This is further illustrated in the example arrangement of FIGS. 2 and 3.

The system can determine that a room is likely a bedroom 127 based on the apparent presence of a user during night hours, where this user is inactive for long periods of time. However, a user who works at night and sleeps during the day will also be correctly identified as sleeping, and the room in which he or she sleeps will be labeled accordingly. Thus, the determination of bedroom 127 is illustratively based on an activity profile comprising both a sound and motion profile, and potentially also inertial sensor data indicating tossing and turning or snoring, along with the duration of time during which these inputs are rather consistently observed. This enables the likely determination of a room being a bedroom 127, but also helps identifying anomalies in sleep patterns, which can be used to automatically modify environmental configurations, such as the temperature in the room identified as the bedroom 127. By identifying sleep patterns of a user, the system can also modify, within some interval, the time at which the user is woken up by an alarm he or she has set, as the alarms will also be controlled by the system.

In case a user is suffering a medical high-risk situation, as determined by the system, medical help can be requested. This is only possible if the system is able to guarantee very low error rates, which is one of the reasons that it is valuable for the system to identify all events and preferences and then identify anomalies associated with high risk. This can be done only for users who are determined to be alone; only for users expressing fear (e.g., by voice command); or only in contexts of identified high risk for distress 133.

Detecting the location of a bedroom and the likely event of a user sleeping, which is illustratively done in a fully automated manner, improves the system's opportunities to protect users when they are the most vulnerable, namely, when they are asleep, and to guide them properly in the case of a high-risk situation. It also places higher requirements on privacy. Thus, the system can process data obtained from rooms determined to be a bedroom 127 in different ways from ways in which data is processed when obtained from nodes associated with other rooms. The disclosed system therefore learns as much as it can about its inhabitants in order to personalize their use of the space as well as to protect them, whether from security or safety risks, or from exposure of personal information that would hurt their privacy.

A room can also be determined to be a kitchen 128 by being used in a manner consistent with kitchen use. This includes being used soon after a user leaves the bedroom in the morning (for breakfast); for having sound profiles from sound sensor 101 indicative of a kitchen (the humming of a dishwasher or the gurgling of a coffee maker); heat profiles from temperature sensor 110 indicative of the use of a stove or oven; the energy consumption profile from an energy sensor 112 matching the operation of a microwave; a refrigerator; a dishwasher, etc.; the correlation between such inputs (e.g., sound and energy consumption, as described above); and possibly others. Additional sensors such as humidity sensor 105 are also used to determine cooking, and are correlated with heat detected by temperature sensor 110. A room that is identified as a likely kitchen 128 faces a different use and risk profile than other rooms, and the system adapts its responses to observed events in the context of knowing the likely room type. In addition, by observing activity in the established kitchen 128, the system can determine the extent to which users eat at home vs. eat out; the extent to which users cook during weekdays; the type of appliances typically used for food preparation; and so on. This informs the risk profile as well as indicates demographic inferences and preference inferences for the users associated with the space, which is helpful for improving the system in terms of customizing configurations, services and content for the users.

As described before, the association of a collection of sensors with a given identified room, as also illustrated in FIGS. 2 and 3, allows the system to better understand the actions of a user and minimize the risk of false positives for inferences being made. For example, detecting likely distress in the context of food being prepared suggests very different actions than detecting likely distress in the context of a user rushing through his or her morning schedule, but at a slightly later time than usual. In the first situation, the user may have cut or burnt himself or herself, and may need first aid guidance or an ambulance; in the latter case, the user may need a reminder not to leave the house with the stove turned on; alternatively an automated or remote method of disabling the stove.

The system can detect that a room 130 has a washer, dryer and/or a water heater ("w/d/h") based on sound profiles determined using one or more instances of sound sensor 101 being matched to stored appliance-specific sound profiles; by energy consumption profiles determined using one or more instances of energy sensor 112 being matched to stored appliance-specific energy consumption profiles; and by correlating the temperatures in the room as determined by one or more instances of temperature sensor 110 to stored appliance-specific temperature profiles; and by correlating the profiles of the different types to each other. For example, when the sound profile is correlated with the energy consumption profiles and the temperature profile with a correlation factor exceeding a threshold associated with a stored appliance-specific threshold, then this is indicative of the associated set of sensors with such outputs being in a space that is labeled as being a room with these appliances, such as a washer and dryer or a water heater. Similar profiles can be detected for other appliances, such as HVAC appliances.

In addition, the sensor profiles associated with these appliances can be correlated to external system requests to control set appliances, e.g., to turn up the AC in one room or to increase the operational temperature of a water heater due to the temperature of delivered water falling according to a temperature sensor believed to be located in the bathroom detecting a temperature increase that is slowing down, or which is not consistent in its increase with the humidity in the room, which in turn is indicative of the amount of water being used.

A room is identified as a shower/bathroom 131 based on the system detecting increased humidity and/or sounds indicative, whether in time or frequency space, of showering, taking a bath, flushing, or other uses of water, as well as changes in temperature accompanying these other inputs, and of correlations between changes of all of these types of sensor output. It is beneficial to know that a room is a bathroom; for one thing, the presence of water in bathrooms increases the risk of accidents such as falls 134, and therefore, the system will be configured to identify, using instances of motion sensor 103 from nodes in a shower/bathroom 131 that a user is potentially falling. Whereas users can also fall in other rooms, the risk is greatest in rooms with water, and rooms associated with stairs, and therefore, the identification and labeling of such rooms is important. Stairs can be identified based on sound detected by sound sensor 101 and motion detected by motion sensor 103 for nearby nodes. Inertial sensor 107 can also be used to detect impact, which results from falls. Multiple instances of these and other sensors can also be used.

An entry room 132, also referred to herein as an entrance room, can be identified based on sounds detected by sound sensor 101 associated with the opening and closing of doors, the operation of locks, the presence of remote-controlled locks, changes in humidity detected by humidity sensor 105, especially when correlated with associated sounds detected by sound sensor 101 matching the opening and closing of doors. It will also be identified based on sudden temperature changes detected by temperature sensor 110, pressure changes detected by pressure sensor 106, and the correlation of these with each other and with other sensor outputs associated with opening and closing of entrance doors. Knowing that a room is an entry room 132 is important in the context of understanding, in an automated manner, the layout of a space, as illustrated in FIGS. 2 and 3. This is beneficial for burglar alarms.

If a presence 121 is established in an entry room 132 while the alarm is turned on, and the identity 129 or the pseudonym 125 is not detected or recognized as a resident, then this is an indication that the alarm should sound or an alert should be generated. However, if a presence 121 is established in an entry room 132 while the alarm is turned on, and the identity 129 or the pseudonym 125 is detected or recognized as a resident, then a better response is the generation of a notification to the resident, to which the resident based on configuration may have to respond with a confirmation for an alarm not to be generated. However, if a presence 121 is established in a room that is not an entry room 132 but which may only have windows, then this is an indication of burglary, and should result in an alarm whether the alarm is turned on or not.

This demonstrates an important way that the system can automate and improve the protection of users based on an automated understanding of the space, its layout, its users, and the meaning of various critical events. If an intruder is detected while a recognized user is present, based on a detection of the recognized user's pseudonym 125 or identity 129, then the system illustratively takes another action than if there is no indication that a user is present. For example, if no user is present, all locks may be locked and all lights may be turned off, along with law enforcement being notified; on the other hand, if a potential intruder is detected and a user is present, a prudent response includes notification of the user, comprising camera footage of the detected intruder and his or her determined location, based on a presence determination. A person skilled in the art will recognize that these are simply exemplary descriptions of functionality, and that they demonstrate the benefits of the disclosed structure, methods and approach. If an increased risk of burglary 136 is detected as being likely, then this is communicated to the backend, and based on the configuration of the system, conveyed to an operator.

The system further detects increased risk of fire 135 based on output of temperature sensor 110 indicating increased temperature, energy consumption changes detected by energy sensor 112 indicative of melting of cables or overheating of appliances, failure detection of appliances as described above, sound profiles based on outputs of sound sensor 101 indicative of fire, changes in humidity or pressure from respective humidity sensor 105 and pressure sensor 106 indicative of fire, as well as combinations of these, and especially correlations of these types of sensor data, from one or more nodes in the network. As for many other disclosed types of detection, it is beneficial for the system to identify such risks in the context of the labeling of the room and the likely presence of gas or other flammable substances where the likely fire is detected.

As for other risks, risk of fire 135 is illustratively reported to an automated backend system and also to a human operator, in addition to sounding local alarms and automatically generating notifications for emergency responders in proximity of the residence or business being observed. A pinpointing of the location of the fire is beneficial, as well as all location data of potential users in the space. This is also illustratively reported, and can be used by emergency responders to prioritize and guide their efforts.

The risk of an earthquake 137 is important to automatically detect, which is done using data from one or more instances of inertial sensor 107, one or more instances of sound sensor 101, and one or more instances of motion sensor 103. The motion sensor 103 or multiple instances thereof are primarily used to identify the likelihood that shaking detected by inertial sensor 107 is due to a person falling or dropping something. Whereas motion sensors generate local outputs if a person falls or drops something, inertial sensors generate the same principal output no matter where they are located in the house or the neighborhood when the cause of the shaking is an earthquake. When an earthquake is detected, its strength is illustratively compared to a threshold and it is determined whether the likely earthquake is sufficiently large; if it is, an action is illustratively taken. This action comprises turning off the electricity delivery to all nodes where there is a risk of a gas line rupturing, e.g., in a kitchen 128 or a room 130 with a washer, dryer and/or a water heater for example. If the detected earthquake is stronger than a threshold and takes place at a time when it is dark outside, other rooms are illustratively lit to facilitate the evacuation.

Illustratively, only outlets and electric nodes connected to light sources are enabled, and electricity to any appliances posing a risk in the context of an earthquake is turned off or reduced until reset by a user or an admin, or until a sufficient amount of time has passed, where this time can be a function of the detected severity of the earthquake 137. Notifications are illustratively generated in rooms with user presence, and potentially in all rooms; along with notifications being sent to user devices. It is beneficial for the system to maintain power to nodes that are used to power a router or other communications equipment, as well as to nodes used to generate a mesh network for communication within or between protected buildings. This maintains communication channels at times when this is important for users threatened by risk.

Additionally, the system is configured to identify and locate pet-related activity 138, e.g., based on motion sensor 103, sound sensor 101, or multiple instances of these and other sensors, and the pattern of movement associated with the derived presence 121 of the pets. In situations where pets are chipped, the pets can also be detected by identification using wireless radio of their implanted chips. Knowledge of the existence of a pet or better presence 121 or location of a pet is beneficial in emergency contexts, such as when there is a detected fire 135, and is illustratively communicated to emergency responders along with information, when possible to derive, relating to what type of pet it is. That can be determined both based on movement profiles (as indicated by serial readings of distributed presence 121 determination) and sound profiles determined using one or more instances of sound sensor 101.

The system is also configured to determine events such as party-related activity 139, which can be determined based on sound profiles and motion profiles using respective sound sensor 101 and motion sensor 103, and camera 102 output, the presence predicate 121 of multiple users, some of which will be detected using pseudonym 125 based or identity 129 based methods; additionally, the system can determine based on the detected music type predicate 122, sports program predicate 123 and TV show predicate 124 and the locations of presence according to the room labeling illustrated in FIG. 3, that there is a party. Parties may sometime increase certain risks, and accordingly, detecting a party is potentially beneficial. A person skilled in the art will recognize that these are simply exemplary embodiments of the potential of the disclosed system and its benefits, though, and will recognize that the described methods and architecture can be applied to a variety of related contexts, and that this results in similar benefits to those described in this disclosure.

FIG. 2 shows an illustrative example of a set of nodes associated with a space. The nodes in this embodiment include a set of nodes comprising Node 1, Node 2, Node 3, Node 4, Node 5, Node 6, Node 7 and Node 8, also denoted by reference numerals 201, 202, 203, 204, 205, 206, 207 and 208, respectively. It is to be appreciated that other embodiments can include more or fewer nodes. Here, two nodes are connected with a line if they are determined to be in close proximity of each other, as determined by at least one of very high correlation of sensor output signals and sensor output signal strength; and sequential activation in terms of the node with strongest signal output for a selected one or more types of signal types, indicating that a person or other source of sensor input passes from one to the other node neighborhood. This is a self-organizing network, and is determined automatically by the system, as described above and in further detail herein. It also benefits from a labeling of rooms in terms of their functionality, e.g., determining that one of the rooms is a kitchen, and some collection of nodes is associated with this rooms, e.g., by high correlation of sensor outputs or sensor output strengths, or correlated and simultaneous detection of motion or other local events.

In the example shown in FIG. 2, each node corresponds to one or more sensors, and illustratively several sensors of several types. The nodes may correspond to the same set of sensors or to different types of sensors, where some nodes may not have overlapping sensor types whereas others will. It is beneficial for most nodes to correspond to as many types of sensors as possible, as this gives a richer input to the system. It is also beneficial with a large number of nodes, and situations where these nodes are co-located or located in the same room or within radio distance and/or earshot from each other. Nodes having speakers can emit low volume sounds, inaudible frequencies, and other nodes, equipped with one or more instances of sound sensor 101 can detect the sounds emitted by nearby nodes. By modifying the volume of the sounds and generating sounds of different pitches, and from different nodes, the system can self-organize a network layout map like that shown in FIG. 2. Different pitches of sound have the property of penetrating different materials to different extents, since they are absorbed by furniture and other objects to different extents. Thus, using different pitches to determine the co-location of two nodes not only allows the system to determine likely presence in the same space or room, but also allows a determination of the extent of obstruction in the room, where the obstruction is of furniture and other articles. Since different materials absorb sounds and radio of different wavelengths to different extents, the system also determines the likely type of furniture, e.g., tables and chairs vs. couches; and the likely presence or absence of wall-to-wall carpets and area rugs. This is also informed by sounds made by users walking in the space, and the extent to which movements are audible.

A similar type of probing and analysis can also be done using radio transmitters/sensors of radio unit 104 with low or variable signal strength. The automated organization of the network map shown in FIG. 2 is also made based on observations of events not generated by any of the nodes, as previously described. Node 1 is determined to be adjacent to Node 2. Node 2 is also determined to be adjacent to Node 1, Node 5, Node 6, Node 3 and Node 8. Node 3 and Node 8 are determined to be likely in the same room or small area as they are both adjacent to Node 2 and Node 4, as well as to each other. Node 7 has not yet been found to be adjacent to any of the other nodes, and may be in a room that is rarely used. This may be a storage room, for example, or a rarely-visited utility room.

FIG. 3 shows the nodes of FIG. 2, but with an associated classification of room type, illustratively including rooms 301, 302, 304 and 305, in accordance with a physical layout of at least a portion of the area. Undetermined room 301 comprises Node 1. Room 305 comprising Node 5 is determined to be a bedroom with a likelihood exceeding a threshold that may be set to a particular value, such as 0.8. Room 302 is determined to be a living room, and comprises Node 2, Node 6, Node 3, and Node 8. Based on correlations between sound that is determined to be associated with a TV, and power consumption from Node 8, which is illustratively an outlet, the system determines that Node 8 is connected to the TV. This enables the user to remotely turn off the TV simply by instructing the service associated with the network to turn off the power to Node 8, or turn it to a sufficiently low voltage that the TV goes into hibernation and is only woken up when the system determines that a user enters room 302, based on presence determination, or when a user utilizes the remote to turn on the TV. Here, the remote may be implemented using any device with network connectivity, allowing the connection to the service provision using an app, a webpage, or associated method. Node 2 in the living room (room 302) is illustratively known by the system to be a switch, and is located next to the door to the living room, as also evidenced by its proximity to Node 5 in room 305, which is determined to be a bedroom. Node 6 is illustratively an outlet whose power consumption profile is associated with a refrigerator. Thus, room 302 is not only a living room, but also likely has a kitchen portion. Alternatively, the space may be a dorm room without a real kitchen facility, as evidenced by the fact that the occupant appears to go out for meals in a predictable manner, and there is no evidence of the space being used for food preparation. Room 304 comprises Node 4, which is illustratively a smart door lock with a camera.

Based on an adjacency matrix associated with the connections between nodes, the system knows that the entrance room is connected to the living room, which in turn is connected to the bedroom. Based on traditional configurations of homes, the system may tentatively assign room 301 to being a study. Based on the absence of connectivity between Node 7 which is illustratively a GFCI outlet, and other nodes, the system may tentatively assign Node 7 to being located outside the home corresponding to rooms 301, 302, 304 and 305; it may, for example be an outlet in the garage. Thus, even nodes that cannot be assigned a room designation or determined to be adjacent to other nodes can sometimes be given a probabilistic assignment of roles based on traditional layouts, the type of node, and other auxiliary information.

Figure 4:
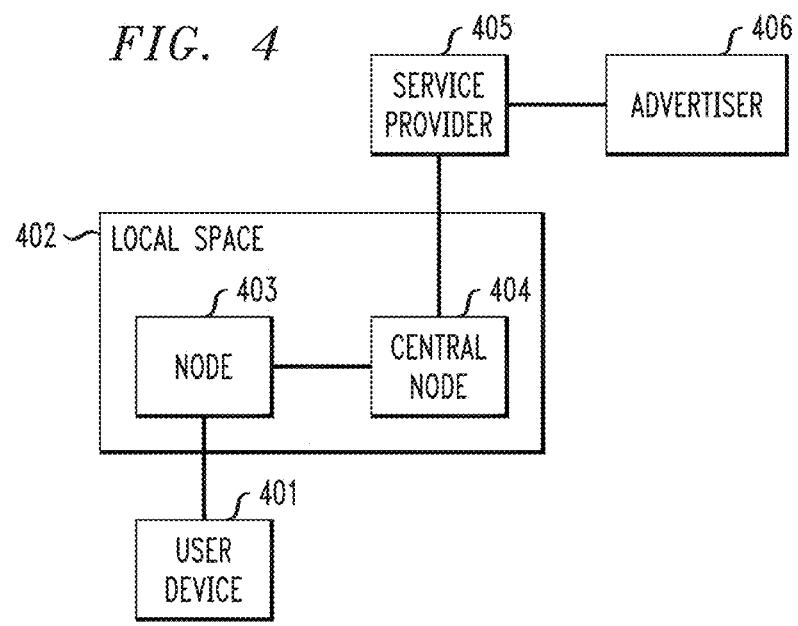
FIG. 4 is a block diagram of an information processing system configured with functionality for determining preferences and events and generating associated outreach therefrom in an illustrative embodiment.

FIG. 4 shows how a user can connect to a node 403 in a local space comprising one or more nodes arranged in a network, using a device 401 such as a smartphone or a tablet, and from the node 403 to a service provider 405, which in turn is connected to an advertiser or advertising network 406. The connection from the user device 401 and node 403 is typically made using a central node 404 of the local space 402, where the central node 404 may be a router. The user connects using user device 401, using a webpage or an app, which causes a connection to be established with service provider 405. The user uses this connection to perform customization, to obtain access to access data or control nodes, to register an account, associate an account with a space, to enable service provision, or other related activity in which the user selects, creates or modifies an account. Illustratively, the user is also requested to pass an authentication, establish one or more credentials, or request access from another user, or a combination of such functions. As a connection is established, the system, controlled by the service provider is configured. In addition, a connection is illustratively made between the user device 401 and the advertiser or advertisement provider 406. This enables automated determination of device identity, generation of a device identifier string, and detection of other activity related to creating an association.

This can be performed at advertiser or advertisement provider 406 between an identity or pseudonym provided by service provider 405 to advertiser/advertisement provider 406 or provided by advertiser/advertisement provider 406 to service provider 405, where the device identity is related to the user device 401. In other words, this allows the advertiser/advertisement provider 406 to recognize user device 401, and enables service provider 405 to convey predicates and other information related to user device 401 to advertiser/advertisement provider 406, using the pseudonym established between the service provider 405 and the advertiser/advertisement provider 406. The device identity can use cookies, cache cookies, user agent, flash cookies, unique identifier information stored in an app, and other related methods, as will be appreciated by a person skilled in the art.

An app, furthermore, can generate connections to advertiser/advertisement provider 406 using a webview interface, which corresponds to browser traffic.

The establishment of the connection between the user device 401 and the advertiser/advertisement provider 406 can be initiated by the service provider 405. For example, the service provider 405 can redirect traffic between the user device 401 and the service provider 405 to the advertiser/advertisement provider 406 using a redirect directive, which can be performed in an 0-sized iframe if a browser connection is used, or by opening a webview connection from the user device 401 to the advertiser/advertisement provider 406 if an app is used. A person skilled in the art will appreciate that there are alternative methods of establishing such connections, and that those can alternatively be used instead.

The conveyance of the pseudonym can be performed using a direct connection between the service provider 405 and the advertiser/advertisement provider 406, or can use the user device 401 as a proxy by redirecting traffic to a unique webpage associated with the advertiser/advertisement provider 406, wherein a unique element of the unique webpage comprises a pseudonymous identifier. This is well understood in the art. User device 401 may also request access to a resource local to the local space 402, which causes two requests to be made, one which is associated with the response to the request, and which involves the service provider 405 or a node associated with local space 402; and the other which corresponds to a connection to advertiser/advertisement provider 406. This allows advertiser/advertisement provider 406 to create a profile for user device 401, if it does not already have one, where this profile is stored by advertiser/advertisement provider 406 and associated with the local space 402.

To the extent that service provider 405 can determine that user device 401 corresponds to a user profile with another device that has already been registered with service provider 405 or advertiser/advertisement provider 406, the service provider 405 illustratively communicates to advertiser/advertisement provider 406 that that previous device, indexed by its associated pseudonym, corresponds to the currently observed user device 401, allowing the advertiser/advertisement provider 406 to associate both of these devices with the same record. As predicates are obtained by advertiser/advertisement provider 406 from service provider 405, these are associated with the record with which the relevant pseudonym is associated.

This conveyance is illustratively performed out of band from service provider 405 to advertiser/advertisement provider 406, and not involving a user device such as user device 401 as a proxy. One alternative way to direct traffic from user device 401 to advertiser/advertisement provider 406 is using a captive portal associated with local space 402 and managed by service provider 405. The captive portal may redirect traffic from the user device 401 to the advertiser/advertisement provider 406, as described above, or using one of the variations known by a person skilled in the art.

The result of these operations is that the advertiser/advertisement provider 406 will have information about end users including device identifiers of user device 401, and also including predicate data related to the associated user. The advertiser/advertisement provider 406 may additionally obtain a feed of temporary relevant data, such as the current needs and interests of the user; the current or recent activities associated with the user; and demographic and other information associated with the user. This is illustratively related to a pseudonym 125 or an identity 129, as described above.

For privacy reasons, service provider 405 illustratively does not provide user identity 129 to advertiser/advertisement provider 406, nor any sensor data directly from the collection of sensors 100, but only related to selected predicates in the set of predicates 120 related to local space 402 being accessed by user device 401. These can include, for example, data related to their optional association with pseudonym 125 or an identity 129 and related records detailing predicates.

Figure 5:
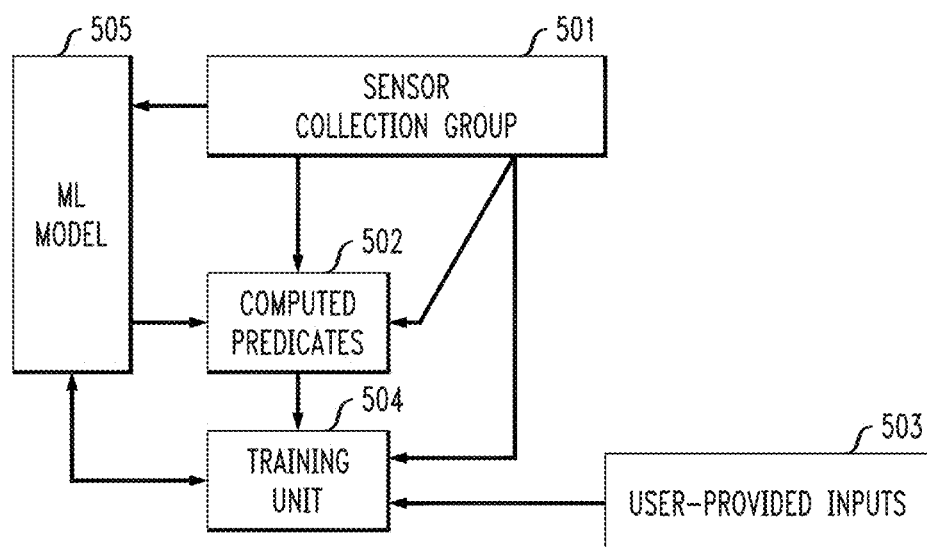
FIG. 5 is a block diagram of an information processing system comprising a set of sensors and a corresponding set of predicates, augmented with machine learning functionality in an illustrative embodiment.

FIG. 5 shows a sensor collection group 501 corresponding to at least a portion of the collection of sensors 100, and the predicates 502 computed from data provided by these sensors. These predicates illustratively correspond to at least a subset of the set of predicates 120 computed from the outputs of the collection of sensors 100 using the heuristic techniques described herein. While FIG. 1 shows the generation of the set of predicates 120 from the single collection of sensors 100, it is beneficial in some embodiments to compute the predicates from multiple collections of sensors. The system also obtains optional user-provided inputs 503, e.g., using the registration feature, or using manual configuration, manual selection of preferences and settings, and similar. The user-provided inputs 503 include information both about recurring users and temporary users. The outputs from the sensor collection group 501, the computed predicates 502, and the user-provided inputs 503 are provided to a training unit 504 that generates or fine-tunes a machine learning or ML model 505. This ML model 505 later obtains inputs from the sensor collection group 501, the computed predicates 502, and generates classifications that are made part of the computed predicates 502.

Tagged data in the outputs of sensor collection group 501 are particularly valuable for the training unit 504 to generate or improve the ML model 505, as these provide the training unit 504 with a baseline truth. Additionally, to the extent that high-confidence predicates are generated in the computed predicates 502, these can be used as tagged data by training unit 504. Here, the confidence is illustratively computed using standard statistical methods, such as maximum likelihood, or determined to be high-confidence after having consistent classifications (e.g., of room names) for at least a threshold amount of time. A person skilled in the art will recognize that there are many alternative approaches of determining confidence. High confidence corresponds to the computed confidence, which can be a probability or a score or a collection of values in multiple dimensions, exceeding one or more thresholds that are set by the system. One such threshold is a probability of 95%, and another is a score of temporal consistency indicating that the classifications have been consistent over a period of 10 days, and yet another is that the classifications have been consistent for at least 50 observations of a user that led to a subsequent classification.

Figure 6:
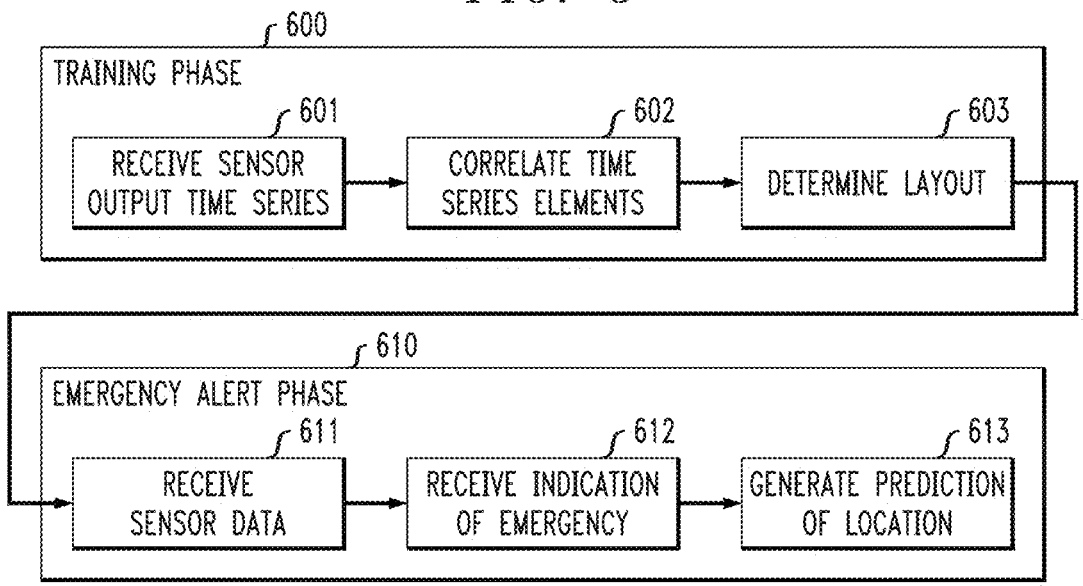
FIGS. 6 through 8 show additional examples that involve determining preferences and events and generating associated outreach therefrom in illustrative embodiments.

FIG. 6 illustrates a training phase 600 and an emergency alert phase 610. Training phase 600 comprises receiving a sensor output time series 601, also referred to herein as "time series data." The time series data may comprise a series of informational elements, where an element comprises a time indicator indicating the time of creation of the element; a sensor descriptor indicating the type and location, or identity, generating an output value; and the output value. For example, the type of a sensor may be "sonar," "microphone," "presence detector," "radio unit," "inertial sensor," etc. The location may correspond to an indication corresponding to an already determined location from layout determination 603. The identity may correspond to an at least locally unique value that corresponds to an identifier that may be generated at installation or manufacturing, and which is associated with a sensor. The output value comprises at least a portion of data generated by the sensor.

The time series data is received by a training unit. The training unit correlates received time series elements in step 602, and uses the correlated time series elements to determine a layout in step 603. In step 611, an emergency alert unit associated with the training unit associated with training phase 600 receives sensor data. In step 612, the emergency alert unit receives an indication of an emergency; this may comprise sensor output, such as from one or more inertial sensors, or it may be obtained from an auxiliary source. In step 613, the emergency alert unit generates a location prediction based at least in part on the layout determined in step 603 and at least in part on the sensor data received in step 611. The generated location prediction may be transmitted to auxiliary recipients, such as emergency responders. The location prediction optionally comprises information related to a classification associated with the sensor data of step 611.

Figure 7:
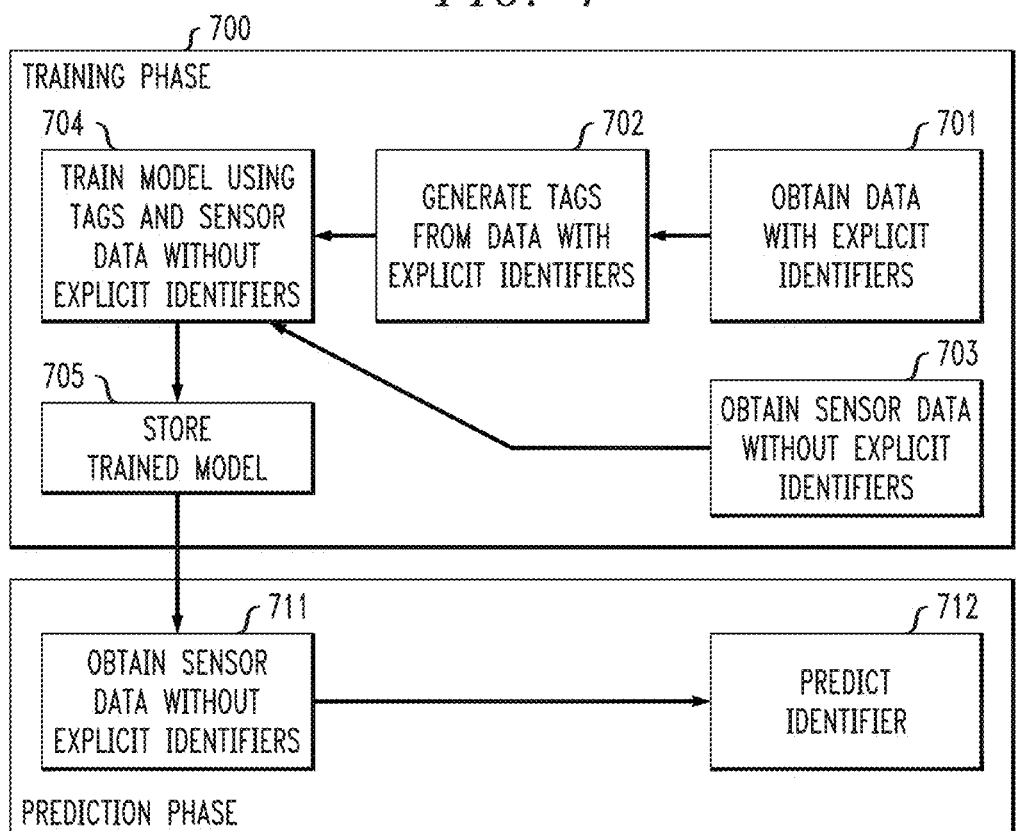

FIG. 7 shows a training phase 700 in which a model is trained and a prediction phase 710 in which a prediction is made. Training phase 700 comprises a step 701 in which a model training unit receives data with explicit identifiers; an example of such data is data associated with a radio identifier such as a MAC address or a Bluetooth identifier, data associated with HTML cookies or data associated with an app. The term "explicit identifier" as used herein is intended to encompass these and other types of information that can be used to identify a particular device and/or a particular user.

The training phase 700 also comprises step 702 in which a tag is generated from one or more data elements comprising explicit identifiers. In step 703, the model training unit receives sensor data that does not comprise explicit identifiers. Examples of such sensor data is sensor data generated by a sonar sensor, a microphone, an inertial sensor, a proximity sensor or a motion sensor. In step 704, a machine learning model or other functionally related model is trained using the sensor data without explicit identifiers, from step 703, and the tags determined in step 702. The training unit stores a trained model in step 705. This trained model is conveyed to a prediction unit, which may be housed in the same hardware unit as the model training unit. In step 711, which is part of the prediction phase 710, the prediction unit receives sensor data without explicit identifiers. In step 712, the prediction unit determines a prediction of an identifier based at least in part on the model generated by the model training unit in training phase 700, and at least in part on the sensor data of step 711. This permits the use of sensor data without explicit identifiers to predict an explicit identifier. Such techniques can be used to identify various types of users, including humans, pets, appliances and household robots. The term "user" as utilized herein is therefore intended to be broadly construed, and can include hardware and/or software entities as well as humans associated with those entities.

Figure 8:
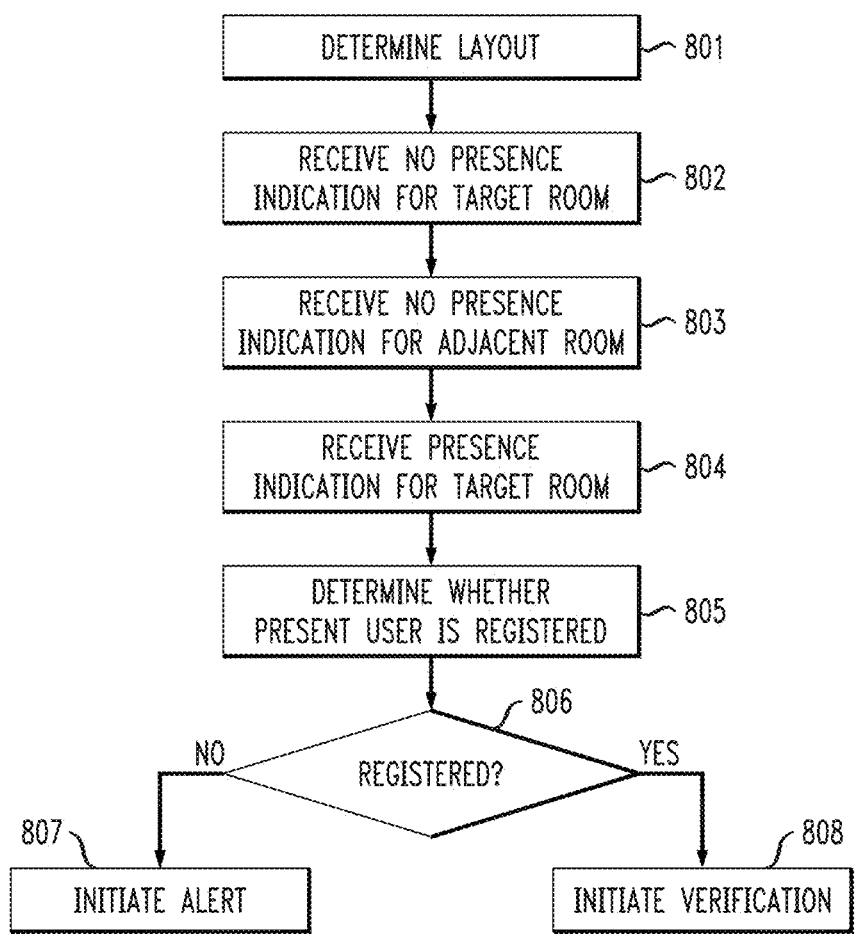

FIG. 8 illustrates an intrusion detection technique. In step 801, a layout is determined, e.g., using the approach described in FIG. 6 or using alternative means such as obtaining a user-provided layout. In step 802, the intrusion detection unit receives an indication that there is no presence of a user in a target room. A target room may, for example, be a bathroom. In step 803, the intrusion detection unit receives an indication that there is also no presence of a user in a room adjacent to the target room. An example room adjacent to a target room may be a bedroom that has an entrance to the bathroom that is the target room. In step 804, the intrusion detection unit receives an indication of a user presence in the target room. Thus, this user did not enter the target room through the adjacent room, since there was a preceding indication that there was no presence in the adjacent room. Typically, this means that a person entered the target room through an open or broken window. In step 805, it is determined whether the detected user in the target room is registered, e.g., by determining if the user corresponds to a known identifier such as a radio identifier or a predicted identifier as described in FIG. 7.

In step 806, a comparison is made whether there is a likely match to a registered user. Here, user registration may correspond to an explicit user action or may be based on repeated historical observation of identifiers associated with the user. If there is a match, then the intrusion detection unit initiates a verification in step 808. Such verification may comprise sending the matched user a notification and requesting a response, such as a confirmation of presence, an authentication using biometric techniques, etc. If there is no match, the intrusion detection unit initiates an alert in step 807. This may comprise sounding an alarm, sending messages informing registered users of the potential intrusion, or the collection of additional data, such as video data that may normally not be collected due to privacy concerns.

The particular features and other advantages described above are examples presented in the context of illustrative embodiments, and therefore such features and advantages need not be present in other embodiments.

For example, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

Also, references herein to particular features or other aspects as being "optional" refer to utilization in one or more particular embodiments, and should not be construed as an indication that any other features or aspects, such as features or aspects not explicitly referred to as optional, are required in any particular embodiments.

Illustrative embodiments include systems, methods, apparatus and computer program products comprising non-transitory storage media storing program code.

For example, in some embodiments a system for generating user predicates uses at least one node comprising a set of sensors, said set of sensors comprising at least two of a sound sensor, a motion sensor, a camera, a humidity sensor, a pressure sensor, a carbon monoxide sensor, an air-quality sensor, an energy consumption sensor, a temperature sensor, an inertial sensor and a radio unit.

The system in some embodiments generates a location estimate for a person based on output from at least two of the sensors in the above-noted set of sensors. The system also generates a room descriptor based on the location estimate and output from the at least two of the set of sensors. In addition, the system generates a user action determination based on at least two of the room descriptor, the location estimate and the at least two of the set of sensors. The user action illustratively comprises at least one of determination of a music genre, a sports type, an entertainment genre, a risk of burglary, a risk of fire, a risk of a fall, a risk of earthquake, a need for maintenance, a need for a product, a need for a service, and a need for a notification.

In some embodiments, the system is further configured to generate a map based on at least two space descriptors and at least a time-based series of correlated events, wherein it is determined whether a first space and a second space associated with the at least two space descriptors are connected to each other, and wherein a space corresponds to at least one of a room and an outdoor area.

The above-noted radio unit is illustratively used to generate a user pseudonym associated with a user for which a location estimate has been generated, and wherein the user action is associated with the user pseudonym. In some embodiments, the user identity is associated with the user pseudonym during a registration event.

The system in some embodiments is configured such that at least a portion of the location data is transmitted to first responders when the event is one of the risk of burglary, the risk of fire, the risk of a fall and the risk of earthquake.

Additionally or alternatively, power, gas, or similar utility or safety related functions are automatically turned off in response to detecting at least one of the risk of fire and the risk of earthquake.

The system in some embodiments generates a commercial offer in response to at least one of the music genre, the sports type, the entertainment genre, the need for maintenance, the need for a product and the need for a service.

Illustrative embodiments include a control system configured to receive, from a sensor network comprising at least one radio sensor and one proximity sensor, a first signal comprising at least an indication of a first radio detection and an indication of a first proximity detection. The control system illustratively generates a profile associated with an entity, stores in the profile data associated with at least one of the first radio detection and the first proximity detection, receives a second signal comprising at least an indication of a second radio detection and an indication of a second proximity detection, generates a predicate based at least on data associated with the profile and the second signal, and transmits the predicate to a registered entity.

In some embodiments, no additional information comprised in the first or second signal is transmitted to the registered entity.

The registered entity may comprise, for example, at least one of an advertiser, a third party service provider, and a user associated with the system. As another example, the registered entity may comprise an emergency responder.

A given one of the indications of radio detection illustratively comprise one of a MAC address, a Bluetooth Identifier or a unique identifier associated with a software application, although numerous other indications of radio detection can be used.

In some embodiments, the predicate indicates at least one of the presence of a registered user, the presence of a user other than the registered user, the absence of the registered user or the absence of a user other than the registered user.

Additionally or alternatively, the predicate can indicate an activity associated with an entity associated with at least one of the second radio detection and the second proximity detection.

As another example, the predicate can indicate a classification associated with an entity associated with at least one of the second radio detection and the second proximity detection, wherein the classification corresponds to at least one of a human, a robot and an appliance.

These and other particular features of illustrative embodiments are presented by way of example only, and should not be viewed as limiting in any way.

Further illustrative embodiments will now be described in detail with reference to FIGS. 9 through 17. The embodiments relate to privacy enhancement using derived data disclosure, and illustratively utilize predicates of the type described above, and possibly also involve determining preferences and events and generating associated outreach therefrom, in the manner previously described in conjunction with FIGS. 1-8.

Privacy, and the potential lack thereof, can be either the cornerstone or point of failure in Internet-based systems. Strong privacy protection will protect users and their data, but weak privacy protection can destroy the confidence of users in the system and cause massive damages to the health of Internet-based technologies and the parties that depend on these. Privacy failures can be categorized as unintentional (such as privacy abuse resulting from a data breach) or intentional. In an intentional privacy failure, the organization sharing data did so intentionally, although not necessarily with a clear understanding of the consequences of sharing. An example of this latter type is the data sharing from Facebook, of their user data, to Cambridge Analytica; this privacy failure had a large impact both on society and on people's trust in technology, not to speak of the reputation of Facebook.

While protection against both unintentional and intentional privacy failures is important, the former is fairly well understood, but there is an almost absolute lack of understanding of intentional privacy failures. One critical aspect in the context of protecting against intentional privacy failures is to convey to end users, in a meaningful, and controllable, manner, how their data will be (or might be) used, and allow them to determine whether this is acceptable. Doing this will not only serve as a helpful guideline in terms of how data is used but also enable end users to make meaningful decisions. In a society enabling users to make such decisions, the preferences of users will stop abusive (intentional) sharing of data, or, should it still take place, enable the assignment of liability, which will deter abusive sharing. Moreover, the meaningful conveyance of privacy protection will bolster trust among users, who will be able to understand what data of theirs is used, by whom, and, to some extent, how. This building of trust will strengthen organizations that help protect user privacy according to the user preferences.

However, traditional methods for conveyance of how data is shared has been proven to be complex and confusing, and typical users do not understand what data requests mean to them, and therefore increasingly simply click through permission requests, rendering these meaningless. For example, if an app asks for read/write access to a user's mailbox, and read access to the user's list of contacts, few typical users realize that this translates to the app being able to send email to the user's contact on behalf of the user himself/herself.

This problem is increasing in severity as the number of data sources and data resources grow, making it almost impossible for non-specialists to understand the possible consequences of granting access to a data source or resource. For example, sensor networks such as IoT systems for home or office automation increasingly comprise large number of sensors, such as camera, microphone, pressure sensors, motion sensors, temperature sensors, inertial sensors, and more. Most users may not even know that an inertial sensor detects sudden movements, making it very useful to identify earthquakes, and therefore, granting access to data from such a sensor requires a leap of faith. In contrast, people understand the use of a camera very well, and would not find it acceptable to share data from a camera in their bathroom (should there be a camera there in the first place.) However, if the camera is only used to detect the presence or absence of a person, and only that one bit of information is shared, then many people may relent and accept sharing of this data, provided the use is sufficiently beneficial for them. For example, combining an inertial sensor and the presence detector from a camera could help detect a fall in the shower and automatically call for help, if necessary. This may be a desirable functionality for many users, although few would know what an inertial sensor is, nor feel comfortable sharing camera data. If a user understood that an inertial sensor and the output from a camera could be used to detect falls in the shower, he or she may feel comfortable granting access to such data sources; however, this user would feel betrayed if it turns out that the camera was used to send photos of them in the shower to an external site, where these photos potentially could be seen and shared. This example demonstrates the complexity of granting access to data sources, and also, the risks and pitfalls this could entail.

The ability of typical users to understand and appreciate the use of their data is further complicated by the use of complex artificial intelligence methods. For example, consider a hypothetical machine learning technique that uses a large number of sensors, such as a camera, microphone, pressure sensors, motion sensors, temperature sensors, and inertial sensors, to determine whether a user has fallen in the shower. The use of the temperature sensor may be inexplicable to a typical user, and therefore, the inclusion of this data source in an access permission request will seem unreasonable. It may even be that experts do not know why the temperature sensor is useful to determine whether a user has fallen in the shower. In typical machine learning systems, a large amount of data types are provided during a training session, and, as a result of the training session, it is determined what data sources are useful. However, while typical machine learning methods will identify what sources are useful, they will not identify the reasons for this, making even experts wonder why a particular data source is needed. Therefore, as an increasing number of methods use artificial intelligence methods such as machine learning, the permission requests will become increasingly inexplicable. As this happens, users increasingly have to rely on faith that their data will not be abused, or avoid using systems that may be perfectly benevolent in spite of making inexplicable requests for data. This trend will increase end-user risk-taking, lower the extent to which service providers can be held responsible and lay the foundations for abusive behavior among data consumers.

The problem of data access is not limited to conveying permissions in a meaningful way, but also includes malicious behavior of the data recipient. The malicious behavior could be in the form of a data consuming application or process that is advertised to perform one task but which performs another, and less desirable task. Potentially, a data consuming process may have one stated use, but in addition, perform additional processing that is not desirable but which is not made public. Furthermore, there is a risk that an application or other data consuming process is advertised as performing one task, which it does, but then later to change its behavior and perform a second task. This second task would be different from the first task, and may use the same data but in another way, and in a manner that produces a result that is not desirable to the end user whose data it uses. This change of behavior may come about as the organization providing the data process or application is sold, control changes, circumstances change, or that the organization is infiltrated by a hostile party, e.g., by malware or a rogue employee, causing an undesirable change. Thus, even if users can trust that their data is used properly, according to how it is conveyed to be used, this can change. This is another source of concern to users, and is a risk in the context of privacy. Even if there is no malicious behavior, users may be concerned that there is, or could be, and this concern may cause a reduction of willingness among users to engage with service providers as well as fears that they may be abused.

Thus, it is a long-felt need to address the manner in which data access is managed. This need will mushroom with the development of sensor-rich networks, aggregation of data sources, and the use of big data methods for processing of information, including the use of artificial intelligence, but is not limited to these contexts. The development of methods to address these problems are vital for the ongoing success of the Internet and associated services.

Illustrative embodiments provide techniques for privacy enhancement using derived data disclosure. Some of the illustrative embodiments are advantageously configured to address and solve one or more of the above-noted problems of conventional approaches. The illustrative embodiments include but are not limited to systems, methods, apparatus, and computer program products.

In one embodiment, an apparatus comprises at least one processing device comprising a processor coupled to a memory. The processing device is configured to determine a representation characterizing data from one or more sensor devices of at least one sensor network, to determine a privacy impact indicator for the data, to provide the representation and its associated privacy impact indicator for presentation in a user interface of a user device, and to control access to information relating to at least portions of the data by one or more third party service providers based at least in part on user permission feedback relating to the representation and its associated privacy impact indicator as presented in the user interface of the user device. The "information relating to at least portions of the data" in some embodiments illustratively comprises predicates computed from at least portions of the data, results of functions applied to at least portions of the data, and/or at least portions of the data itself. Such related information as the term is used herein is therefore intended to be broadly construed.

The processing device in some embodiments implements at least one node of a plurality of interconnected nodes coupled to at least one of the one or more sensor networks. Additionally or alternatively, the processing device can implement at least one pre-processor coupled between at least one of the one or more sensor networks and one or more servers of the one or more third party service providers. Numerous other arrangements of one or more processing devices associated with one or more sensor networks, possibly involving nodes of one or more node networks, are possible in other embodiments.

In some embodiments, determining a representation characterizing data from one or more sensor devices of at least one sensor network comprises receiving data generated by one or more of the sensor devices, computing one or more predicates based at least in part on the received data, and determining the representation based at least in part on the one or more computed predicates. For example, computing one or more predicates illustratively comprises computing at least one first-order predicate comprising information indicative of at least one of presence, layout and activity within an area that includes at least a subset of the sensor devices of said at least one sensor network. Computing one or more predicates in some embodiments further comprises computing at least one second-order predicate based at least in part on at least one of the one or more first-order predicates.

The representation can comprise, for example, information specifying a particular visual icon for presentation in the user interface of the user device wherein the visual icon conveys information regarding a type of data from the one or more sensors without identifying the data itself. The representation can further comprise, also by way of example, a description of a service provided by a given one of the third party service providers, where the given third party service provider requires access to information relating to one or more particular portions of the data in order to provide the service.

Some embodiments are configured to produce data of conceptually meaningful types, such as "a person is in the room," "a known person is detected," "a person is sleeping," "a dog is present but not barking," etc. This is in contrast to "all data that can be used to determine the identity of a person," but which can nonetheless be used to detect many relevant conditions in a variety of different contexts.

For example, in some embodiments, at least one permission is represented by an icon. Thus, "a person is sleeping" may be represented by an outline of a person with "ZZZ" rising from his/her mouth, while "a dog is present but not barking" could be represented by a dog icon where the dog's mouth is closed, and the tail is wagging.

One may not be able to represent all meaningful data as icons only. For example, a conditional permission "share all sound data for up to 30 seconds after a wake command has been given" may be difficult to describe in an image. Accordingly, some embodiments are configured such that at least one predicate can be visually represented or otherwise displayed in a user interface.

Not all predicates need to be displayed. For example, one may display: (a) only those predicates with privacy impacts above some specified threshold (that may be set by the user); (b) only those predicates that the user has not previously marked as "always approve;" and/or (c) one or more selected predicates at first, thereby allowing a user to indicate that he or she wants to see more predicates (that are potentially less intrusive).

References above and elsewhere herein to "determining a representation" are intended to be broadly construed, and can include, for example, generating the representation or particular components thereof, accessing existing stored components, and/or various combinations of these and other techniques. Accordingly, in some embodiments, predetermined representations may be stored for use with certain types of sensor data, and a particular representation may then be retrieved or otherwise accessed when used to characterize particular sensor data. These and other arrangements are considered examples of "determining a representation" as that phrase is broadly used herein.

In some embodiments, providing the representation and its associated privacy impact indicator for presentation in a user interface of a user device comprises transmitting to the user device information sufficient to allow the user device to obtain in a browser of the user interface at least one window that includes the representation and its associated privacy impact indicator. For example, providing the representation and privacy impact indicator in some embodiments involves sending a link to the user device, which allows the user device to retrieve a web page that includes the representation and privacy impact indicator. Alternatively, at least one of the representation and the privacy impact indicator may be sent directly to the user device. Numerous other arrangements are possible.

The privacy impact indicator may be configured to identify a particular level of privacy associated with the data, with the particular level being selected from a scale ranging from a relatively low level of privacy to a relatively high level of privacy.

In some embodiments, determining the representation, determining a privacy impact indicator for the data, and providing the representation and its associated privacy impact indicator further comprises determining a first representation characterizing data of a first type from one or more sensor devices of said at least one sensor network, determining a second representation characterizing data of a second type from one or more sensor devices of said at least one sensor network, determining a first privacy impact indicator for the data of the first type, determining a second privacy impact indicator different than the first privacy impact indicator for the data of the second type, and providing the first and second representations and their respective associated first and second privacy impact indicators for juxtaposed presentation in the user interface of the user device.

In some embodiments, controlling access to information relating to at least portions of the data by one or more third party service providers based at least in part on user permission feedback comprises receiving data generated by one or more of the sensor devices, computing one or more predicates based at least in part on the received data, and providing a given one of the third party service providers with access to at least one of the one or more predicates in a manner consistent with the user permission feedback.

Additionally or alternatively, controlling access to information relating to at least portions of the data by one or more third party service providers based at least in part on user permission feedback comprises receiving data generated by one or more of the sensor devices, applying at least one function to the received data to generate derived data, and disclosing at least portions of the derived data to a given one of the third party service providers in a manner consistent with the user permission feedback.

Examples of the at least one function applied to the received data to generate the derived data include an obfuscation function configured to obfuscate at least a portion of the received data from at least one of the sensor devices, and/or a combination function configured to combine at least a portion of the received data from one of the sensor devices with one or more other portions of the received data from one or more other ones of the sensor devices.

These and other aspects of illustrative embodiments will now be described in more detail with reference to FIGS. 9 through 17.

One aspect of the disclosed technology is a data pre-processing method that takes a collection of inputs, such as data from sensors, and generates what we will refer to as predicates, where these predicates relate to an action that can be conveyed to an end user.

For example, the input data to such a data pre-processor may be data from one or more inertial sensors, one or more humidity sensors, one or more cameras, and one or more microphones. The data pre-processor identifies from an inertial sensor associated with a bathroom that there is a movement, which may be a fall, but which may also be an earthquake or a child that is jumping. It also determines from another inertial sensor that is illustratively located in another room, but which may also be located in another building, whether there is a similar sensor output from that second inertial sensor as there was from the first inertial sensor. If so, that may be indicative of an earthquake as opposed to a fall in the shower. If not, it may correspond to a fall in the shower, but may also correspond to a child jumping in the bathroom. To distinguish these two from each other with a high probability, the system determines, using the humidity sensor in the bathroom whether the humidity has recently increased above a threshold amount, which is indicative of the use of the shower; or whether the humidity in the bathroom is significantly higher than the humidity in another room, which may be in another building that is not associated with the same user. This would also be indicative of the shower being used. This makes it more likely that there is a fall in the shower; however, it is not certain. For example, it is possible that there is a child in the bathroom that jumps while somebody draws a bath or runs a faucet or shower. The system now determines, based on microphone data if there was any vocalization, such as a yell or a scream, taking place largely at the same time as the detection of the movement using the inertial sensor. This is indicative of a person having fallen, although it is possible for a person, even under these circumstances to yell without falling or fall without yelling. Therefore, the system also uses the camera signal to identify a sudden movement correlated with the signal indicative of a potential fall, from the inertial sensor. Instead of or in addition to a camera, a sonar system and/or an electromagnetic indoor positioning system such as a WiFi time-of-flight mapping system can be used to make this determination. The system then combines determinations relating to the one or more inertial sensors, the one or more humidity sensors, the camera, and the mapping system, and makes a determination whether a person is likely to have fallen in the bathroom, whether in the shower or elsewhere. This result is referred to as a predicate.

A predicate can be provided by the system to one or more applications or data consuming processors. Consider a first app that automatically calls for help when a danger is detected. One of the indicators of danger is the indication that a person may have fallen in the bathroom. Another indicator of danger may be that of a home invasion, i.e., a person climbing in through a window; that may correspond to one or more other predicates. Such a predicate may also use the camera and sonar (to detect presence and movement); humidity (to detect an open window); but maybe not the inertial sensor.

Another app may also help detect dangers. These dangers may not be the same as the dangers detected by the first app. It may also be the same dangers being detected, but in a different way. For example, the second app may detect a home intrusion attempt by detecting a previously not seen MAC address (i.e., a phone or other mobile device) being present, along with an indicator that there is a window open in the room where the MAC address was detected, and an indication that the MAC address was not detected in other rooms between an entrance room and the room where its presence was detected.

The two example apps would both consume data that came from a home. However, they would use different signals to perform the processing. Neither of the apps would have access to raw sensor data underlying the predicate information they received. For example, neither app would have direct access to the inertial sensor, the sonar, the humidity sensor, the camera or the microphone. Therefore, the possibilities for abuse are strictly limited, which is a significant benefit. Furthermore, the granting of permissions is considerably simplified. Instead of asking a user for permissions to the inertial sensor, the sonar, the humidity sensor, the camera and the microphone, which correspond to the traditional approach, the system could ask the user permission for "transmitting data indicating a person falling in the bathroom, to application X", which is easier to understand for end users than the traditional approach.

In the example above, the two competing apps performing detection of risks have different ways of detecting intrusion. The first app may request access to three predicates, namely a first predicate that corresponds to that a room does not have an entrance from the outside; a second predicate that corresponds to that the room has an open window; and a third predicate that corresponds to that there is a presence of a person in the room, but there was no person in adjacent rooms prior to the detection of the presence of the person in the room. The first predicate is static in that it will not change once it is computed (except in rare cases where the owners add another entrance, or never uses an entrance for a long time, thereby causing the system to determine that the room does not have an entrance.) This first predicate may be computed by identifying user movement for a long period of time, determining what rooms are adjacent to each other by correlating movement, and by determining what rooms users sometimes show up in or depart from without coming from or going to other rooms. The second predicate may use air pressure, sound, and humidity sensor signals to detect when a window (or door) is open. The third predicate may be implemented using sonar and by detecting sources of sound, such as footsteps. To get permission to access these predicates, the app needs the user to review and grant access permission before the system gives the app access to the data sources; these permission requests may be "Will you grant access to your floor plan to app X?", "Is app X allowed to receive data about what rooms have open doors and/or windows?" and "Will you let app X know if anybody enters a room through a window?". If the user permits app access to all this data, the app is able to perform the task, and is enabled. If the user does not agree to the access requests, then none of the requests are granted and the app does not gain access to the corresponding data. In some instances, a user may grant access to some types of predicates but not others, thereby allowing the corresponding app access to only the permitted predicates. This is meaningful when the granted predicates corresponds to a collection that is associated with a task.

Continuing with the example above, the second app performs a similar task using a different set of predicates, and correspondingly, results in a different set of permission requests. Some users may prefer the permission requests of one service provider to the permission requests of another, competing, service provider. Such a user will then select to receive service from the preferred service provider. While the end-user observed functionality of their services may be identical, and their error rates associated with the provision of these services may be the same, the permissions are different. If this causes a large number of users to prefer the service of one provider over the apparently functionally identical services of another provider, the first provider will be favored. Thus, the ability for users to understand the permissions not only leads to more content users who now understand what type of access to their data is possible, but moreover, it stimulates the emergence of competition based on beneficial privacy policies, as expressed using the permission requests.

The above examples show how the use of combination is useful for a system to generate predicates from sensor data and other privacy sensitive data. Another approach disclosed herein is the use of obfuscation of one or more signals, to generate a predicate from these one or more signals. An example of obfuscation follows.

An example app or data consumer wishes to identify a speaker, but without having to intrude on the privacy of the person. The system receives sensor data from one or more microphones and creates a predicate as an output. An example output comprises an FFT of a segment of voice data, such as a five-second segment, providing this as an output predicate. This is useful in the context of many applications; for example, voice recognition can be applied to the data without revealing what the person said; as another example, background sounds, such as music and sports, can be detected and identified. For an app to be provided access to this predicate, a user configuring the system may be given a permissions request such as "Company Y wished to access scrambled microphone data. It is not possible to detect what a person is saying based on scrambled data. Do you grant access?"

The access to FFT of microphone data is much less intrusive than access to the microphone data itself. Another example app wishes to receive commands from a user, similar to how Amazon™'s Echo receives commands. The commands typically have a "wake-up" word (such as "Alexa") followed by a request, such as "Check the weather forecast for tomorrow." After a pause, or after a set time period, it is assumed that the request portion of the command is completed. Therefore, an app like this does not need full access to microphone data, but only a selection of data (limited in time or by a pause), starting after the wake-up word has been detected. For the app to be provided with such data, the system can provide a user with the permissions request "Service Z1 wants to access your microphone for up to 20 seconds after a wake-up signal is received. Z1 will not be given access to the microphone at any other time." A competing organization decides that it only needs a transcription of the detected voice data after a wake-up signal has been detected, as opposed to all the sound data. This is clearly more privacy preserving. The system may avoid making the distinction and use the same permissions request as for service Z1, or it may use a more specific request, such as "Service Z2 wants to receive spoken commands, given within 20 seconds of a wake-up signal. Z2 will not be given access to microphone data at any other time, and will never obtain access to background sounds."

In one embodiment, each permissions request is associated with a score or a rating, where this may be in the form of a value, a color, or a diagram, and where the score or rating corresponds to the degree of privacy intrusion according to a rating system that can be provided by the system, an independent organization, or the user himself or herself. For example, the request corresponding to company Y above may have a rating of 7 out of 10, where greater numbers correspond to greater privacy; and where Z1 may have a rating of 4 and Z2 a rating of 5.3. The score or rating is illustratively graphically associated with the permissions request.

In one embodiment, the system displays the permissions requests in a structured manner based on the type of request. For example, the system may first present all requests that relate to collecting and sharing data that may identify a user (e.g. MAC address, voice data, etc.); then present all requests that relate to collecting and sharing data that will be used to generate a targeted advertisement; followed by all requests that relate to collecting and sharing data used only for determinations that are pseudonymous and in which individual user data is aggregated, such as data sent to an app that determines the air pressure in a neighborhood, and uses this for weather forecasting. To the extent that some permissions relate to several such categories, the permission request may be listed, for a requesting app or data consumer, in all of these categories or only in the categories that are considered most privacy intrusive, whether by users in general or the user to whom the request is presented. An alternative display structure involves different types of sensor output, e.g., one category that relates to audible sound data; and another that relates to motion data; etc.

In one embodiment, apps and other data consuming processes are associated with one or more scores or ratings, and in an interface where the user is provided with information relating to multiple related apps or data consuming processes, the scores or ratings are conveyed to the user. For example, this can be done by displaying an icon representing each compared data recipient, such as the apps/data consumers, one or more scores/ratings, and a brief description of the functionality of the data recipient. In addition, traditional consumer-generated ratings relating to the different data recipients can be presented, where these can take the form of one or more scores, a count indicating the number of underlying and individual user reviews, and one or more reviews or scores provided by consumer organizations such as the Better Business Bureau. In one embodiment, the user in the process of deciding between offerings is able to cause the options to be sorted based on one or more indicators, such as sorting based on the average privacy impact associated with the one or more permission requests of the data recipient; based on the highest or lowest score/rating of the permission requests; based on ratings provided by consumer organizations; or based on an aggregate measure of two or more of these types of scores.

Since some apps and data consumers may request a large and complex set of predicates, it is beneficial for users to be able to state pre-set preferences, such as "I always accept permissions requests of this type," "I always accept permission requests associated with a privacy impact lower than 6," "Always accept permission to share data categorized as anonymous and containing no personally identifiable information" or "Only display the highest-scoring permission requests of each type." The latter selection corresponds to only showing, for one data recipient, one permission request relating to collection of microphone data, namely the request that is the most intrusive according to the associated score/rating. The system may also display information relating to the use of the requested data, such as whether it will only be used in aggregate; whether the purpose of the use of the data is classified as a benefit to society (e.g., to identify trends in flu, determine what neighborhoods need financial support to improve home insulation, etc.) These and variant display techniques simplify the user experience and enable users to understand privacy impact, making them educated consumers.

In the examples above, the predicates are distinct from the final result of the determination by the app or data consuming process. In other words, an example app in the above would combine two or more signals to obtain a computational objective. The disclosure also supports uses where there is only one data source, as a person skilled in the art will recognize. This data source, in one embodiment, is a low-level predicate such as the raw signal of a sensor; in another embodiment, it is a mid-level predicate, such as a predicate determining the location of a user or the layout of a space. In yet another embodiment, it is a high-level predicate, such as a detector of a person having fallen. This may be computed, by the system, as a function of one or more other predicates, or of one or more raw signals. All of these apps may also use stored data, as will be appreciated by a person skilled in the art, where one type of stored data is historical records of predicates and/or sensor data, and another is user input, whether using voice, motion, keyboard, touch screen or other alternative input methods. The permissions will be modelled accordingly. In the latter case involving the fall detecting high-level predicate, the permission request may be "Do you agree to allow company X to receive data that identifies whether a person is likely to have fallen?" The more the permission request correspond to concrete phenomena or detections that users can relate to, the more meaningful.

The pre-processor stage of the disclosure may be performed at least in part by hardware associated with the deployed sensor network; in part by hardware corresponding to back-end servers associated with the organization manufacturing, selling or maintaining the sensor network system; and in part by a cloud-hosted processing environment. Additional or alternative pre-processing locations are possible, such as on a smart phone, on a laptop, on a tablet, on a router, on a firewall, by an ISP or privacy watchdog organization on premises used by them, and more.

A first aspect of the disclosed technology is a collection of nodes comprising a node network, where these nodes comprise sensors and means for communication, and where a node network is connected to a central utility that receives and processes data from the sensors associated with the network and/or exhibits control over the functionality of the nodes of the network. In an alternative embodiment, the collection of nodes can be replaced by at least one data source, such as a user's Facebook timeline; a LinkedIn user's set of changes to his or her profile, including messaging; an email user's mailbox; a collection of data resources associated with a phone, a tablet, a smart watch, a laptop, a desktop or other computational device, and the data sources and repositories associated with it. Other forms of data sources such as data sources associated with other parties are also useful. We will refer to the node network or other data source or repository collectively, and will interchangeably refer to these as the node network, the data source, or the data resource.

A second aspect is the central utility, which is illustratively, at least in part, in a location separate from the node network, and illustratively is connected to multiple node networks that are not part of the same installation or physical space. The central utility can be housed on one or more servers associated with a service provider, or in a cloud processing environment controlled by the service provider. For clarity and simplicity, we will refer to both the service provider as the trusted service provider, to distinguish it from third party service provider, which may not be trusted. We will also, interchangeably, refer to the central utility as the trusted service provider to reflect that fact that it is this party that provides instructions to the cloud service provider or server farm to implement the functionality performed by the central utility. Some of the functionality associated with this entity can be performed by a device associated with the data source, such as a node on the network, a router used to transmit data, a laptop, or a third party computational process that performs a task on behalf of the user; we will refer to the latter as the consumer ombudsman, in spite of the fact that the user may not be a consumer strictly speaking, but may be an employee, an organization, etc.

A third aspect of the disclosed technology is at least one third party service provider that wishes to provide a service to the users of the node network, with the assistance of the trusted service provider, or wishes to obtain data from the users of the node network. Two examples are a residential alarm company and an advertiser.

In some embodiments, example functionality of the disclosed technology includes a central authority or other trusted service provider being configured to receive data from one or more node networks and, from this data, to generate one or more predicates. Example data comprises output from sensors such as radio transmitters, microphones, motion sensors (including sonar, which uses a microphone, as well as other types of sonal sensors), thermometers, and sensors detecting volatile substances such as alcohol fumes, carbon monoxide, etc.

Example predicates that can be generated in illustrative embodiments herein comprise a description of a user, such as the user's likely gender; the preferences of a user, such as a preference to watch soccer games on TV; and/or the activities of the user, such as hosting parties, cooking or learning to play the guitar; as well as numerous others.

Additional predicates comprise whether any user is present at a location at a particular time. The predicates are less sensitive than the full data from which they are derived. Whereas some of the predicates, such as the location of a user at any one point in time, may be considered invasive, such predicates are justified in some contexts, such as in the context of a fire or other catastrophe, and may be acceptable to share on a limited basis, such as to organizations associated with emergency response.

Yet other predicates are not invasive to typical users, such as whether a user associated with the space is learning to play the guitar; however, it should be understood that some combinations of innocuous predicates may pose a concern to some users, if known to third parties, whereas such users would not be concerned with these third parties knowing any one of the predicates. An example of this general problem is described in L. Sweeney, "Simple Demographics Often Identify People Uniquely," Carnegie Mellon University, Data Privacy Working Paper 3, Pittsburgh Pa., 2000. Analogously, one example of where datasets that appear to be anonymized could be de-anonymized was described in A. Narayanan and V. Shmatikov, "Robust De-anonymization of Large Sparse Datasets," IEEE Symposium on Security and Privacy (SP 2008), May 18-22, 2008.

Accordingly, it is desirable in some embodiments to address situations in which colluding third parties may attempt to combine their inputs to gain insights beyond what is acceptable. These and other issues are addressed in illustrative embodiments through the use of pseudonyms, as will be described in more detail below.

A valuable aspect of providing predicate information to third parties is the creation of profiles associated with the predicate information, where these profiles are associated with identifiers that illustratively are pseudonyms unique both to the sensor networks or associated users, and to the third party service providers. This means that two third party service providers receiving predicate information related to two particular node networks, data sources or users would illustratively not be able to determine, if collaborating, that the two node networks, data sources or users are the same or related to each other.

In some contexts, however, it may be beneficial to use pseudonyms that are not unique to both the node network or user, and the third party service provider receiving the predicate data. For example, in some contexts it may be acceptable for two third party service providers to be able to determine whether they are observing and controlling the same node network. Furthermore, it may sometimes be beneficial for the pseudonyms not to be used as a method to anonymize the user. For example, a user of a network may wish to associate a service he or she is receiving with an email address he or she owns, and to enable the third party service provider to contact him or her directly, without the collaboration of the trusted party. In this context, the email address of the user may be used in place of the pseudonym.

At the other end of the spectrum on anonymity, some pseudonyms are unique not only to a node network or end user, or to the third party service provider obtaining information associated with related predicates, but also unique to a given session. Here, a session may be a period of time, such as three days, or a unique event, such as one transmission of predicate information sent from the trusted service provider to the third party service provider.

Another aspect of the disclosed technology is what we refer to herein as "capabilities." The different types of pseudonyms described above illustratively correspond to different capabilities of the third party service providers obtaining predicates related to the pseudonyms. Another capability is the type of predicates that a given third party service provider gets access rights to, whether these access rights correspond to the right to receive information about the predicates or to initiate state changes associated with the node network. One example state change access right is the right to increase the temperature in a building, another is the right to set the volume for a speaker, and a third is the right to generate messages to the user. Typical users would want to understand what capabilities third party service providers have, illustratively before signing up for service with them.

Thus, a third party service can be described using their capabilities, or classes of capabilities, where one class corresponds to a common set of capabilities, and another class to another common set, and where each service provider can be described as requiring no more capabilities than the set of a given class. This simplifies things for users, who can decide, for example, that they are willing to provide "class C capabilities" to service providers they do not know, but "class E capabilities" to service providers that they trust. Different users may have different preferences, of course, and this approach simplifies the mental burden of assessing service providers and their access to data and control. Thus, permissions, described elsewhere in this disclosure, can be modeled both around access to predicates and around the granting of capabilities.

One aspect of the disclosed technology relates to reducing the sensitivity of data and associated predicates. For example, a user may be willing to let one third party service provider know whether he or she was in his or her home on a particular day, but not until a week afterwards. Similarly, a user may be willing to let a third party service provider obtain voice commands spoken by a user associated with a node network, but not utterances that are not voice commands or associated with such commands. As yet another example, a user may be willing to let a third party service provider know a frequency representation of the sounds in a home, from which the third party service provider could tell whether the home has a barking dog or not, while the user is not willing to let the third party service provider have access to a time-series representation of the sounds in the home, as this would amount to the third party service provider being able to determine what was being said.

These processing aspects of the data and the predicates also apply to information that is stored (whether by the trusted party or third party service provider), and to how sensor data is transmitted to the trusted service provider from the node network. We refer to these and related processing aspects as "modifiers."

Another aspect of the disclosed technology is a method to use align the requests for permissions (of access to data and capabilities to control) with the predicates and capabilities, both of which may be low-level (such as the sensor data or other data from the data source), medium-level, or high-level (where the latter is a more conceptual level of the data and the control of the setting.) Thus, the use of predicates and capabilities as described herein prevent insights and control that are not wanted by the end user, and limit such insights and control to the desired aspects; it makes the conveyance of permission requests meaningful as it align these with concepts that are not abstract and for which users can understand the privacy impact, and furthermore, it limits the access, both to information and controls, to these permitted quantities by means of the system granting access to user information by means of an API or related technique that is aligned with the permissions.

In one embodiment, predicates are computed from sensor data by the trusted service provider. In an alternative embodiment, the predicates are computed from sensor data by one or more nodes that are part of the node network, or otherwise located on the premises associated with the node network. In other embodiments, at least one of the nodes that is part of a node network or located on the premises partially processes sensor data and transmits the partially processed sensor data to the trusted service provider, which then computes one or more predicates from the partially processed sensor data.

In these and other embodiments, the processing associated with computing predicate data from sensor data illustratively comprises, for example, at least a subset of selecting sensor data; aggregating sensor data; performing an FFT on sensor data; delaying the reporting of at least some sensor data or a function thereof; removing duplicates or strongly correlated signals from the sensor data; identifying a user and reporting sensor data associated with the user, but reporting a pseudonym instead of identifying data of the user; and determining, based on a user-controlled policy, what type of sensor data and/or partially processed sensor data to report to the trusted service provider. The determining can be based, for example, on the detection of a condition, such as whether an alarm system has been armed; whether a user is a recognized user or is associated with a recognized MAC address or other hardware identifier; the time of the day; the value of a computed predicate; or a combination of these or other conditions.

In some embodiments, the trusted service provider acts as an anonymizer between a node network and its associated users, and a third party service provider. For example, the third party service provider may be provided with certain types of node network usage data, such as how users move around, what type of products they use and what TV programs they watch, but is not provided with information useful to identify or locate the user or the node network, beyond some granular information such as a general area (e.g., a city, a county, a state or a country) or an age group of the user. In particular, the third party service provider would not be allowed to know the exact location of the node network or its users, as well as identifiers associated with the node network or its users, such as email addresses, HTML cookies, MAC addresses, etc.

This permits more detailed usage data to be shared by the trusted party to the third party service provider, since the actions of the users are protected by the anonymization or pseudonymization performed by the trusted party. This also enables the sharing of select sensor data that may be sensitive, as opposed to only select predicate data. The same type of anonymization can also be performed in a context where the third party service provider receives only predicate data and not sensor data, or a combination of such data types. Furthermore, the trusted party may aggregate data between different node networks before providing sensor data and/or predicate data associated with the aggregated sensor data. This is useful for carrying out general lifestyle surveys, characterizing various type of data relating to life in a home, in a manner analogous to Nielsen ratings for TV programs.

A user may grant permission to these by category, or may grant access to all anonymized data extraction that does not have capabilities, or grant access to all anonymized data extraction even when associated with capabilities. The granting of such permissions can be part of the installation process, but it is also possible that some types of permissions are part of an end user licensing agreement (EULA), and not possible to accept or deny explicitly. For example, it is necessary in many contexts for the system to extract at least some data to provide services, independently of whether third party applications are selected or not. A user, for example, wishing to remotely control his own system using his or her phone must implicitly allow the system to control the system. Similarly, the system may include functionality such as anonymized data use, whether aggregated or not, that users may not select not to permit.

Additional aspects of example systems will now be described. Although reference is made below and elsewhere herein to a particular system, it is to be appreciated that the various aspects to be described may be implemented in respective different systems. In addition, different combinations of the various aspects may be implemented in respective different systems. Numerous other arrangements are possible, so references herein to a given "system" should not be viewed as requiring particular features or functionality.

An example system in illustrative embodiments, also referred to herein as a "disclosed system," is particularly designed to avoid abuse. One type of abuse of relevance in the context of sensor networks is intimate partner violence (IPV). With the development of digital technologies, such technologies have come to play a key role in IPV contexts, as abusers exploit them to exert control over their victims. IPV affects roughly one-third of all women and one-sixth of all men in the United States (see S. G. Smith et al., "The national intimate partner and sexual violence survey (NISVS): 2010-2012 state report," 2017.) Thus, it is important to design systems in a responsible manner, to ensure that they are not being harnessed for abuse.

Third party application systems are a potential risk in this context, especially in systems where an abuser has the capabilities to install third party services without the knowledge of the victim. This is exacerbated by asymmetric technology awareness within households, and by complex user interfaces, lackluster audit capabilities, and the difficulty of automatically scanning the code or determining the functionality of services that have a substantial backend component. The fact that many applications may have dual-use purposes also complicates matters, as it means that most uses may be legitimate and desirable, but that the services also have undesirable uses. It is unlikely that much progress can be made by simply reviewing the access rights of applications, as two applications could potentially access the same type of data, while only one of the applications might have dual use or an undesirable and abusive capability.

The disclosed system in one or more embodiments addresses these and other problems, using multiple approaches. For example, one approach includes maintaining an installation and configuration log for the system, wherein all changes, the parties making the changes, and the time of the changes are documented. This enables a user to review recent installations or subscriptions. Similarly, the disclosed system incorporates a tracking method that identifies common constellations of applications and identifies those that do not match some notion of commonality, which could either be set by a user or kept at some threshold value. Third party applications that are identified as unusual could therefore be given extra scrutiny. For example, users could be alerted about the presence of such third party applications, or the user can request a roll-back of the installations/subscriptions or associated configurations. Simply reconfiguring unusual applications will address a large part of the problem, as this prevents exfiltration of data in the most common contexts.

In addition, the system illustratively correlates abuse complaints and other complaints with the constellations of installations and subscriptions, thereby singling out applications whose installation or subscription is commonly associated with abuse. Such applications may be banned from the marketplace of apps if the correlation is very strong, as this suggests an intent of abusive use, or users can be notified of the potential risks for applications with lower correlation, which suggests dual use.

The system illustratively maintains multiple thresholds for the determination of risk for different scenarios. One example scenario is where a user is excluded from a node network, there is a conflict report between registered users, when control is handed over from one user to another, or when one user is obtaining administrative ("admin") rights for a system that is not a fresh installation without any applications. In such contexts, the new user(s) or admin(s) are notified of high-risk applications, where the alert may classify the application according to its correlation with abuse reports as well as whether the application is rare or new enough that there is not sufficient material for performing the correlation effort. Users can choose to remove or cause a reset or a reconfiguration of such applications.

An automated scoring system of this type helps maintain security and an abuse-free marketplace, as it allows the removal of undesirable applications by individual users, and the exclusion of applications that are commonly figuring in abusive scenarios. Users wishing to very quickly change the settings can choose to keep only applications that are sufficiently old and common that statistic information is available to the trusted party to evaluate their correlation with complaints from users, and which do not have a correlation to complaints above a threshold value. Herein, the type of complaint is illustratively taken into consideration in the determination. For example, a user complaint that the system does not select the right music or that the user does not wish to receive advertisements is not relevant in a context of abuse, whereas complaints of unwanted access, attempts to evict users, initiation of access resolution mechanisms among permitted users, and others, are all signs of potential abuse.

In addition, the system identifies contexts that are associated with likely breakups, such as one out of two previously registered users disappearing from a node network for an extended time, apparent conflicts by two users, e.g., changing configurations back and forth, and other indications associated with a higher risk of abuse. These contexts and indications are then correlated with installed apps, especially those that are recently installed, and especially apps that are uncommon. Apps with a correlation exceeding a first threshold value, such as 0.4, are given additional scrutiny, included in notifications, etc.; while applications exceeding a second threshold value, such as 0.75 are blocked from the marketplace. By correlating applications to other complaints, other app problems can be automatically and statistically identified, as will be appreciated by a person skilled in the art.

As a more particular example, assume in the context of an illustrative embodiment that the third party service provider is a provider of radiant floors, and wishes to help provide better control to purchasers of their heating systems. Commonly, radiant heat systems comprise coils in the floor, where the coils either are electric coils or coils with water that can be heated by a water heater. However, due to the thermal mass of the floor above and around the coils, heat is retained in the floor and radiates into the room for a long time after it is transferred from the coils. As a result, if a thermostat detects that the temperature is too low in the morning, and starts heating the floors, by the time the sun has risen and started to heat the building and the air in it and the thermostat detects that the right temperature has been reached, the floors contain a large amount of heat. This heat will continue to radiate into the rooms well after the right temperature has been reached, thereby making the rooms too warm and potentially necessitating the resident to turn on the air conditioner to counter the temperature rise.

This cannot be addressed by setting the thermostat at a lower temperature as on a day when it is not as warm outside, the temperature will not rise at the same pace, and the house would end up being too cold. Additionally, different homes will have different heat swings than the one described here, due to the use of different materials. Furthermore, the habits of the residents may affect the response, e.g., one person may go in and out to the deck throughout the day (thereby affecting the indoor temperature) while another may not. Similarly, one person may use heat-generating appliances a lot on one day, but not at all on another; accordingly, the temperature response curve is not even the same from day to day for the same house, even if the weather is the same.

This problem can be dealt with by a central authority that comprises a machine learning system configured to detect the temperature in various locations inside and outside of the house, to obtain information about the thermostat settings, and to control the heating of the floor coils. Traditional automated control algorithms, additionally, can be used to identify the changes of temperature within the system and to regulate it using the control of the heating of the coils. Systems like this can be configured to determine the heat retaining capabilities of the floors, which can be done automatically based on the sensor inputs described above. Whereas this can be managed using a local feedback system, this is not optimal. It can also be performed by the trusted party; however, this party might be limited in terms of its business to providing systems and some form of control to users, and not specialized to control the temperature of the system using advanced methods. Different third parties may have different proprietary algorithms to address the problem, with various pros and cons.

Therefore, it is advantageous to be able to outsource the processing and service provision. However, if all customer sensor data were to be sent to the third party, that would be a severe privacy invasion. While the users have a trust relationship with the trusted party, they should not have to place trust in a larger than necessary number of organizations; therefore, it is beneficial that the disclosed technology removes the need for having to trust the third party.

In this embodiment, temperature sensor data (illustratively for all indoor nodes and also for at least one external node, if available) is transmitted to the third party, along with user preference data relating to the preferred temperature schedule. In one embodiment, no further data is transmitted, except for a temporally stable pseudonym that allows the third party to generate a model of the heat transmission and use this to predict what control to apply.

The sensor data does not need to be provided all the time, but could be transmitted every ten minutes, or in accordance with another specified transmission period. The third party transmits control information to the trusted party, tagged with data related to the temporally stable pseudonym, and this control data is transmitted by the trusted party to the node network. In one embodiment, the third party service provider may have sold or installed the physical heating system, and would know additional information, such as the type and thickness of the material above the coils, whether the coils are embedded in wooden panels or in concrete, and other related information. This type of information may allow the third party to fine-tune the model and speed up the conversion speed of the estimator. These techniques also help to identify a failed or failing system. It may also reveal real-life identities of the users, including their address. Since the temperature data could in some instances reveal whether the users are at home or not, e.g., as indicated by a repeated opening and closing of doors, this may be seen as a privacy drawback. A user who is concerned about this may prefer that only partial sensor data is provided, e.g., no temperature data from nodes close to entrance doors.

The trusted party can automatically identify what sensor data is indicative of potentially sensitive actions, e.g., by correlating temperature data with data indicating that doors are opened and closed, such as microphone data, and identifying sensor data that should be excluded. Such data would never be included in the feed to the third party. Thus, one advantage of the disclosed technology is an automatic determination of what sensor data is strongly correlated with potentially sensitive data, of which the system could have a list that is either provided by the user or which is from a template.

A third party provider of these services can either request permission to all the sensor data described above, or could, alternatively, request access to data indicating the current temperature and the predicted temperature in one hour, based on current and recent system events. If the system provides the machine learning functionality described above, the third party application provider can simply request access to predictive temperature data and permission to control the temperature by means of increasing or decreasing heating and cooling. The user can provide the desired temperature settings, both current and requested future temperatures, directly to the third party service provider, or can provide this information to the system, which then conveys it to the third party service provider. A third party service provider can also request access to the user's email box, allowing the third party provider to automatically identify from emails containing ticket purchase data, when a user will not be at home, thereby being able to create a suggestion or an automated policy regarding temperature changes for the affected time period. Similarly, a third party service provider can request access to a user's GPS coordinates, as determined either by a phone GPS, a vehicle GPS, the proximity to known networks with a registered device, and more; thereby enabling automated modifications to the temperature settings to address the expected needs of the user.

In the disclosed system, the trusted party collects sensor data and other user inputs and processes these to obtain derived data; then makes selected data and derived data available to third parties, and optionally receives control data from the third parties, where the control data or data derived from the control data is transmitted by the trusted party to the node network or at least one node associated with the node network, where the node network is at least in part the source of the collected sensor data. Optionally, the trusted party pseudonymizes the information transmitted to third parties.

The derived data illustratively comprises what we have referred to as predicates above. Apart from being a lesser impact on the privacy of users for derived or otherwise processed data to be shared, the structure disclosed herein also enables an alignment with constructs that align with user-understandable quantities and actions, as opposed to the much more abstract and vague descriptions that would correspond to raw data of sensors or other data sources. Therefore, the use of predicates help convey meaningful permission requests. Moreover, since the data access of third parties will be controlled by the system according to the permission requests granted by users, the privacy protection will be further enhanced.

The system can at any time reduce the access to future data from a user or installation to a third party vendor. The system can select to block communication of personal data (such as a MAC address of a phone) for selected users, whether these users are on systems that they control or are present at other installations that are also managed by the same system. At the same time, the system can grant limited access to circumvent such privacy features to law enforcement, whether this means tracking a select user or device within one or more installations, or responding to an inquiry whether or not a particular user was present in a particular location at a particular time. Thus, just like fine-grained controls can be applied to user data based on user preferences, exceptions can be made on a fine-grained basis, whether for purposes of law enforcement or other important inquiries.

Moreover, the system can permit anonymized movement data and other aggregated inquiries, whether by law enforcement, census bodies, and other organizations granted access to limited query functionality as that described above. This is implemented using the same kind of policies and controls as govern disclosure of user data to third parties.

Another example third party application is a preference derivation system that receives at least some data and derived data associated with a node network, from the trusted party, and determines at least one preference associated with the user(s) of the node network. Example preferences include "the user likes jazz," "the male adult is often accompanied by a dog," "people in this residence like to play ping pong," and "user 1 of the residence sleeps poorly when the temperature is higher than 92° F." The third party that derives such preference observations can do this without any knowledge of the location of the residence (or commercial space); without knowing the names or email addresses of the users; and without any other personally identifiable information. We refer to this third party as the preference determining third party.

Another third party service provider, such as an advertiser, a merchant selling dog toys, or service provider controlling the temperature of the residence (as described above), wishes to acquire data streams of relevance to its business, and pays the preference determining third party for relevant data, with the trusted party acting as a broker of information and payments. For example, a third party wishing to sell dog toys to users of a certain demographics, living in the US, may pay the trusted party $4 for each new referral. The trusted party knows the location of a residence, and has assessed likely demographics, whether by requesting information from users associated with the residence or by observing their behavior based on sensor data that it receives. The trusted party also knows what users it has sold data for relating to the third party wishing to sell dog toys. Therefore, periodically, the third party receives preference data relating to some pseudonyms, where the pseudonyms are illustratively specific to the user(s) as well as the preference determining third party. The third party then collects such preference data and determines what third parties are interested in the preference data, and determines whether the price the third party wishes to pay is sufficient.

Different preference determining third parties may have different pricing structures for preference data, based on the type of preference, the estimated accuracy, and other factors. If the price the third party wishes to pay is sufficient, the trusted party initiates a transaction in which preference data is sent to the third party, in this example, the third party wishing to sell dog toys. The trusted party then performs book-keeping both with respect to the buyer of the preference data and the seller of the preference data. The preference data that is sold is illustratively identified using a pseudonym that is unique to the user(s) to which it relates, as well as to the buyer of the data. Thus, the buyer of the preference data and the seller of the preference data cannot determine whether or not two pseudonyms relate to the same user(s). The third party wishing to sell dog toys may prepare an offer to be sent to the user, whether using the trusted party as an intermediary, or directly, in the case where the third party wishing to sell dog toys has been given a method of contacting the user(s).

Similarly, advertisers may build catalogues of likely preferences for different users, where the pseudonyms may be related to third party cookies or standard HTML cookies set by the third parties by a redirection method as the user(s) visit a webpage related to the trusted party. This allows later detection of a user, as he or she browses the web, where the detection is relative to a preference, such as "this user likes jazz." There may be yet other pricing structures for data used in the context of advertising. In this example, such data is much more long lived than simply a referral of a user, and an associated opportunity to initiate the transmission of a dog toy discount coupon, by the trusted party for example.

The pricing structures may be set by the trusted party, or using market forces in which the trusted party determines the right price using experimentation, illustratively via an auction. Whereas most auctions involve goods or opportunities for which there can only be one auction winner, data such as preference data can be sold to multiple buyers, as long as the third party generating the preference data is willing to sell at that price, and the trusted party is satisfied with the margin it applies to the purchase.

In one version, this app consumes all the raw data that is required to generate the classifications; in another, it receives a data feed corresponding to the predicates associated with the classifications. The latter is less privacy intrusive. A third alternative is that the application receives all the raw data, but does not export this beyond a computational environment controlled by the system, and then exports the predicates. This alternative is less privacy intrusive than the first version of the functionality, since it does not export the raw data, but more intrusive than the second, since it is conceivable that the third party application encodes some fact beyond the predicates into the data it exports. Careful software analysis on behalf of a marketplace run by the system can help limit this conceivable risk. It is also possible that the derivation of the predicate data is performed by a preference-determining third party that is not controlled by the third party consuming the preferences; this further improves the privacy assurance associated with the third alternative version of the example, since it lowers the risk of leaks.

In certain versions of the above example, there are illustratively three different types of service providers: the trusted party; the preference determining third party; and the third party that consumes preferences. The trusted party acts as an intermediary, and also as a privacy representative for the end user. The preference determining third party buys, processes and sells data. In the example above, the prices may be set on a per-transaction basis, both for the purchase and sale of data; however, other monetization methods are also possible, such as the trusted party receiving a share of the profits, or the preference determining third party setting its own prices.

The preference determining third party is an example of a third party that buys and sells data. The data it buys may be sensor data from one or more node networks; predicates related to such sensor data, generated by the trusted party; and/or data purchased from other third parties that buy and sell data (whether directly, or using the trusted party as an intermediary). The other type of third party in this example is a service provider that provides a service to users, where the service may be to set the home temperature in the most appropriate manner; to provide discount coupons or other advertisements selectively; or to perform other types of services.

This approach can be captured in a permissions request by clarification of the division of access between the two different third parties, where the data processing third party could be in a trust relationship with the data owner (i.e., user) that is different from the relationship between the predicate-consuming third party and the data owner. This is another aspect of illustrative privacy assurance methods herein; as it comes to the conveyance, division of abilities, and the ability to revoke access. The same approach can be used for capabilities, i.e., the ability to control the system of the end user.

The disclosed method supports permissions, whether of access to data (such as raw data and predicates) and of capabilities to control settings and actions. It does so on several levels. A user may have one agreement with the system. This may, for example, state that the system can access all the raw data from all the sensors and other connected data sources, and that it may sell aggregate and k-anonymous data, where k-anonymity corresponds to a privacy guarantee wherein the user cannot be distinguished from a number k of other users by scrutiny of the revealed/shared information.

It may alternatively state that some datum, such as image data showing a face, cannot be obtained by a central location of the system, but will be filtered out by the local installation, which is under the control of the system by having its software provided by the system. An agreement may state that the system may, further, use data to select coupons for relevant products, and convey these coupons to the user using one or more interfaces, such as postal mail coupons, in-app advertisements and/or SMS based coupons.

Some users may be offered a discount in response to approving more disclosure of data, such as the right to present the user with advertisements from third parties, based on data from the user that is analyzed by the system but not shared with the third parties. Another level of agreement related to data and capabilities relate to third party data processors, exemplified above. In one instance, these may be requesting permission to access the relevant data and to identify users interested in select activities, then identifying these activities to third party advertisers who can associate the activities (such as skiing, bowling or knitting) with the user and present advertisements.

Another third party data processor may request to be allowed to convey the simple fact that the user in question is in an environment that is controlled by the system, as this may be associated with a desirable demographics. Yet another third party data processor does not use any user data other than to compute the predicates (as described above), for which the third party data processor charges any data consumers interested in the predicate data. Third party data consumers, in turn, may also have data access agreements and capability agreements with end users, as given examples of above. Although a large number of agreements may be seen as confusing at first, the structuring of these agreements around ratings, and the highlighting of concrete descriptions of selections of these, in addition to other aspects as described in this disclosure, helps the user manage his or her privacy.

Moreover, the user may install software that manages his or her privacy according to a set of pre-set principles that the user selects, where these principles may correspond to the types of data that can be shared and the circumstances under which it may be shared. For example, this can be done in some embodiments by placing the type of data in context of the associated privacy impact (according to the ratings, potentially provided by a consumer ombudsman) and the intended use of the data (e.g., for advertisement, coupons, control, etc.), and whether the data is used for commercial purposes, a common good; the type of privacy (such as k-privacy for some set value of k such as 1000), etc.

A further example of a third party application is a billing service that measures the energy consumption associated with one or more network nodes and generates and attributes charges to one or more users. The trusted party determines the energy consumption, per outlet and/or node, for a registered node network, and reports this data to a third party. The energy consumption data may be delayed, e.g., by 48 hours, as a privacy protecting measure. This privacy protecting measure could be conveyed in the permissions request, e.g., "No data will be received in real-time. All data will be delayed by 48 hours." A user may optionally select another time delay as well, in the permissions request. The user is provided with registration instructions, which illustratively involves at least one of a smartphone/tablet app and a webpage, where the user is asked to enter payment data. This payment data is collected directly by the third party in one embodiment, and collected and maintained by the trusted party in another embodiment. In the first embodiment, the third party receives pseudonym data associated with the node network; this can, for example, be conveyed in the path of a URL, or provided by the user at configuration time. Alternatively, the trusted party can maintain this data and perform billing of the user according to indications provided by the third party.

The third party associates a collection of network nodes with an account, where the account is associated with at least one of the pseudonym for the installation, a pseudonym of the registered user, payment data such as credit card data or a PayPal user name, and associated data related to user approval to charge. The third party obtains energy consumption data and determines the cost associated with the consumed energy. This may be the actual cost to the payer of the bill, but the cost may also be computed according to another formula, e.g., the cost of using the outlet is $10 for any 24 hour period, no matter how much it is used, or the cost to run the water heater, exceeding $5 per day, is to be billed, but not any amount lower than $5.

The charging policy may be provided by or selected by a service subscriber, such as the user, a party paying the bills to the energy company, or provided in other ways. The charges may also include overhead, e.g., the amount to be paid to the third party and the trusted party. In one embodiment, there is no overhead, but the user agrees to other commercial use of the data, e.g., the user may receive advertisements or may have to qualify for an offer by providing demographic information or a discount coupon.

This aspect of the disclosure therefore enables the granular splitting of energy consumption costs, with applications to vacation rental properties, short term corporate rentals, dorm room energy billing, etc. A landlord may include a set amount of energy in the rent, e.g., up to one dollar a day, and the user/tenant would have to pay for any amount in excess. This protects landlords against abusive behavior, such as running the A/C with open doors and windows in the middle of the summer, or the mining of crypto currencies, unwanted charging of electrical vehicles or other highly energy-consuming activities that are not desirable.

In one embodiment, the trusted party acts as a payment network, taking payment from users and performing payments to other parties, including the third party, an owner/landlord, a party that subsidized the node network in exchange for a share of the profits, and/or the electricity company. Similarly, gas consumption is illustratively metered in an analogous way, or inferred from control data sent to gas consuming appliances. In addition, other utilities can be billed for using the disclosed system, including providers of telephone, Internet, TV, etc. The use of these resources can be determined by the node network in embodiments in which the node network is the intermediary used for control of the appliances. Other factors such as conveyance of signals can be used to detect usage.

The billing can be performed in a granular manner in which a user only pays for periods of time when he/she wishes to obtain the service, starting at the time of registration or other enablement, and ending at a preset time, when the user checks out or is detected (e.g., by GPS data associated with the application) as no longer using the services, or when another user registers to pay for the services.

The billing may involve selected outlets, switches, utilities, and usage patterns, but exclude others. A landlord in a location where winters are cold may demand that the thermostat never is set below 50° F., to avoid damage of the property due to freezing of pipes, and may accordingly pay for any heating that is necessary to bring the temperature to this threshold level, but not for energy associated with additional increases of the temperature. Accordingly, the system can determine the estimated costs for the landlord to pay based on the outdoor temperature; historical heating costs at various thermostat settings; user thermostat settings; user actions, such as keeping windows open in the winter; and additional or alternative factors.

The system illustratively also comprises a messaging system that sends notifications to interested parties. For example, a landlord may wish to know if the temperature or the temperature settings exceed or go below preset thresholds, or otherwise are anomalous; whereas the user may wish to know when the energy consumption rate exceeds a threshold value, or may wish to receive a notification every time the user has accrued another $10 bill, or any other amount, as set by the user. Some notifications are generated and transmitted by the third party, whereas others may be generated and transmitted by the trusted party. Notifications may either relate to exact consumption amounts or to estimates. Some notifications sent by the third party may be triggered by the trusted party, which is helpful if the third party receives sensor data and associated predicates in a delayed manner, or if two third parties are used for different utilities (e.g., gas and electricity) but the user has opted for a unified billing or notification.

In embodiments where the trusted party is engaged in payment processing and to ensure strict protection of credit card payment data, it is beneficial for the trusted party to interface with a third party that is a Payment Card Industry Data Security Standard (PCI DSS) compliant payment processor. The third party payment processor would obtain only the necessary session data associated with the business transaction in question and the session data associated with the trusted party system would not be exchanged.

This is another example of the method also described above, where a data-processing third party is distinct from a predicate-consuming third party; in the example relating to payment processing, the data exported by the data-processing third party is not predicates, though, but aggregate data corresponding to an energy quantity or a payment amount. Like the use of predicates, this aggregation of input data results in a privacy enhancement. This can be described in the permissions request simply by describing to the end user what different parties will obtain, and what they will output or export. Like for other types of data, users will find it easier to understand and give appropriate permission since the types of data correspond to conceptual quantities (e.g., "The payment processor will only receive information about the amount of electricity you consume on a day-to-day basis, and will not know when you used the electricity. Approve?")

Yet another example of a third party application is one implemented in the context of a residential or commercial alarm system that comprises a node network and an associated trusted party, configured to detect motion and presence and to optionally identify users based on MAC addresses of user devices and other data. The third party application in this example implements a third party service that receives data derived from the sensor data of the node network and determines whether a situation corresponds to a risk of a home invasion or other covered danger, and communicates with one or more users such as residents and/or landlords, and which also may communicate with law enforcement or private security companies. Such an arrangement is beneficial as it enables protection of residences and commercial spaces without deployment of special-purpose sensors, such as window-break sensors. Moreover, the disclosed technology is expected to result in lower operational costs, higher precision, greater opportunities for customization, as well as other advantages.

Multiple competing third parties can use different algorithms to infer risk from data derived from sensor data and auxiliary data provided by the users and/or their appliances and devices, such as a GPS device associated with a user vehicle. The accuracy of advanced sensor networks is expected to be much better than that of traditional systems, which typically rely on a very small number of sensors, most of which are battery operated, and therefore severely constrained in terms of computational capabilities, amount of data communicated, and other functionality.

The third party service provider may also provide additional sensors, such as one or more video cameras, and collect data from these additional sensors. Pre-existing sensors associated with the third party can also be incorporated in the system. This is illustratively done by enabling them to communicate with the node network. Such an arrangement can reduce service costs by avoiding the use of cell phone modems for the communication. It also simplifies the user interface as it can be configured to incorporate all access under a single portal, in the form of an end-user portal for accessing the node network and its associated services. This is illustratively an application for a phone or tablet, dedicated software for a laptop or desktop, or a webpage that is accessible to registered end users.

As in the previous examples, there are many options for what sets of permissions can be requested for data and predicates. For example, one third party service provider may request access to the MAC addresses observed by the system, whereas another may request access to predicates relating to a predicate that has only three values: no detected MAC addresses, the appearance of a recognized MAC address, and the appearance of a MAC address that is not recognized, where a MAC address is said to be recognized if it is associated with the installation and is understood to correspond to a legitimate resident or user. Thus, in this example, the actual MAC addresses would not be revealed, but only the classification into one of the three classes described above. As will be understood by a person of skill in the art, this is only one of the types of data required for the application; for the other ones, there are similar options in terms of the requested permissions. The generation of predicates can be performed by the system or by one or more third party data processors, as described above.

External data sources can be accessed using pull and/or push technologies. For example, a resource can provide the trusted party with API access to data for a particular feed or it can transmit updates using a push mechanism. Multiple mechanisms can be used at the same time, to conform to the communication methods already used by the external data source. For example, one external data source can transmit data using standard emails while another may access an API to the trusted party to upload data. The trusted party may mimic the format of an existing application. For example, to get calendar update data, the trusted party may generate an interface matching that of a mailbox, allowing the sharing with the trusted party. This mailbox may correspond to an existing email account of the user whose calendar data is to be uploaded to the trusted party.

The user can sign up for the service by requesting that calendar data be shared with an application corresponding to the trusted party, which illustratively mimics a mailbox or a calendar. Other example external data sources include vehicles and their infotainment systems, phones and their GPS systems, smart appliances that permit uploading of data or connection to services, which can be mimicked by the trusted party to simplify compatibility.

Systems that do not produce data, but instead consume data, can also be connected, such as smart light bulbs. By connecting these to an account of a user, and by permitting access by the trusted party, the user can control such devices from the same portal used to control the other nodes in the network. External units that both generate and consume data can be connected in a manner similar to that described above, and their data may be processed by the system; by one or more third party data processors; one or more data consuming third party applications; or a combination of these.

In contexts where third parties or users have data, such as sensor data from sensors they control, manage or distribute, or otherwise receive a feed from, these third parties or users can provide the sensor data to the trusted party, along with a policy describing how the sensor data can be used, and associated with a profile, e.g., a pseudonym or identifier associated with the installation or user. Additional data feeds can be imported to the trusted party in the same way, e.g., email feeds, calendar feeds, and social networking feeds. These can be requested or initiated by an end user associated with the data or data source, and can be associated with a specified policy of use.

One example policy of use is that the data is not allowed to be used to compute any predicate that is provided to a third party. Another example policy is that the data provided to a third party cannot possibly be used to determine personally identifiable information (PII). Yet another policy is that the data must not be associated with the identity of the user, but only with a temporal pseudonym relating to the user's data. A further policy can be a delegated usage policy, meaning the data can be used as seen appropriate by the trusted party, given that the user has a trust relationship with that party.

Other examples of policies include policies that specify what other third parties are allowed to access the provided data or predicates derived from it. These and other policies are illustratively selected by the user, but in some embodiments such policy selection can involve interaction with a third party providing certain types of data. Such approaches are beneficial as they can expand the sensor data from that related directly to sensor hardware associated with the trusted party, allowing essentially any data feed of a standardized format.

In one embodiment, the processing performed by third party service providers, corresponding to respective third party applications, is performed on a cloud platform or other computational platform controlled by or associated with the trusted party. Such a cloud platform may comprise, for example, a cloud hosting environment associated with the trusted party. This enables some degree of oversight and control by the trusted party, and also simplifies and speeds up the processing of sensor data and associated predicate data.

One form of oversight is that the trusted party can scan submitted apps or code units to determine that they comply with security and privacy requirements, similar to how app marketplaces screen apps before they are made available to users. Another is that the trusted party can determine when the apps pass messages to other entities, whether operating in the same platform environment or an external environment, and, under some circumstances, determine the nature of the messages.

In an embodiment with third party service providers' applications hosted within the trusted party hosting environment, it is beneficial to have operating agreements to safeguard the health, security, and privacy of the enterprise, such as security and privacy attestation by the third party, and security and auditability of third party code via the trusted party. Additionally or alternatively, the trusted party could be provided with administrative rights to enable, disable and remove hosted applications that could present an operational, security, or privacy risk to the enterprise or its users. The trusted party hosting environment can provide environment segregation so as to limit any potential scope of a security risk through the use and implementation of security best practices, industry standards and required governance compliance.

When multiple third parties are connected in a chain, e.g., consume each other's data, it is particularly beneficial for at least a portion of the processing to be performed in one computation environment, as opposed to in a distributed fashion. In one embodiment, at least portions of the computation are performed in computational environments that are not under control by or associated with the trusted party. This is beneficial for third parties that cannot or do not wish to expose at least some of their processing to the trusted party, or that rely on processing that is intrinsically external to the processing environment associated with the node networks. For example, an advertising network may use data from the trusted party to determine preferences of end users, but the application of this data to the selection of advertisements should illustratively be possible to perform on a computational platform controlled by the advertisement network or a third party associated with the advertisement network, as opposed to on the infrastructure controlled by the trusted party.

In this example, the functionality is partitioned into different aspects, some of which are performed external to the platform associated with the trusted party, whereas other parts are performed either on the platform associated with the trusted party or on another platform. There are processing benefits associated with performing at least some processing on the platform associated with the trusted party. Some of this processing is under the full control of the trusted party, i.e., the code is provided by the trusted party or associated entities, whereas other parts of the processing may be performed by one or more third party service providers on the platform associated with or controlled by the trusted party. A person skilled in the art will appreciate that a tight integration of processes, in which code associated with the trusted party and one or more third parties is executing on the same processing platform, results in benefits of many types, including but not limited to faster processing, lower communication costs, greater robustness, and better oversight.

In another example, there is a third party application that relates to a fire alarm. This application requests the following permissions from a user interested in installing it:
1. Access to information indicating high risk for fire.
2. Control over lights and speakers in case of a detected fire.
3. Full access to microphone data in case of a detected fire.
4. (Optional.) Access to location information including address.
5. (Optional.) Control over in-home emergency alert notifications.

Here, the first request item corresponds to a high-level predicate that reveals only a high risk for fire, but which may be based on temperature sensors, energy consumption sensors, motion sensors, microphones, and more. The second request item is a capability, namely the control over lights and speakers. This example capability is a conditional capability, where the condition is evaluated by the system, and access to control is granted only when the condition is satisfied. The third request, which in combination with the second item turns a home at risk into a giant intercom, allowing manual and automated messaging and guidance, is a conditional permission. The fourth item is optional, which means that the user can agree to request items 1-3 only and install the application without the associated functionality of request item 4, or the user can agree to all request items and also obtain functionality associated with request item 4. Request item 4 allows the third party application to notify emergency crews and direct them to the location of the fire. However, since item 4 is not conditional on a detected fire at the premises of the installation, it also allows the service provider corresponding to the application to identify a high risk of fire in the neighborhood, in spite of this not having spread to the location of the installation in question, and to notify the users of risk. This can be done using the capability corresponding with request item 5, which is not a conditional capability, and which allows the application provider to notify the user of danger. Request item 5 does not provide full access to the speakers, as the second request item does, but only access to transmitting pre-recorded and system-approved alerts. Like item 4, item 5 is conditional, and a user that chooses not to allow the capability of item 5 also chooses not to receive the alarm that is generated in response to a risk that is not related to the detection of fire on the premises (i.e., request item 1), but another risk. For example, item 5 may relate to a fire in the neighborhood, as mentioned above, but could also relate to other risks, such as a tsunami. This is not specified in this particular permissions request, but another application provider providing fire and tsunami alerts may have permissions that are different from the permissions described above.

Traditional permission requests are abstract and broad; for example, a user may be asked to grant permission to a service to see his or her contacts as well as all his or her email. It is hard for typical users to know what the actual privacy impact is from such a permission, and many people do not realize the types of abusive-feeling behavior they are agreeing to, as a result.

The privacy associated with the disclosed methods benefit from user-understandable quantification of data disclosure, where the data disclosure is typically limited to more concrete and much more limited quantities. For example, a service provider may request permissions to microphone data, but only after the system has detected an attention phrase (such as "Ok Google" or "Alexa") or corresponding action (such as pressing and holding down a button for two seconds), and only for the duration of a verbal request (e.g., ending as the user stops speaking or after a maximum period, such as 30 seconds). This is much more limited in that unconditional microphone access is harder to abuse, and can be expressed as a simple and concrete permissions request, e.g., "Do you want to grant access to your microphone for up to 30 seconds after the system detects a request from you?" Here, the system would listen to the microphone data all the time, but would not process or share data until the attention phrase (or action) is detected. While the concreteness is beneficial, it is not necessary, however. For example, consider access to a combination of sensor data and other potential data, and refer to this particular combination as "the gamma data". A user can be asked if he wishes to grant access to the gamma data to a third party. Whereas gamma data does not mean anything to users today, and may be too complex and abstract to explain in a meaningful way to all but experts, many users would be willing to agree to granting full access to gamma data to an entity they do not have reason to mistrust, provided a person or organization they trust would support the sharing of gamma data. This way, complex or abstract collections of data can be given a name, experts can analyze the privacy implications and publish opinions, and rating agencies and consumer ombudsmen can publish privacy impact numbers (e.g., "Sharing gamma data has a privacy impact of 4.3 according to your collection of trusted authorities.")

Turning now to the generation of predicates from sensor data and other data sources, this can be done in a variety of ways, and result in a variety of predicates, which can be used to convey permission requests, enable permissions, and then, to perform processing in third party applications.

Additional illustrative embodiments will now be described with reference to FIGS. 9 through 11.

Figure 9:
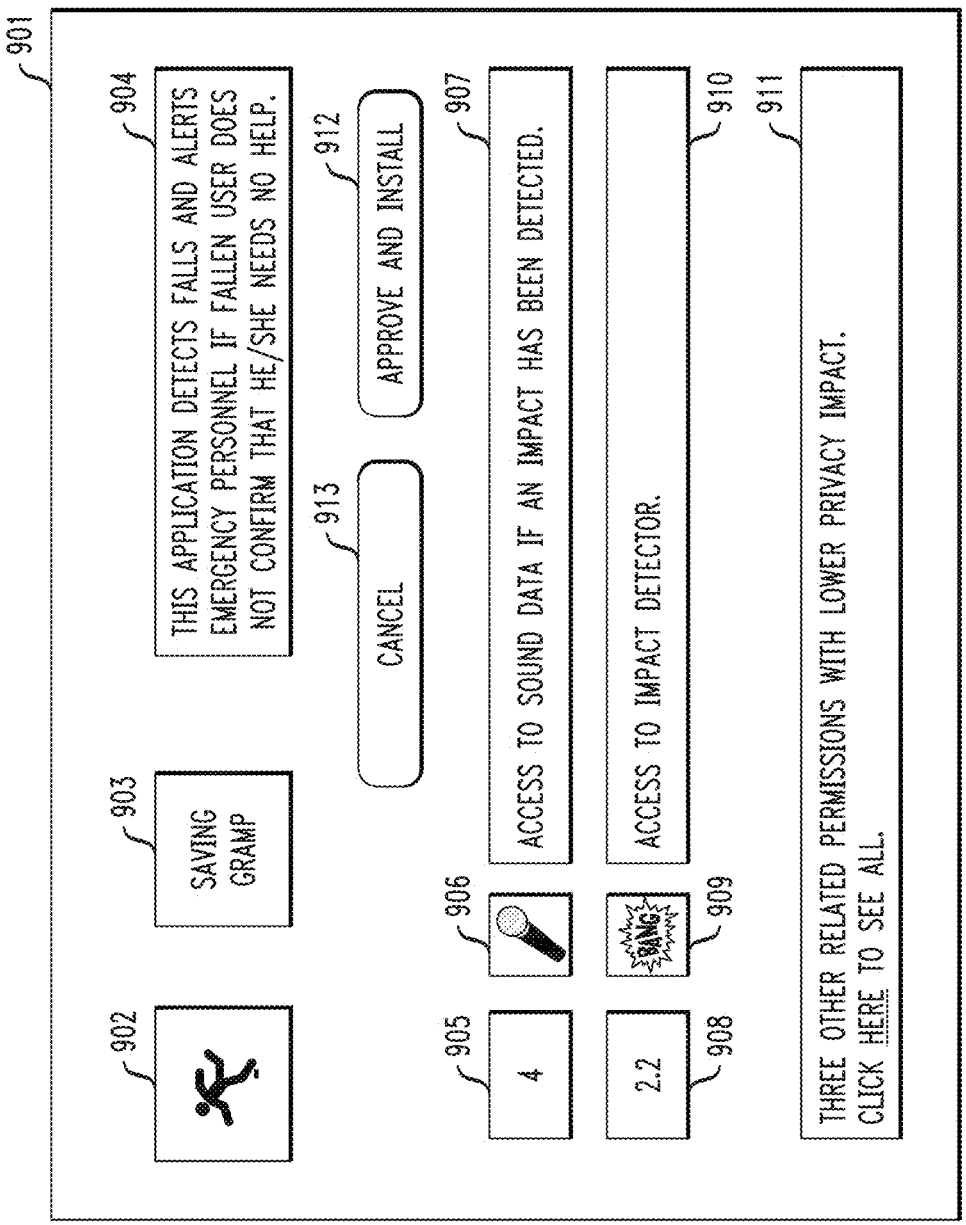
FIGS. 9 and 10 show examples of user interfaces including permission requests generated in accordance with techniques for privacy enhancement using derived data disclosure in illustrative embodiments.

FIG. 9 shows an example user interface, including a window 901 showing a service provider or app logo 902, a service provider or app name 903, a service or app description 904, a first privacy rating 905, an image 906 representing the type of sensor data associated with the first privacy rating 905, and a first permission description 907 associated with the first privacy rating 905. Further, the figure shows a second privacy rating 908, an image 909 representing the type of sensor data associated with the second privacy rating 908, and a second permission description 910 associated with the second privacy rating 908. The user is informed in dialog box 911 that there are additional permission requests of similar types but of lesser privacy impact, where additional details can be obtained by following the instructions. If the user approves of the service provider/app represented by logo 902, name 903, and description 904, and wishes to grant access to the data corresponding to the permission requests described in descriptors 907 and 910, then the user clicks on clickable button 912, which initiates the access provision to the user data according to the description associated with the information displayed in window 901. The user may also decide not to grant access by clicking on button 913.

Figure 11:
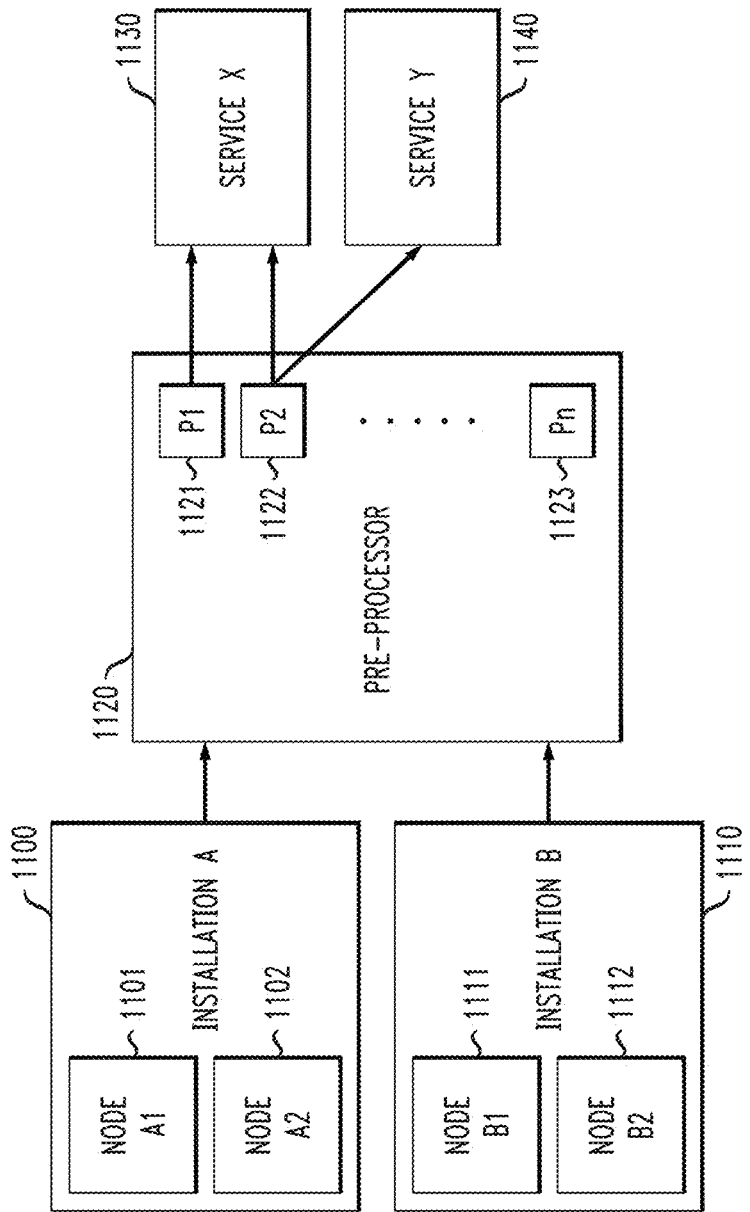
FIG. 11 is a block diagram of an information processing system with functionality for privacy enhancement using derived data disclosure in an illustrative embodiment.

The data corresponding to descriptor 907 and 910 correspond to predicates P1 1121 and P2 1122 of FIG. 11, where a predicate is one of a combination of data from nodes A1 1101, A2 1102, B1 1111 and B2 1112 of FIG. 11; an obfuscation of data from nodes A1 1101, A2 1102, B1 1111 and B2 1112 of FIG. 11; or another function of data from nodes A1 1101, A2 1102, B1 1111 and B2 1112 of FIG. 11. Some predicates, such as predicate P2 1122, correspond directly to at least some of the output of a node such as node A2 1102, without any combination or obfuscation performed.

Figure 10:
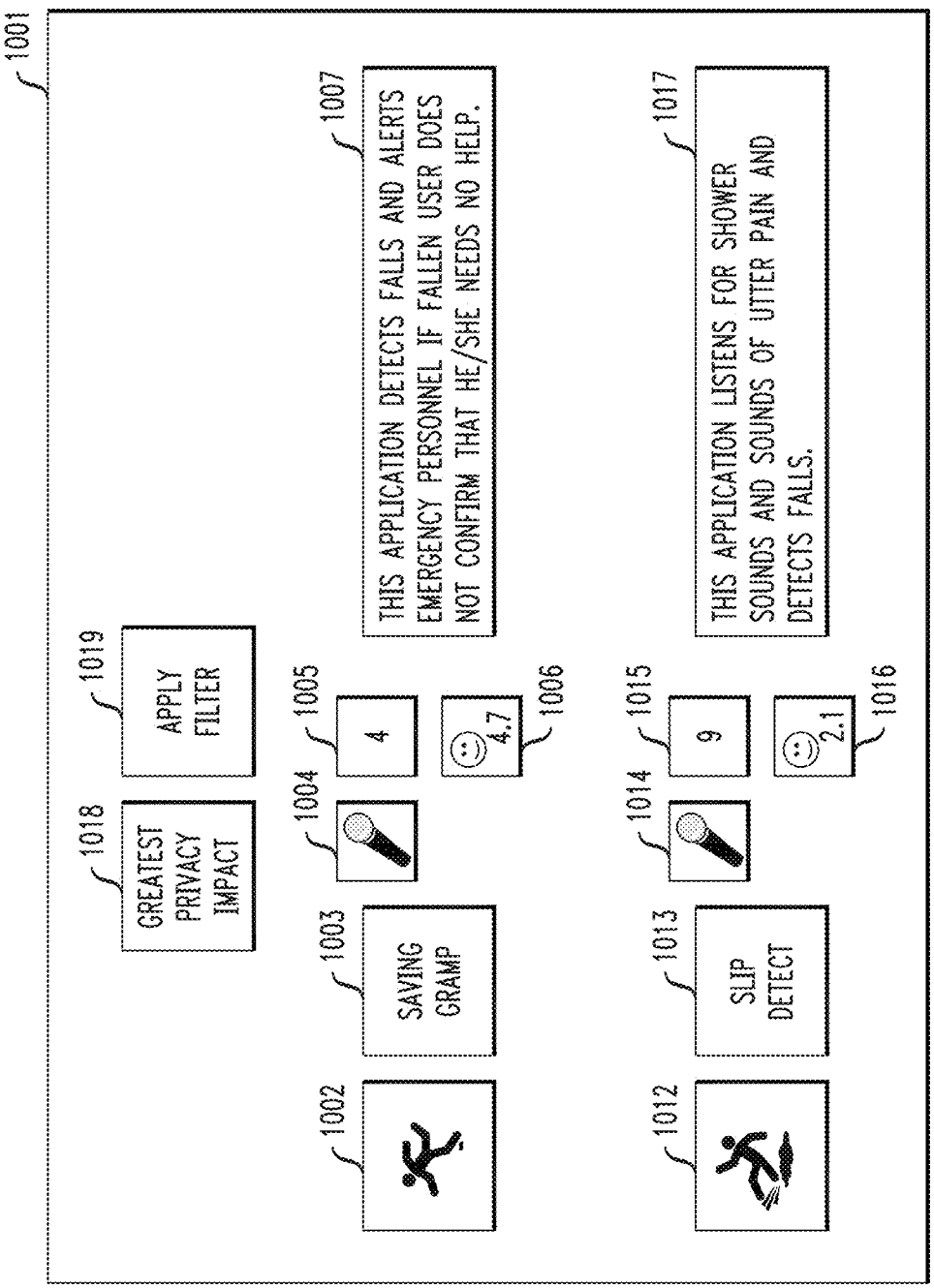

FIG. 10 shows an example user interface, including window 1001 showing the logos 1002 and 1012 of two service providers, the names 1003 and 1013 of the two service providers, service descriptions 1007 and 1017 of the two service providers, and privacy indicator icons 1004 and 1014 indicating the type of data request that corresponds to the highest privacy impact, where the ratings 1005 and 1015 are the corresponding privacy impacts of the requests with highest privacy impact. Ratings 1006 and 1016 show the user-provided ratings for the two services relating to their experience with the provided services. Indicator 1018 explains the meaning of icons 1004 and 1014 and associated ratings 1005 and 1015; indicator 1018 is clickable, allowing a user to select another criteria of comparing the services. Clickable indicator 1019 allows a user to apply filters, such as only showing services with a user rating exceeding a threshold value such as 3 out of 5, only showing services with privacy impacts below 7 out of 10, etc. By reviewing the information shown in window 1001, the user will see that the first application, corresponding to logo 1002, has a more favorable user rating 1006 than the second application corresponding to logo 1012, whose user rating is shown in box 1016. The user can also see that the privacy rating 1005 of the first application is more favorable than the privacy rating 1015 of the second application. Additional information, not shown in the figure, can indicate purchase price, whether the user will receive coupons, whether the user will receive advertisements, and whether there are in-app purchases, which correspond to additional features that the user can select. Example additional features include features such as automated logging of alerts, notification by email, removal of advertisements, etc.

FIG. 11 shows installation A 1100 and installation B 1110, which are two independent sensor network installations, comprising node A1 1101, node A2 1102, node B1 1111 and node B2 1112. Each node comprises at least one sensor. Installation A 1100 transmits data related to at least one of node A1 and node A2 to pre-processor 1120, and installation B 1110 transmits data related to at least one of node B1 and node B2 to pre-processor 1120. Pre-processor 1120 generates predicate P1 1121, predicate P2 1122 and predicate Pn 1123 and transmits predicate P1 1121 and predicate P2 1122 to service X 1130, and predicate P2 1122 to service Y 1140. Predicate P1 1121 is a function of data obtained from installation A 1100, and is provided to service X 1130 since a user associated with installation A 1100 has granted permission for service X 1130 to receive access to predicate P1 1121. If the user retracts this permission, service X 1130 will no longer receive access to predicate P1 1121. Access to predicates by service X 1130 can be performed either using a pull or a push architecture, as can the access to data from Installation A 1100 by pre-processor 1120.

Additional illustrative embodiments will now be described in further detail with reference to FIGS. 12 through 17.

These embodiments are advantageously configured to provide an architecture aligning terms of service with permissions.

As indicated previously herein, user privacy is, increasingly, a source of contention. There is an often-tense relationship between data originators (such as end users) and data consumers (such as advertisers and service providers.) Another aspect is the difficulty with which privacy can be quantified and understood, and therefore compared. This difficulty aggravates the tension by encouraging predatory behavior among data consumers.

At the heart of the problem is the way in which data, permissions to the data, and algorithmic objectives are handled. With the increased deployment of IoT installations, with their associated massive growth of data, this problem is bound to get worse unless addressed in a thoughtful manner. Illustrative embodiments herein provide a foundation for a structural change to improve privacy. Approaches disclosed herein constitute an important alternative to increased regulation as well as an opportunity for big-data companies to improve their image in the eyes of the public.

Privacy is notoriously difficult, both to enforce and for users to understand. From the perspective of typical end users, EULAs are hard to comprehend due to their use of legalese and rarely read simply due to their excessive length. However, brevity by itself is not the answer to the problem, as demonstrated by the permissions users have to grant third parties for these to get data access. While these fit comfortably in a small pop-up window, they are much too broad to be meaningful—for example, typical permissions may grant access to all emails, all data related to contacts, and all location information—without any explanation of how the data will be used or why it is needed.

As a result of privacy agreements—whether in the form of EULAs or permission requests—being hard to comprehend for typical end users, it is also hard for these users to evaluate whether a company's use of their data is reasonable. Similarly, it is near-impossible for users to compare the privacy impacts of two competing products. This leads to poor choices, often motivated by fear or fatalism, and to widespread disappointment with the seemingly predatory behavior of service providers. This perception of abuse is often well founded, and is fueled by the over-broad access to data as much as it is by a lack of appreciation among companies of the importance of offering meaningful privacy assurances.

Most companies argue that being quick to the market is more important than providing solid privacy protections, since being late might mean not getting any customers—and without customers, any privacy expenditure would be a wasted effort. Instead, companies protect themselves against the risk they are exposing themselves to—namely a risk of being named in a lawsuit—by broad and demanding EULAs, which closes the loop and fuels the rise of the problem.

This is a worrisome situation, and it is our belief that without strong efforts to break this negative cycle, things may soon spiral out of control. This is not only for the reasons outlined above, but also due to the rapid growth of data collection in the context of IoT, including wearable technology and home and office automation technologies. With dramatically greater varieties and quantities of data, much of which is sensitive, there is a tangible risk of abuse—especially as corporations and political entities increasingly wake up to the competitive advantages they can attain by profiling users—and an environment in which very little holds them back.

In the following, we briefly ground our effort in stated end-user preferences and formalize these in terms of a set of technical goals. This is followed by an architectural overview; and then by a description of user interfaces and permissions. We then explore one way to bootstrap privacy impact estimates, followed by a review of expected consequences of the deployment of our general system.

With regard to technical goals, we will now outline how illustrative embodiments herein address the current privacy situation, starting with an overview of end-user priorities and continuing with a list of goals.

As part of the effort leading up to the design of the technical constructions of some embodiments herein, we performed surveys among users on Amazon Mechanical Turk (MTurk), a popular crowd-sourcing platform. In one representative survey, we asked 254 MTurk workers the following two questions relating to the use of end-user data:

Question 1. *Company* determines the temperature in homes using their thermostat and compares that to energy consumption. This way, users can be notified if their insulation appears to be poor, causing them to pay unnecessarily high gas and electric bills. Is that reasonable? (Choose all that apply.)

The options subjects could choose from (ordered here in terms of order of decreasing commonality) were:

1. This is ok as long as everybody knows this before they buy a *Company* thermostat. (Selected by 52%.)
2. This helps the conservation of energy, which is good for society. (Selected by 52%)
3. This could be useful, especially if *Company* could also find local deals for insulation and suggest reputable contractors. (Selected by 43%.)
4. Most people know already whether their insulation is good or not, so this is pretty useless. (Selected by 8%.)
5. This is abusive. (Selected by 6%.)

Question 2. Google uses search queries to detect and predict flu outbreaks. When many people in one zip code search for "headache," for example, that is indicative of a rise of infections. Is this reasonable? (Check all that apply.)

The options subjects could choose from were:
1. The data is anonymized and is not even very sensitive, so this is not a problem. (Selected by 58%.)
2. This is a public service and should be applauded. (Selected by 31%.)
3. Google serves targeted advertisements based on search requests, too. This is not acceptable. (Selected by 26%.)
4. Google should not be allowed to use any search data without explicit user permission. (Selected by 25%.)
5. I do not use Google exactly because of things like this. (Selected by 4%.)

Out of the respondents, 41% were women and 59% men; 1% were 18-20 years old; 36% were 21-30 years old; 38% were 31-40 years old; 13% were 41-50 years old, and 11% were 51 years or older. 1% preferred not to disclose their age, and 54 were MTurk Masters. All were U.S. residents.

While the number of subjects in the survey is rather small, the findings are informative. They tell us, first of all, that informed consent is critical ("ok as long as everybody knows this before they buy" and "should not be allowed . . . without explicit user permission".) A second valuable insight is that use of personal data is generally acceptable if the resulting outputs do not reveal personal data ("data is anonymized and is not even very sensitive")—especially if there is a societal benefit ("which is good for society" and "a public service . . . should be applauded".) Another interesting observation is the preference for coupons over advertisements, suggesting the perceptional value of direct end user benefits in comparison to indirect benefits.

At the heart of the problem is the notion of permissions, and aligning these both with end-user needs and functional requirements. To make this possible, illustrative embodiments herein restructure permissions to fit the following example categories:

1. Conceptual Permissions. As far as possible, permissions should correspond to accessible mental concepts. For example, users will readily understand the privacy impact of a third party being able to determine whether two people trying to locate each other in a busy mall are headed towards each other or not—this corresponds to a clear mental concept. On the other hand, it is much harder to understand the privacy impact of this third party being able to identify the location and social network of users having opted in. This is not only because the latter set of permissions is broader, but it also enables many unspoken combinations of the data. As the number of data sources increase, this burden of understanding the impact snowballs; in contrast, with conceptual permissions, it does not.

2. Purpose-based Permissions. It is beneficial to tie permissions to functional purposes. When end users are able match the contents of a permission request to their understanding of the delivered functionality of an application, this is helpful. For example, if a dictation application asks for access to microphone data, the reason will be clear to most end users; however, if the same application asks for access to microphone and location data, this is not clear.

3. Conditional Permissions. A conditional permission corresponds to the right to access data when a particular event takes place. For example, many end users are likely to find it unreasonable for a fire alarm application to have access to microphone data, and an ability to control speakers; however, if these rights are tied to a situation in which a fire is detected and the fire department called, most end users are likely to find the access request much more reasonable.

4. Differentiable Permissions. Permissions that can be differentiated allow a comparison of at least two distinct sets of permissions, side by side, by a typical end user, allowing the end user to determine the relative desirability of the two or more sets. Permissions that are differentiable support a race, among data consumers, to a low-impact use of data by allowing for direct comparison. Thus, a data consumer with a broad permissions request (and, accordingly, privacy-invasive abilities) would be seen as less desirable than a data consumer with a less broad/invasive request.

Figure 12:
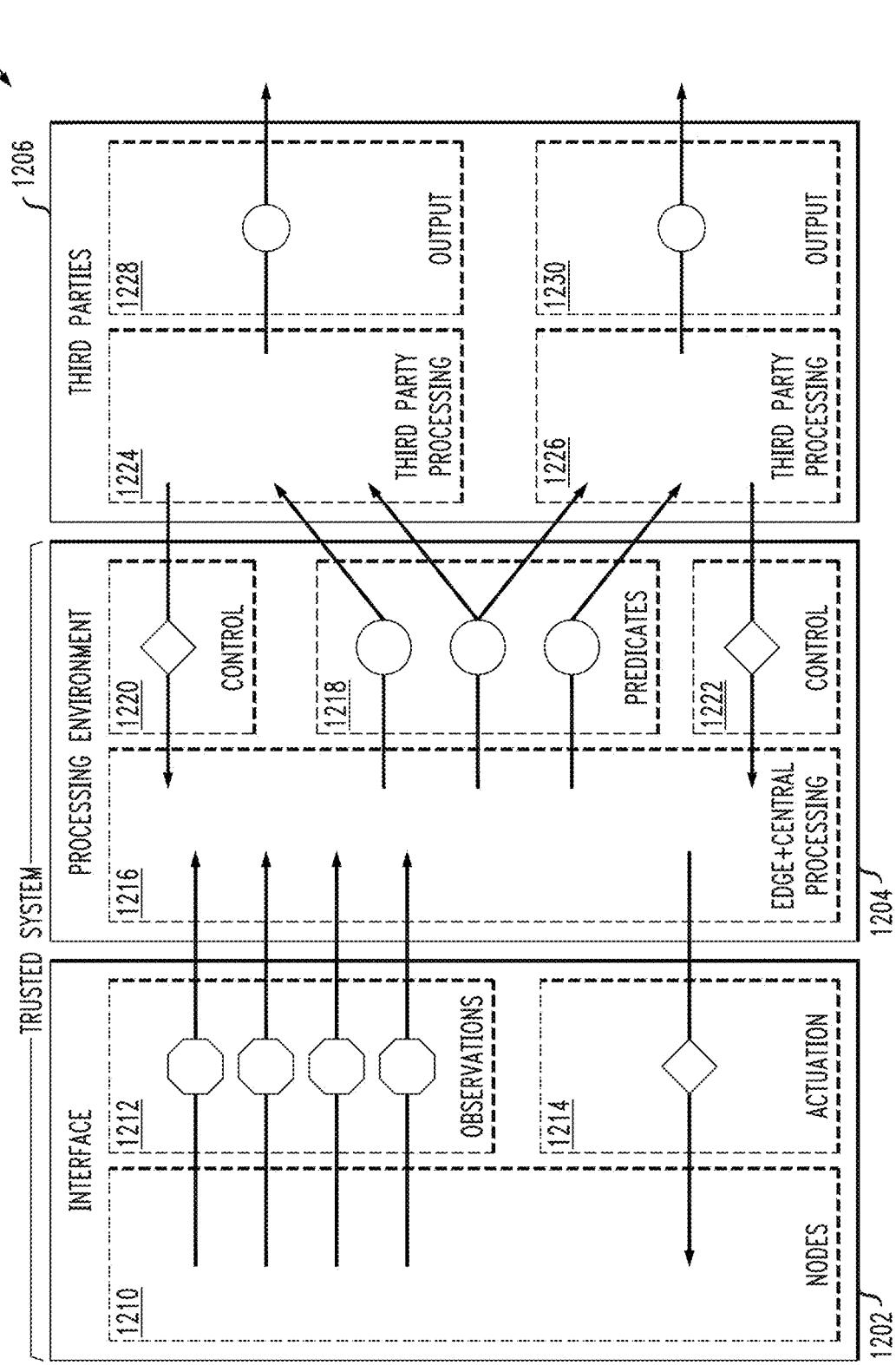
FIG. 12 is a block diagram of another information processing system with functionality for privacy enhancement using derived data disclosure in an illustrative embodiment.

Referring now to FIG. 12, an information processing system 1200 configured in accordance with an example architecture supporting improved privacy is shown. The system 1200 in accordance with the architecture illustratively comprises an interface 1202, a processing environment 1204, and a set of third parties 1206.

The interface 1202 illustratively comprises a set of nodes 1210, each of at least a subset of which has one or more sensors and/or may be controlled using techniques disclosed herein. For example, an outlet or a switch may correspond to a node, and may include sonar/microphone, wireless radio units, temperature sensors, humidity sensors, particle sensors and/or energy consumption sensors; and permit remote switching and dimming. The interface 1202 generates observations 1212 which are transmitted to the processing environment 1204, and receives actuation control signals 1214 from the processing environment 1204.

Data observed by the interface 1202 includes observations 1212 transmitted to edge and/or central processing components 1216 of the processing environment 1204. Accordingly, the processing environment 1204 can be part edge-computing, part central computing (which, in turn, can be implemented both using dedicated servers and cloud computing approaches). The processing environment 1204 receives observations 1212 (such as sonar and wireless data) and creates interpretations of the data (such as an indication that a known user enters a room); these interpretations are examples of what are more generally referred to herein as predicates 1218. The system 1200 can then actuate based on the predicates 1218—for example, it may determine that if person A (who likes it warm) is in a room, but person B (who likes it cold) is not, then the temperature should be set higher than if person B is present but person A is not. The processing environment 1204 can also grant access to the computed predicates to third parties 1206, which can then provide actuation requests to control components 1220 and 1222 of the processing environment 1204 for the system 1200 to act on.

The third parties 1206 include respective third party processing components 1224 and 1226, and respective output components 1228 and 1230. A given one of the third parties 1206 receives data from the processing environment 1204 and uses this to perform a service. Traditionally, the data the third party receives is broad—such as all data of some types, generated by the user. This is a contributor to the privacy problem as the capabilities that come with very broad data access are poorly defined, from the perspective of the end user and the trusted party, neither of which can know for sure how the data is used. In illustrative embodiments herein, third party providers such as third parties 1206 would receive predicates instead of raw data. Since these predicates are much narrower than the underlying raw data, this results in immediate privacy benefits. Given the importance of third party processing in extending new functionality to end users, and the fact that many third parties are much less known than the trusted parties themselves, limiting data access of third parties has a profound effect on privacy by itself, irrespective of the re-architected permissions of illustrative embodiments, which will be described in more detail below.

The nodes 1210 of the interface 1202 generate observations 1212 for delivery to the processing environment 1204, and receive actuation commands and other actuation control signals 1214 from the processing environment 1204. The processing environment 1204 computes predicates from the observations 1212. These are used to perform services, whether by the processing environment 1204 or by one or more of the third parties 1206. The services result in actuation and in information output—such as automated calls to emergency response, selections of advertisements or coupons, and generation of anonymized user statistics. The processing environment 1204 and third parties 1206 maintain state, e.g., for purposes of personalization. Privacy is defined relative to the third parties.

For the sake of simplicity, we assume herein that the two processing environments—the edge computing environment and the central processing environment—are controlled by one and the same party, which we refer to as the trusted party. The choice of this name is made to reflect that in typical environments, the end users have to trust the party that controls the software governing the collection of data and actuation of the end-user system: if the user were not to trust this party, she would have to write the software herself. However, there may be systems in which the edge computing and the central processing are not controlled by the same party; while that further adds requirements and constraints, it does not result in a solution that departs from the principles described herein.

Thus, the architecture we describe in the FIG. 12 embodiment does not protect user data against the trusted system; doing so is a near-impossible problem given that typical users do not have the technical skills to determine what the trusted system truly does, even if provided with source code. Instead, we focus on the somewhat more tractable problem of protecting user data, observed by the trusted system, against third parties. The trusted system may comprise an IoT installation, a laptop, an operating system or a search engine, or combinations of these and other components, while the third party may comprise an advertiser, a content provider, a burglary alarm system, or some other form of service provider.

The FIG. 12 architecture supports sharing of data with third parties, while also limiting the exposure of end-user data to these third parties. One benefit of this example approach is that sharing predicates instead of raw data reduces the privacy impact, since the predicates are aggregations of data from which the raw data cannot be computed. The move to sharing of predicates with third parties, instead of raw data, can be seen as a shifting of computational responsibilities from third parties to the trusted party (and typically, to the central processing environment).

Sharing predicates instead of raw data is only meaningful as long as the predicates are useful. It is believed that many, if not most, third party applications can operate using predicates instead of raw data. Accordingly, we will now describe a set of predicates and describe how these can be used in a broad collection of third party applications.

For sake of concreteness, we will focus in the example context of home automation, but note that the very same set of principles apply to commercial settings. Moreover, we believe that these methods are also applicable to "traditional" privacy contexts, such as services related to email events, web browsing events, and more, but do not focus on these contexts in the FIG. 12 embodiment.

Consider the following example first-order predicates, which are predicates derived directly from raw sensor data:

1. Presence. The presence predicate identifies that a person is present at a given location, where a granularity aspect may be used to signal the location within a room; as an entire room; or as a larger space. The trusted system may determine the presence predicate using sonar, wireless radio, and interactions with controllers.

2. Layout. The layout predicate identifies distinct portions of a space; assigns them names based on their observed uses; and details how they are connected to each other. The latter can be determined by identifying movements of users and their mobile devices over time, thereby determining what rooms are connected to each other and what rooms have entrances from the outside. For example, the presence—identified based on energy consumption patterns—of a microwave oven suggests that a room is a kitchen, while the presence of a sleeping person during the night suggests a room is a bedroom. By combining multiple heuristic assessments of this type, a good description of the space use can be established.

Figure 13:
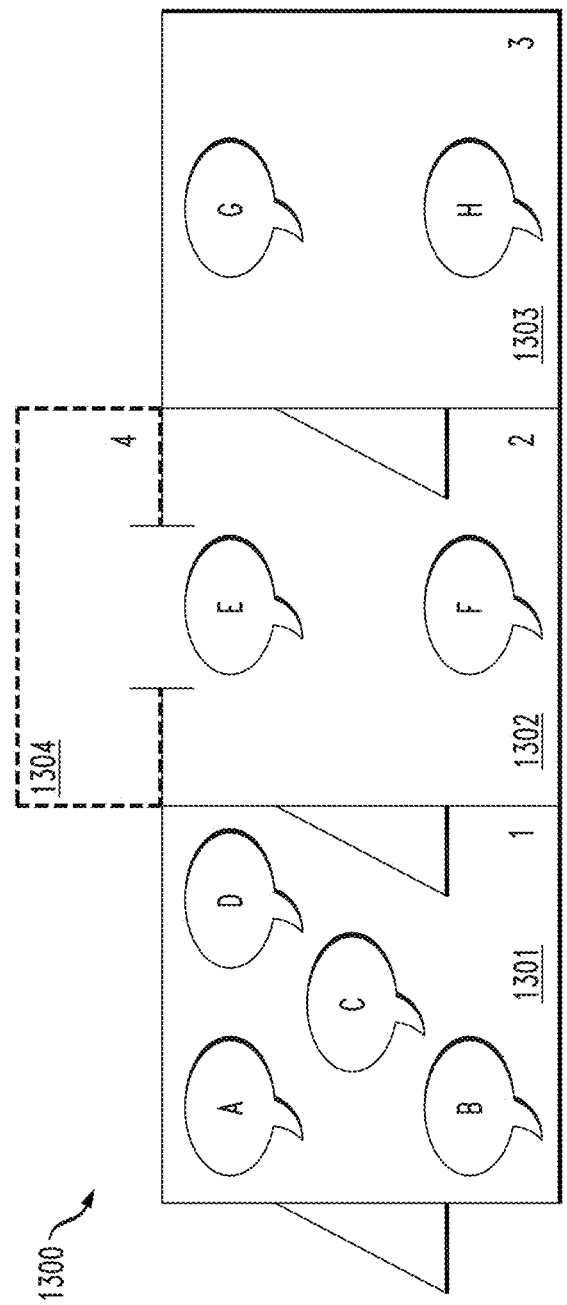
FIG. 13 shows an example layout of an area comprising multiple sensor devices in an illustrative embodiment.

An example layout is shown in FIG. 13. This figure illustrates an inferred layout 1300 of a space comprising four separate areas, denoted 1301, 1302, 1303 and 1304, also referred to by respective numbers 1, 2, 3 and 4. The letters correspond to sensor nodes, whose relative locations are determined based on correlating signals and time series of signals. In this example layout, area 1 has four sensor nodes, two of which (A and B) detect a person with stronger signal than the others (C and D) as he/she comes in from the outside. As a person goes from room 1 to room 2, the signal is always strongest with node D right before the person is detected by sensor nodes E and F, at which time the signal from A and B is weak. This pattern of detection allows for an approximate identification of the size of room 1, as well as the relative locations of the four nodes in the room. The system knows that there is a door between room 1 and 2 and one between room 2 and 3, as sounds are sometimes detected within all rooms, and sometimes only within one of these three rooms. Room 4 does not have any sensors, but is distinguished from the outside by the fact that a user who leaves room 2 without entering rooms 1 or 3 always returns to room 2 within a short time—the same is not true for a person leaving to the outside from room 1. A user in room 3 always leaves this rooms to enter room 2; therefore, the system knows that room 3 has no exit to the outside.

3. Activity. The activity predicate describes what is happening in a space, such as, sleeping, watching TV, cooking, playing music, etc. It can be derived from movement patterns, sounds and energy consumption patterns; the activity predicates may be grouped in categories and subcategories, where the latter could, for example, identify the type of TV program—for example, "watching soccer," "watching football," "watching news", "watching cartoons"—all of which can easily be determined based on analysis of the frequency distribution of detected sounds.

4. Pseudonym. The pseudonym predicate is a long-lived label (such as "user 3," "adult," or "recognized party") that can be used for purposes of configuration while hiding the underlying user identity from the third party. Accordingly, the system may offer different types of pseudonym predicates to third parties.

In some implementations of system 1200, the pseudonym predicate can be determined by the trusted system by mapping a long-lived wireless identifier (such as a MAC address or a Bluetooth device identifier) to a local pseudonym or descriptor. By making mobile devices consumer centerpieces in terms of control and automated personalization, automated user identification and tracking will become within reach even for entry-level systems, and based on this, generation of pseudonyms can be performed.

Although automatically determining age or gender may be beyond the reach for typical consumer systems, it is easy to produce such predicates in some embodiments herein simply by combining registration data (e.g., of user accounts associated with various mobile devices) with the device detection. While imperfect, these classifications are likely to be correct most of the time, and therefore useful.

The example predicates above can be used in a variety of ways. For example, the presence predicate combined with the pseudonym predicate can be used to provide customization—of light intensity and temperature, for example. Combining these two predicates with an activity-related predicate, a third party can identify an opportune time to send a discount coupon for a meal delivery service, or generate an advertisement that appeals to users who watch soccer on TV. In addition to the example predicates described above, related to movement and activity, the system 1200 can generate first-order predicates relating to safety (e.g., risk for fire); health (e.g., risk for mold), and many others.

The system 1200 is also configured to generate second-order predicates. Second-order predicates are predicates that are derived from other predicates. For example, if the system 1200 has generated predicates for presence pseudonyms, it can determine if an arriving person is recognized. If so, it generates a second-order predicate that we may call known-person-arrives, while if an arrival is detected without the arriving person being detected, it generates a second-order predicate that we may call stranger-arrives. Such a predicate is very useful for a third party that implements a service for home intrusion detection; it could, for example, be used both to automatically disarm an armed system (when a recognized person arrives) and to sound an alarm if the system is not manually disarmed within some set time.

Another example of a second-order predicate is a predicate that corresponds to the presence of a person in a room without an entrance/exit to the outside, without this person having first been detected in an adjacent room. This predicate, which utilizes the layout predicate in addition to a time series of the presence predicate, can be used to identify another possible intrusion—namely a person potentially climbing in through a window. This may result in a third party service generating an alarm—even if the system was not already armed.

Yet another example of a second-order predicate is one that uses size estimates corresponding to the layout with temperature data and energy consumption data—from multiple different homes or offices—and identifies locations where there may be a need for better insulation, based on identifying unusually high energy costs. Without disclosing the underlying data sources, the trusted system can share predicates relating to locations with need for improved insulation—for example, with resellers of insulation products—or generate coupons that home owners can use to get discounts for selected insulation products.

On a more general level, second-order predicates may also capture demographic insights, preference classifications, and other similarly complex notions.

Second-order predicates have a lesser impact on privacy than the predicates they are derived from, just like predicates have a lesser impact on privacy than the raw data from which they are derived. This is because as data (whether raw data or first-order predicates) are combined or aggregated, information is irretrievably lost; as data is processed in this manner, it becomes increasingly conceptualized.

However, the fact that different predicates have different privacy impacts is an important observation, as this invites a quantification in which the trusted system—or a third party, such as a consumer representative—generates privacy impact ratings of different predicates, allowing an easy comparison of third party applications in terms of the sensitivity of the data they require access to. This will be described in greater detail below, in aspects of illustrative embodiments relating to connecting predicates and permissions.

One benefit of the use of predicates is the sharing of aggregated data instead of raw data, as described previously. Another and more significant benefit, which we will detail herein, is to make permissions comprehensible—and therefore actionable.

With regard to conceptual permissions, while raw data does not lend itself well to be understood—at least not by typical originators of the data—predicates have the potential of being conceptual. This means that permissions, based on conceptual quantities—we refer to this as conceptual permissions—are useful for end users having to determine whether to grant access or not. Examples of permission requests based on these and other techniques disclosed herein are shown in FIGS. 14 and 15.

Figure 14:
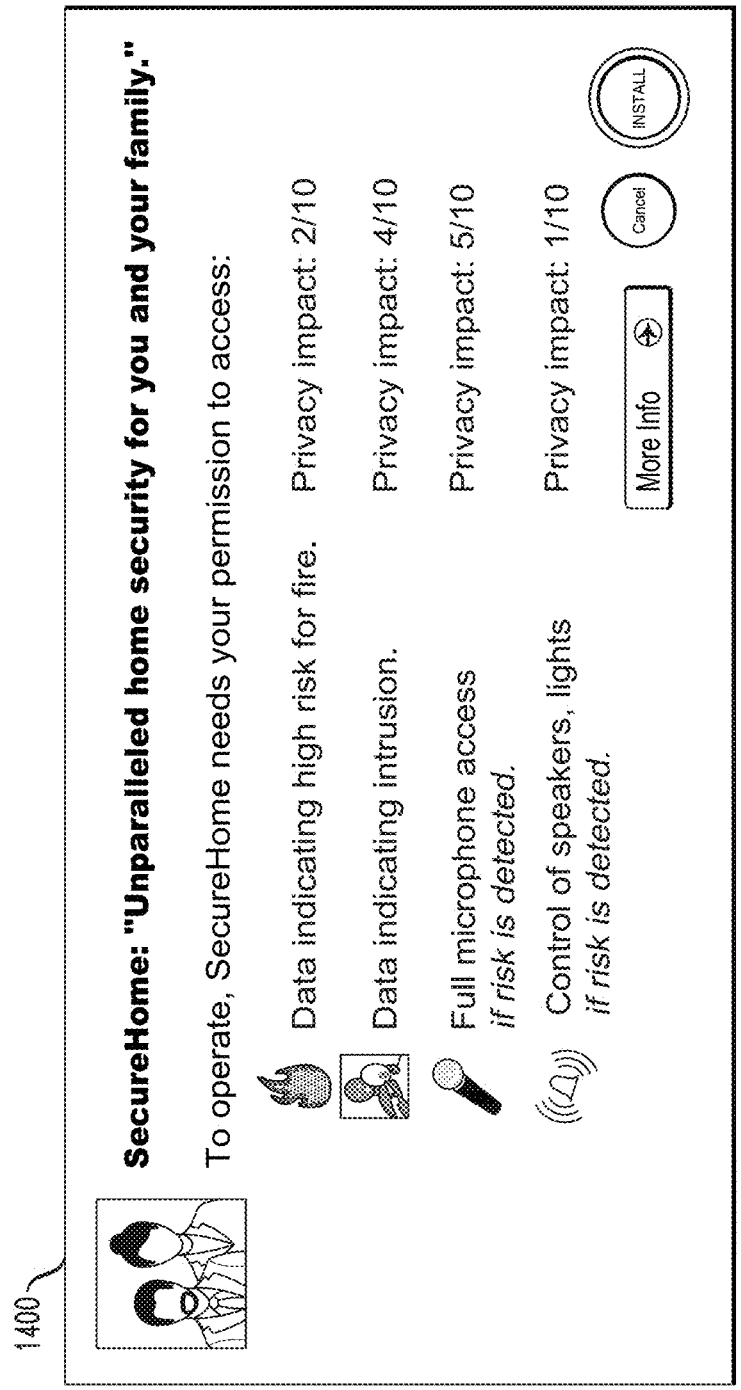
FIGS. 14 and 15 show additional examples of user interfaces including permission requests generated in accordance with techniques for privacy enhancement using derived data disclosure in illustrative embodiments.

FIG. 14 shows an example of a conceptual permission request 1400, illustratively generated by the system 1200 and presented on a display screen or other user interface of a user device such as a computer or mobile telephone. The icons represent the types of predicates being requested, and the texts to the right of the icons describe the requests and their estimated impact on the user's privacy according to some metrics. The permissions are conceptual in that they allow a user to understand what type of data is being requested, and they are purpose-based in that the permissions help the user align the requests with the functionality of the application. The third and fourth request, in addition, are conditional, in that the data/control is accessible only in conjunction with the occurrence of specified events (e.g., detection of a sufficient level of risk). The use of juxtaposed privacy impact ratings permit differentiation between the various permissions that may be granted.

Figure 15:
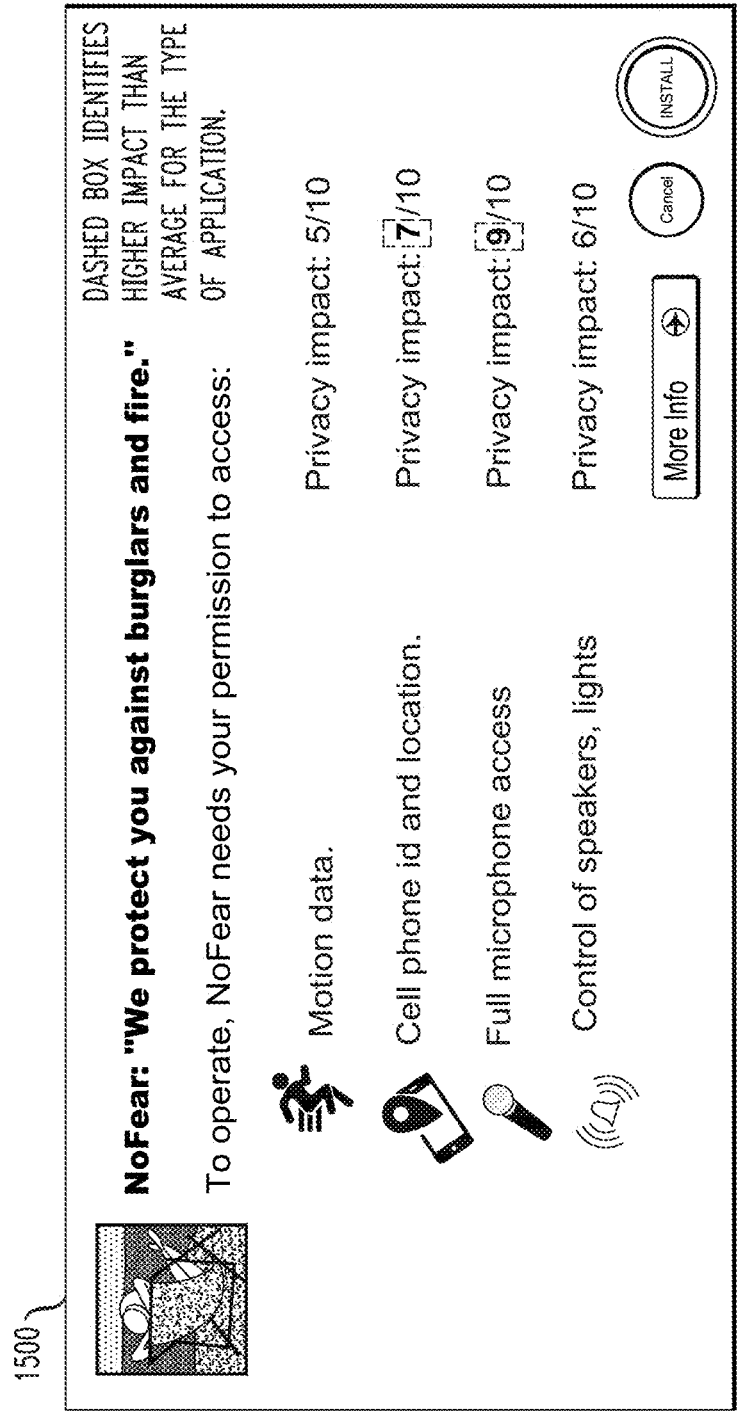

FIG. 15 shows a second example permission request 1500. The third party service may have the same general functionality as the third party service for which permissions are requested in the example of FIG. 14. However, the permission requests shown in FIG. 15 are broader, as reflected by the higher privacy impact ratings. The use of ratings like this allows consumers to compare services in terms of their privacy impact, which helps encourage the use of low-impact access requests by providing a competitive advantage to services with lesser privacy impact, all other things being equal.

It is not just data originators, but also application writers, that can understand the world in terms of conceptual quantities (e.g., the location or activity of a person; a pseudonym; or an indicator of danger) as opposed to raw data. Therefore, a shift towards conceptual quantifications of data using illustrative embodiments disclosed herein is likely to aid the development of third party services, as opposed to hold it back. The obvious exception to this are processes that use machine learning, applied to vast data quantities, to understand the world. A development of conceptual predicates limits the need for such processing among third parties, and in fact shifts the need for machine learning methods to the party computing the predicates. Therefore, the methods may not change, but the exposure of the data does: instead of anybody needing access to sensitive data, mostly only the initial data processor—the trusted party—does.

In some embodiments, third parties can still request access to raw data; however, this might be looked upon with skepticism by data originators.

To the extent that the trusted party does not offer suitable predicates, this opens up opportunities among third party developers, given appropriate support for third party computation of predicates. These third party predicates—like any other predicates—would be available to service providers for a fee. Illustrative embodiments can utilize a variety of different trust models and techniques for third party predicate generation.

In some embodiments, purpose-based permissions as used. Loosely speaking, this corresponds to end users understanding why the third party needs access to the data. This may be best described using an example; while it is likely to be clear to users why the third party permission request 1400 in FIG. 14 includes the individual requests (such as "data indicating intrusion"), it may not be equally evident why the third party permission request 1500 in FIG. 15 includes a request for the user's cell phone id and location. Although this information can be useful to the third party application, for example, to determine whether a person entering is a legitimate resident, this connection may not be very clear to the user. Thus, the permission requests in FIG. 14 are more purpose-based than those in FIG. 15. The notion of purpose-based is not the same as conceptual, but rather, describes the apparent alignment between the request and the stated purpose of the application.

A conditional permission is one that only results in access (whether to data or control) if some event takes place, where this event is determinable by the trusted party. FIG. 14 shows two conditional permissions—one to a predicate ("Full microphone access, if risk is detected"), another to a control capability ("Control of speakers, lights if risk detected"). Conditional permissions have a lower privacy impact than permissions that are not conditional, and are therefore preferable to end users.

Permissions are differentiable if they allow a user to compare two sets of permission requests in terms of their privacy impact. Including privacy impact ratings, as shown in the examples of FIGS. 14 and 15, makes the associated permissions differentiable. While these two figures illustrate the concept, alternative techniques can be used to provide permission request differentiation, such as, for example, combining the multiple permission requests to form a combined privacy impact score.

We note that the decision between two or more applications is not limited to a comparison of privacy impacts alone, but can additionally or alternatively include other relevant factors, such as price, functionality and familiarity. Nevertheless, allowing a comparison with respect to privacy, in the manner described in conjunction with illustrative embodiments herein, will help consumers make educated decisions, whatever priorities they have.

In the examples above, we described the use of differentiable permissions as a method of enabling comparisons between competing services. The associated privacy impact ratings can be generated by an expert panel, e.g., involving representatives of the trusted system, privacy researchers and consumer representatives, or using any of a wide variety of other techniques. For example, another approach, which is particularly useful to bootstrap the system, is to simply rely on consumer assessments.

Figure 16:
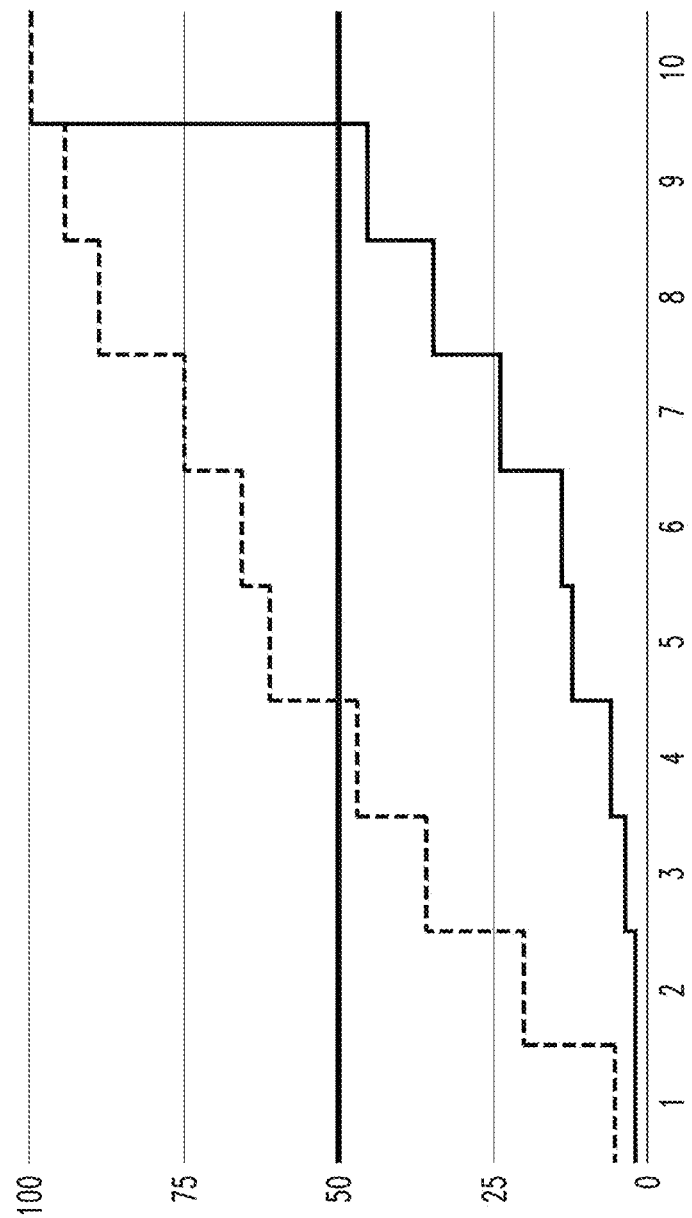
FIGS. 16 and 17 are plots illustrating different privacy impacts for different types of derived data disclosure in illustrative embodiments.
Figure 17:
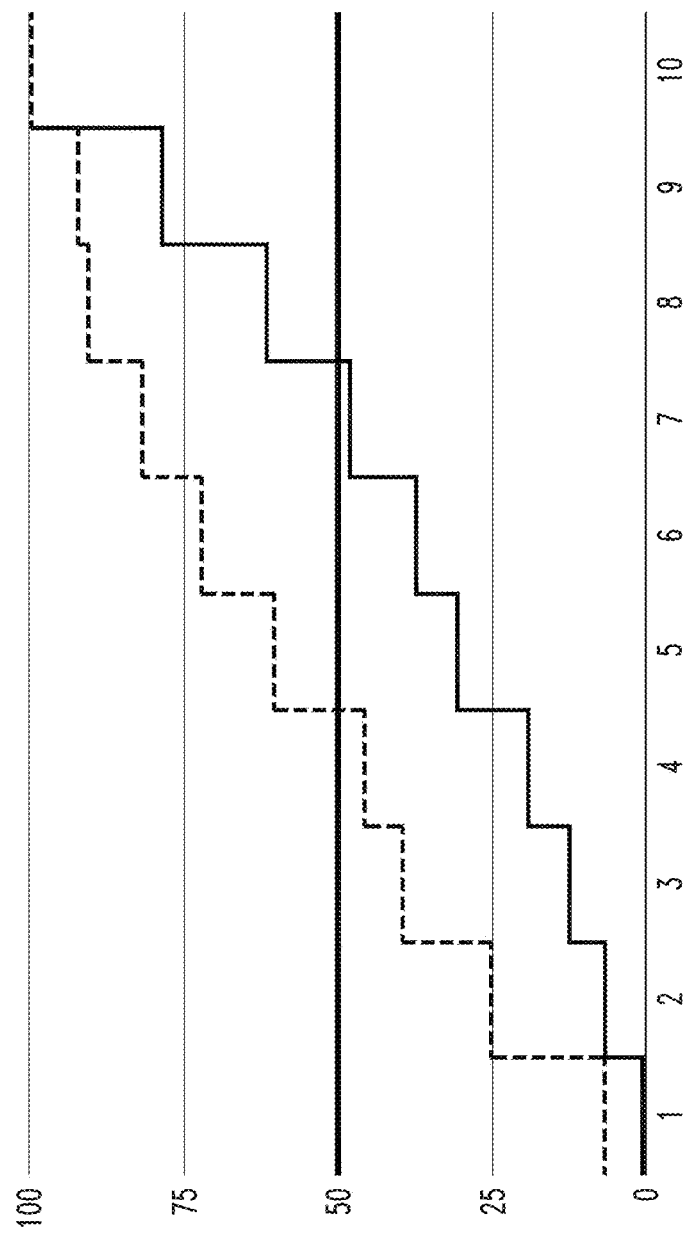

With reference now to FIGS. 16 and 17, we illustrate the feasibility of this latter approach by describing the results of one small survey, involving 177 Amazon MTurk workers, all of which are residents of the U.S. In the survey, respondents were asked to rate the privacy impact of five different data uses. The vertical axes in FIGS. 16 and 17 denote percentage of respondents, and the horizontal axes denote privacy impact.

FIG. 16 shows the cumulative distributions for two related questions related to hypothetical permissions needed by Alexa, where subjects rated the privacy impact (from least at 1 and greatest at 10). The dashed graph corresponds to Alexa's actual design, wherein voice data is transmitted to Amazon only after a wakeup command ("Alexa") is given; the median privacy impact assessment is 5. The solid graph corresponds to an example design in which all microphone data is transmitted and interpreted; the corresponding median privacy impact is 10.

More particularly, FIG. 16 illustrates the sensitivity of microphone data; in the corresponding questions, survey takers were asked two questions relating to the design—and a hypothetical design—of Alexa. In one design, all microphone data is transmitted to a central authority (Amazon), and in another, only microphone data after a detected wake-up command is transmitted. The survey takers very clearly identified the former as having a significant undesirable privacy impact (10 out of 10), whereas the approach in which voice data is only conditionally transmitted had a perceived privacy impact of only 5 out of 10. Both of these measurements correspond to the median assessment of the respondents.

FIG. 17 shows the cumulative distributions for two questions related to a hypothetical service that turns off the A/C in a home when everybody has left. The dashed graph corresponds to an application that uses local motion sensors to determine when to turn off the A/C; this corresponds to a median privacy impact of 5 out of 10. The solid graph corresponds to an alternative implementation in which the locations of users are instead determined using the GPS coordinates of their cell phones. This is (correctly) seen as being more intrusive, with a median privacy impact of 8.

Accordingly, FIG. 17 quantifies the sensitivity of location data, by illustrating the impact on privacy of determining presence in a home either using motion detectors (dashed graph with privacy impact of 5 out of 10) or using GPS (solid graph with privacy impact of 8 out of 10).

The embodiments of FIGS. 16 and 17 involve determining the perceived privacy impact of a collection of predicates, in example contexts that make sense from purpose-based perspectives. It should be noted that the severity of perceived threats do not necessarily correspond to the actual severity of these threats since people typically exaggerate the risk of spectacular threats in comparison to more mundane threats.

In these and other embodiments, the sharing of predicates instead of raw data limits the exposure of potentially sensitive data by aggregating large quantities of data into less revealing predicates. Additionally, by tailoring the types of information that is shared enables the trusted system to control the types of inferences third parties can make based on end-user data, which limits the amount of trust that has to be placed into these third parties. Moreover, by connecting the predicates to permissions, end users can review the exact disclosures made before agreeing to these. This enables the end user to be responsible for her actions, and by doing that, helps reduce concerns of potential abuse.

Conceptual permissions help end users understand and evaluate permissions requests. Instead of having to blindly trust third parties, or having to understand the technical consequences of the shared data, conceptual permissions—and their associated predicates—help the end users understand the consequences of data sharing. Conceptual permissions make it possible for a typical user to understand the impact of disclosing the corresponding type of information.

Purpose-based permissions help users understand whether a set of permissions is reasonable in the context of the stated use of the data. For example, a typical user would understand that a service provider offering users who are looking for each other have a good reason to require GPS data of users, but another service provider whose goal it is to help turn off the lights in empty rooms would not likely be understood to need such information. Therefore, by making sure that the conceptual permissions align with the expected functionality of a service, concerned users are given the opportunity to assure themselves that requests are reasonable. In other words, purpose-based permissions make it possible for a typical user to evaluate whether it is reasonable to disclose the corresponding type of information.

Conditional permissions, where the release of data would be triggered by an event detected by the trusted system, permit a reduction of exposure. Conditional releases exist today in the context of releases from edge computing environments to central processing environments, enabling voice data to be released only after a wake-up command is detected. Extending this notion to releases to third parties and to access to control capabilities, as described herein, will help further improve privacy assurances.

The use of differentiable permissions will allow end users to compare two or more related service offerings with respect to their privacy impact. Such arrangements enable educated decisions among end users—even more so than the use of conceptual permissions, in fact—and in so doing, help create competition in terms of privacy. Once users can understand the privacy impacts of their choices—and compare their options to each other—this will fuel efforts to limit the exposure of end-user data in order to earn the business of the newly enabled users.

Additional illustrative embodiments will now be described in further detail with reference to FIGS. 18 through 20. These embodiments are illustratively configured to implement various aspects of privacy enhancement using derived data disclosure as described elsewhere herein, and can also implement additional complementary functionality, such as, for example, third party application enablement as described in the above-cited U.S. patent application Ser. No. 16/676,978.

Figure 18:
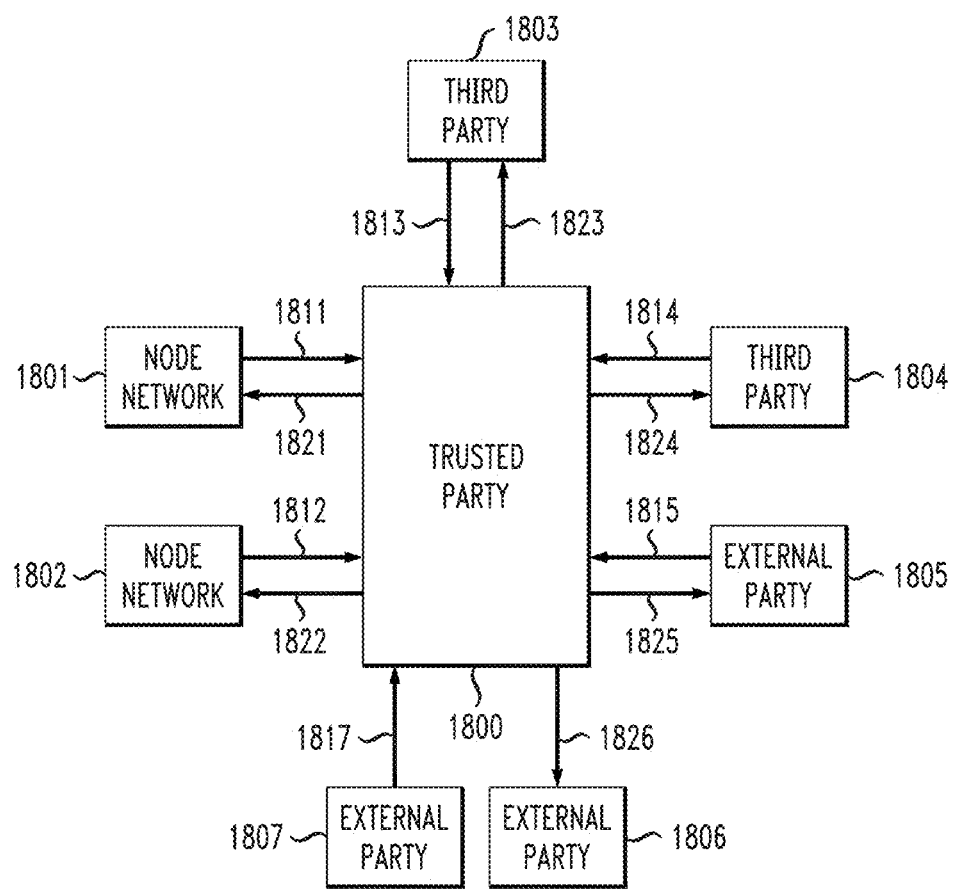
FIG. 18 is a block diagram of an information processing system that implements functionality for privacy enhancement using derived data disclosure to third party service providers in an illustrative embodiment.

FIG. 18 shows an example information processing system in an illustrative embodiment. A trusted party 1800 receives data from node network 1801, node network 1802, third party 1803, third party 1804, external party 1805 and external party 1807. The data transmitted in 1811 from node network 1801 and the data transmitted in 1812 from node network 1802 comprises sensor data and data derived from sensor data. In addition, users associated with node network 1801 and node network 1802 can provide the trusted party 1800 with configuration data and additional data (not shown). Trusted party 1800 also receives data 1813 from third party 1803, data 1814 from third party 1804, data 1815 from external party 1805, and data 1817 from external party 1807, and generates, from this received data, combined data (not shown), whether by combining data of the various sources, deriving new data based on the data from the various sources, or both.

The combined data, or at least part of it, is transmitted in 1823 to third party 1803, in 1824 to third party 1804, in 1825 to external party 1805, and in 1826 to external party 1806.

In addition, the combined data, or at least part of it, is sent in the form of control data 1821 to node network 1801 and control data 1822 to node network 1802. Here, control data 1821 and 1822 configures node network 1801 and node network 1802. At least some of the data 1813 transmitted by third party 1803 is transmitted 1824 to third party 1804. A third party is primarily a source of processing of data, but may also contribute data it obtains from sources other than the trusted party 1800. An external party such as external party 1807 is primarily a source of sensor data or related data, or (as external party 1806) a recipient of control data 1826 used to configure a system associated with external party 1806, but both a recipient of control data 1825 and source of sensor data 1815 as in the example of external party 1805. External parties also optionally perform some processing, but are primarily used as sources or destinations of data.

Node networks 1801 and 1802 are typically under the full control of the trusted party 1800, which may, for example, update firmware associated with individual nodes of node network 1801 and node network 1802. External parties 1805, 1806 and 1807 are typically not under the full control of trusted party 1800, although in some embodiments, trusted party 1800 is provided with access rights to fully control such external parties. Third party 1803 illustratively comprises one or more software processes running on a platform controlled by trusted party 1800, where such a platform could, in one example, be a cloud platform, and in another, a processing environment on the same premises as the processing environment of trusted party 1800. On the other hand, third party 1804 illustratively comprises one or more software processes that are not running on a platform controlled by the trusted party 1800 or on the same premises as the process associated with trusted party 1800. Thus, the messaging corresponding to flows 1813 and 1823 are performed by passing data using APIs, using buffers, or using messaging within one computer system, whereas the flows 1814 and 1824 correspond to transmissions of data over a network, such as the Internet, from one processing environment to another. The external parties correspond at least in part to a physical system that is associated with an installation of sensors or output devices, such as loudspeakers, screens, or actuators.

Figure 19:
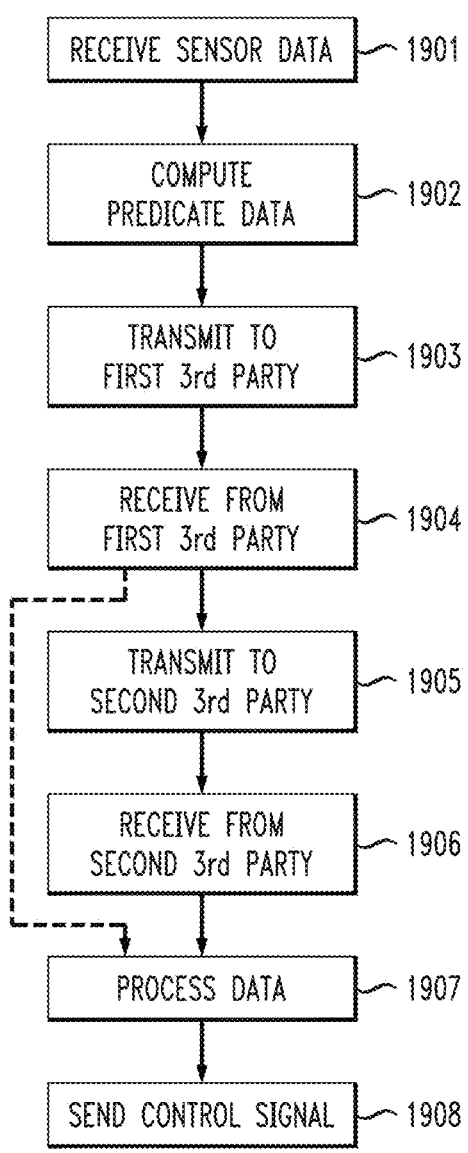
FIG. 19 is a flow diagram of a process for privacy enhancement using derived data disclosure to third party service providers in an illustrative embodiment.

FIG. 19 shows an example processing flow from the perspective of the trusted party 1800. In step 1901, the trusted party 1800 receives sensor data from node network 1801, where the sensor data comprises at least one of raw data from at least one node of the associated node network and a function of raw data from at least one node of the associated node network. Example raw sensor data comprises motion sensor data. An example of a function of raw data is an FFT of microphone data from a selected time period. In step 1902, trusted party 1800 optionally computes a predicate related to the sensor data received in step 1901. An example predicate is that a user associated with the node network 1801 is in the kitchen, and another example predicate is that a user associated with the node network often listens to jazz music at a loud volume.

In step 1903, trusted party 1800 transmits at least some of the sensor data received in step 1901 and some of the predicate data computed in step 1902 to a first third party, which may be either third party 1803 or third party 1804. In step 1904, the trusted party 1800 receives data from the first third party 1803 or 1804. In optional step 1905, trusted party 1800 transmits data to a second third party, where said data comprises at least in part sensor data received in step 1901, predicate data computed in step 1902, and data from first third party received in 1904. In step 1906, trusted party 1800 receives data from second third party, assuming optional step 1905 was performed. The dashed line in the figure indicates that steps 1905 and 1906 may be bypassed, with the flow instead proceeding from step 1904 into step 1907 as indicated.

In step 1907, trusted party 1800 processes data, where said processed data comprises sensor data received in step 1901, predicate data computed in step 1902, data received from first third party in step 1904, and optional data received from second third party in step 1906 if steps 1905 and 1906 are not bypassed. The result of the processing is illustratively the generation of at least one control signal. In addition, the trusted party 1800 optionally stores at least some of the processed data, for example, in a database or other repository. In step 1908, trusted party 1800 sends the generated control signal to node network 1801.

The particular processing operations shown in the diagrams of FIGS. 18 and 19 above are presented by way of example only, and should not be construed as limiting in any way. For example, the ordering of the steps in FIG. 19 can be varied, and additional or alternative steps can be used in place of the particular steps shown. It is also possible that certain steps can be performed at least in part concurrently with one another instead of in the particular order illustrated in the flow diagrams.

Figure 20:
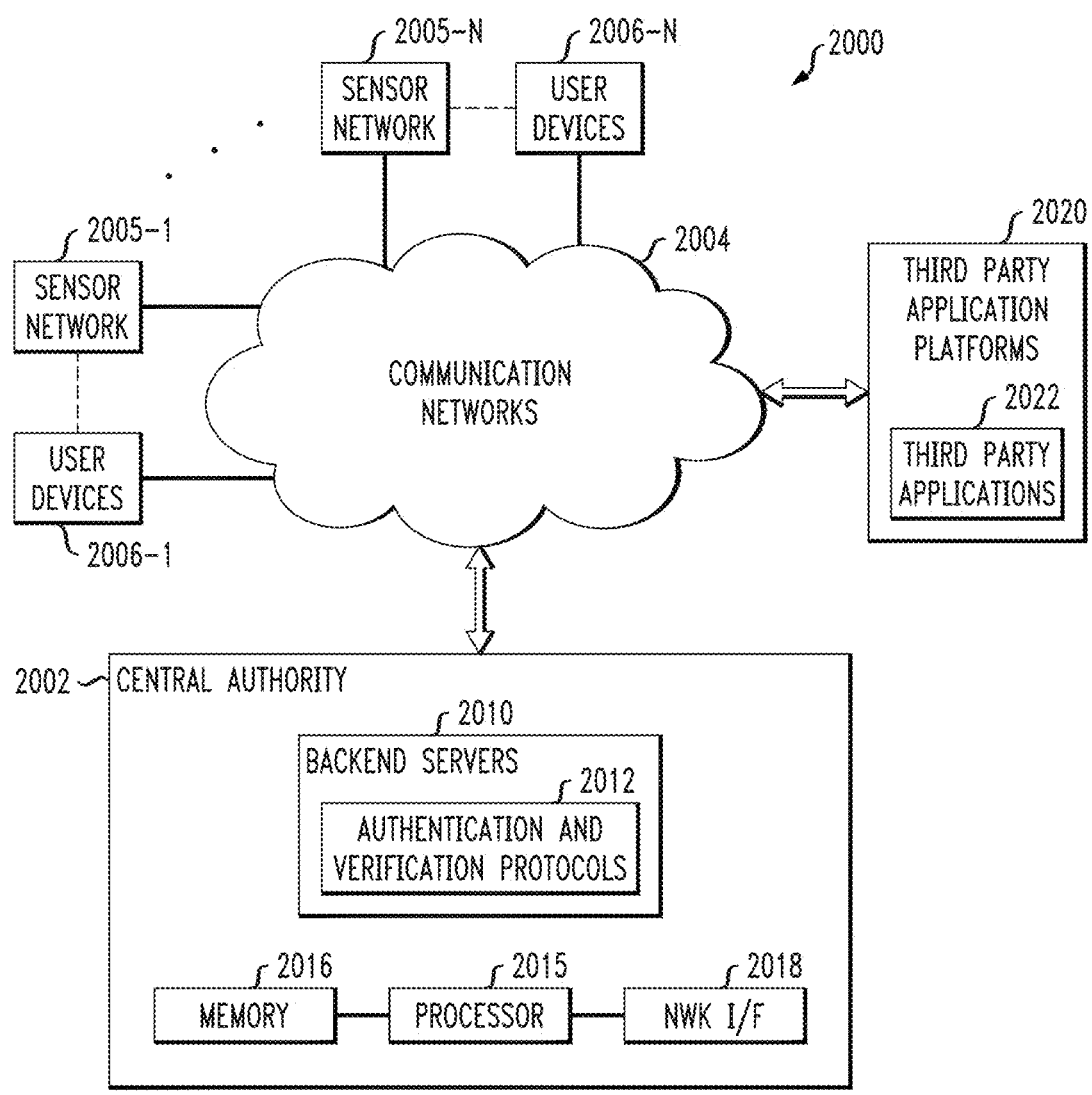
FIG. 20 is a block diagram of another information processing system that implements functionality for privacy enhancement using derived data disclosure to third party service providers in an illustrative embodiment.

Referring now to FIG. 20, an example information processing system 2000 of an illustrative embodiment is shown. The system 2000 in this embodiment is configured with functionality for privacy enhancement using derived data disclosure to third party service providers. For example, the system 2000 is illustratively configured to execute processes of the type previously described in conjunction with FIGS. 18 and 19. At least some of the smart nodes illustratively comprise respective sensor devices of one or more sensor networks, although additional or alternative types of smart nodes can be used in other embodiments. A given such smart node in some instances includes a limited user interface, but other types of smart nodes can include more complex user interfaces.

The system 2000 in the present embodiment more particularly comprises a central authority 2002 coupled via one or more communication networks 2004 to a plurality of distinct sensor networks 2005-1, . . . 2005-N. Each such sensor network is assumed to comprise a set of sensor devices of the type described elsewhere herein. A given set of sensor devices is also referred to herein as a "collection" of sensor devices. The sensor networks 2005-1, . . . 2005-N interact with respective sets of user devices 2006-1, . . . 2006-N. The sets of user devices 2006 are not necessarily disjoint, as some of the user devices can interact with multiple ones of the sensor networks 2005. The user devices 2006 can comprise, for example, desktop, laptop or tablet computers, mobile telephones, smart watches, gaming systems or other types of devices associated with one or more system users and capable of communicating with central authority 2002 over the one or more communication networks 2004.

Some of the user devices 2006 comprise respective instances of what are generally referred to herein as "mobile devices" and those can include, for example, laptop or tablet computers, mobile telephones or smartphones, smart watches, etc. Other types of mobile devices can be used in other embodiments, and the term "mobile device" as used herein is therefore intended to be broadly construed.

The dashed lines between the user devices 2006 and the sensor networks 2005 are intended to encompass a wide variety of different types of interaction that can be supported in a given implementation. Such interactions are not limited to machine-to-machine communications using wired or wireless communication protocols, but more generally encompass visual, aural, haptic and/or other types of interaction. For example, a sensor device can present an image to a user via a display, and/or play an audio file to a user via a speaker, in conjunction with the implementation of one or more processes relating to privacy enhancement involving third party service providers as described elsewhere herein.

The central authority 2002 illustratively comprises a processing platform that includes one or more processing devices. For example, the central authority 2002 can be implemented as one or more computers, servers or other backend devices that are configured to interact with the sensor networks 2005 and the user devices 2006. In other embodiments, multiple separate central authorities can be provided, each having responsibility for configuration and management of a different subset of the sensor networks 2005. The central authority 2002 can include additional or alternative components, such as, for example, a database or other repository of the type referred to elsewhere herein. The term "central authority" as used herein is intended to be broadly construed, so as to encompass a computer, server or backend device coupled to a network, and should not be viewed as requiring any particular geographical relationship relative to the particular sensor networks 2005 for which it is responsible. It is illustratively referred to as "central" in this embodiment in that it provides a common control point for configuration and management of the sensor networks 2005.

Similarly, the term "backend server" as used herein is intended to be broadly construed, so as to encompass a server that is reachable over a network connection from a user device, and performs various backend-type functions relating configuration and management of nodes of one or more of the sensor networks 2005, such as performing authentication and verification protocols 2012 in conjunction with establishing associations between particular sensor devices or other types of nodes and a user account.

The "user" associated with a particular user account may be an individual human being, such as a homeowner, tenant or installer, but the term "user" should be understood to include other types of entities, including by way of example, hardware and/or software entities, such as robots and other automated entities configured with machine learning functionality or other forms of artificial intelligence. A given such user illustratively has at least one communication address (e.g., IP address, email address, mobile telephone number, etc.) or other contact information recorded with the central authority 2002 in association with the user account. Such a user may but need not have previously gone through a registration process with the central authority 2002. Instead, by way of example, contact information for that user may have been provided by another user that has gone through a registration process. Other techniques can be used to register users as that term is broadly used herein.

One or more of the sensor networks 2005 may each comprise a plurality of sensor devices deployed within an interior space and/or an exterior space of building or other structure associated with a residence or business. Such sensor devices are considered examples of what are more generally referred to herein as "nodes" of a set of nodes. The "nodes" as that term is broadly used herein can include smart nodes with limited user interfaces, smart nodes with more complex user interfaces, smart nodes with no user interfaces, and other types of nodes, as well as various combinations thereof. Numerous other arrangements are possible.

As indicated previously, illustrative embodiments advantageously provide enhanced privacy in these and other situations involving third party service providers. It is to be appreciated, however, that other types of sensor systems, and more generally other sets of nodes, can be utilized in other embodiments. Accordingly, embodiments disclosed herein should not be viewed as being limited in any way to use with particular types of sensor systems.

The central authority 2002 in the present embodiment comprises a plurality of backend servers 2010 that implement protocols 2012 for authentication, verification and other security-related functions within the system 2000. For example, the protocols 2012 include one or more authentication and/or verification protocols carried out in conjunction with privacy enhancement using derived data disclosure as described herein.

The backend servers 2010 and their associated protocols 2012 of the central authority 2002 are illustratively implemented at least in part in the form of software running on one or more processing devices, each of which includes a processor 2015 coupled to a memory 2016 and a network interface ("Nwk I/F") 2018. Example implementations of such components are described in more detail below.

The system 2000 further comprises third party application platforms 2020 coupled to the one or more communication networks 2004. Each such third party application platform comprises one or more third party applications 2022. Although shown as separate from the central authority 2002 in the figure, at least a subset of the third party application platforms 2020 and their respective third party applications 2022 may be encompassed by the central authority 2002. For example, such platforms and applications can be provided in some embodiments using a subset of the backend servers 2010 of the central authority 2002. Moreover, at least portions of one or more of the third party applications 2022 can execute at least in part on one of the user devices 2006, or on other system processing devices.

As indicated previously, terms such as "third party application" and "app" as used herein are intended to be broadly construed, and in some embodiments can include, for example, an application that includes multiple distinct software components operating on different processing devices or processing platforms.

A given one of the third party applications 2022 can comprise, for example, one or more software programs of a third party service provider. Such a third party application illustratively executes in a trusted processing environment that is under the control of a trusted party such as central authority 2002. Accordingly, one or more of the third party application platforms 2020 may be under the control of the central authority 2002, although such third party application platforms are shown as separate from the central authority 2002 in the figure. It is also possible that a third party application may execute in a non-trusted processing environment that is not under the control of the trusted party. Thus, one or more of the third party application platforms 2020 may not be under the control of the central authority 2002. Various combinations of trusted and non-trusted processing environments may be used to implement different ones of the third party application platforms 2020 in illustrative embodiments.

In operation, at least one processing device of the system 2000, such as a processing device that implements a given one of the backend servers 2010 of the central authority 2002, is configured to receive sensor data from one or more sensor devices of at least one of the sensor networks 2005. As indicated previously, such sensor devices are examples of what are more generally referred to herein as "nodes" and the corresponding sensor networks are examples of what are more generally referred to herein as "node networks." It is therefore to be appreciated that other types of nodes and node networks can be used in other embodiments.

The above-noted processing device is further configured to compute predicate data based at least in part on the received sensor data, to transmit at least a portion of the received sensor data and the computed predicate data to one of the third party applications 2022, to receive additional data from the third party application 2022 responsive to the transmitted portion of the received sensor data and the computed predicate data, to generate a control signal based at least in part on the received sensor data, the computed predicate data, and the received additional data from the third party application, and to transmit the control signal to at least one of the sensor networks 2005, such as to one of the sensor devices of the sensor network or to another type of node of another type of node network of the system 2000. It is also possible that a control signal may additionally or alternatively be transmitted to one of the user devices 2006.

A given "control signal" as the term is broadly used herein can comprise, for example, one or more commands, such as, for example, a single command directed to a particular node, multiple commands directed to a particular node, or different sets of one or more commands directed to respective nodes, in one or more node networks.

In some embodiments, the central authority 2002 comprises or is otherwise associated with a trusted party responsible for configuration and management of one or more of the sensor networks 2005 or other node networks of the system 2000. The above-noted processing device illustratively implements at least a portion of the central authority 2002, such as one or more of the backend servers 2010. Multiple processing devices can also be used, in place of a single processing device.

Such a processing device or set of processing devices in computing predicate data based at least in part on the received sensor data illustratively computes the predicate data in accordance with one or more user-specified policies relating to access by the third party application to information including or derived from the sensor data. Examples of such policies are provided elsewhere herein. The computed predicate data illustratively comprises only information that a user has permitted the third party application to access.

Additionally or alternatively, computing predicate data based at least in part on the received sensor data illustratively comprises associating the computed predicate data with a pseudonym that prevents the third party application from determining an identifier of a source of the corresponding sensor data.

The computation of the predicate data in some embodiments further involves computing the predicate data in accordance with one or more compliance policies, such as policies designed to protect PII of system users. These include data privacy policies such as the General Data Protection Regulation (GDPR) of the European Union, as well as a wide variety of other types of governmental policies.

In some embodiments, computing predicate data based at least in part on the received sensor data more particularly comprises computing, from received sensor data that includes one or more explicit identifiers, anonymized predicate data that does not include the one or more explicit identifiers. The anonymized predicate data in such embodiments may be indicative of at least one of an activity associated with a user within an area in which the sensor data was collected, and a classification of the user within the area.

As noted above, the central authority 2002 in some embodiments implements a trusted processing environment comprising one or more of the third party application platforms 2020 configured to execute one or more of the third party applications 2022. A given such trusted processing environment is illustratively configured to obtain sensitive data, and to allow third party applications created by third party service providers to execute in the trusted processing environment. Inputs are illustratively provided to the third party applications in the form of predicates of the type described herein, with the predicates being computed as functions of the sensitive data, and with the predicates illustratively corresponding to information for which the user has expressly granted access to the third party service provider.

A trusted processing environment in some embodiments is additionally or alternatively configured to enforce best practices and industry standards, such as making sure that the computation meets government compliance.

As a more particular example, a trusted processing environment provided by a trusted party such as central authority 2002 in illustrative embodiments herein can be implemented in the form of a scalable cloud environment utilizing virtual machines that can access specified APIs according to their approved permissions. For example, the trusted party may be configured to define the APIs, to determine what virtual machines to create and what third party application software to run in them, and to control how the virtual machines access data and send information to outside entities. The trusted party can run multiple instances of a virtual machine with the same content, and provide it with different inputs, some of which may not be real sensor data, but are instead synthetically generated for testing of the system. The trusted party can also determine whether the third party application software running in a given instance of the virtual machine complies with a set of rules.

In some embodiments, the third party applications can execute in whole or in part outside of a trusted processing environment. For non-trusted processing environments of this type, the predicates are illustratively associated with a pseudonym that may change over time. The third party service provider does not know the mapping from the pseudonym to an identifier of the source of the sensitive data.

Again, the particular features and other advantages described above are examples presented in the context of illustrative embodiments, and therefore such features and advantages need not be present in other embodiments. Such features and advantages of illustrative embodiments should not be viewed as limiting in any way.

As indicated previously, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

In addition, as noted above, references herein to particular features or other aspects as being "optional" refer to utilization in one or more particular embodiments, and should not be construed as an indication that any other features or aspects, such as features or aspects not explicitly referred to as optional, are required in any particular embodiments.

The above-described systems and other processing entities described herein may be part of an information processing system. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure.

Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative privacy enhancement related processing contexts. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
   at least one processing device comprising a processor coupled to a memory;
   said at least one processing device being configured:
   to determine a representation characterizing data from one or more sensor devices of at least one sensor network;
   to determine a privacy impact indicator for the data;
   to provide the representation and its associated privacy impact indicator for presentation in a user interface of a user device; and
   to control access to information relating to at least portions of the data by one or more third party service providers based at least in part on user permission feedback relating to the representation and its associated privacy impact indicator as presented in the user interface of the user device.

2. The apparatus of claim 1 wherein said at least one processing device implements at least one node of a plurality of interconnected nodes coupled to at least one of the one or more sensor networks.

3. The apparatus of claim 1 wherein said at least one processing device implements at least one pre-processor coupled between at least one of the one or more sensor networks and one or more servers of the one or more third party service providers.

4. The apparatus of claim 1 wherein determining a representation characterizing data from one or more sensor devices of at least one sensor network comprises:
   receiving data generated by one or more of the sensor devices;
   computing one or more predicates based at least in part on the received data; and
   determining the representation based at least in part on the one or more computed predicates.

5. The apparatus of claim 4 wherein computing one or more predicates comprises computing at least one first-order predicate comprising information indicative of at least one of presence, layout and activity within an area that includes at least a subset of the sensor devices of said at least one sensor network.

6. The apparatus of claim 5 wherein computing one or more predicates comprises computing at least one second-order predicate based at least in part on at least one of the one or more first-order predicates.

7. The apparatus of claim 1 wherein the representation comprises information specifying a particular visual icon for presentation in the user interface of the user device wherein the visual icon conveys information regarding a type of data from the one or more sensors without identifying the data itself.

8. The apparatus of claim 7 wherein the representation further comprises a description of a service provided by a given one of the third party service providers and wherein the given third party service provider requires access to information relating to one or more particular portions of the data in order to provide the service.

9. The apparatus of claim 1 wherein providing the representation and its associated privacy impact indicator for presentation in a user interface of a user device comprises transmitting to the user device information sufficient to allow the user device to obtain in a browser of the user interface at least one window that includes the representation and its associated privacy impact indicator.

10. The apparatus of claim 1 wherein the privacy impact indicator identifies a particular level of privacy associated with the data and wherein the particular level is selected from a scale ranging from a relatively low level of privacy to a relatively high level of privacy.

11. The apparatus of claim 1 wherein determining the representation, determining a privacy impact indicator for the data, and providing the representation and its associated privacy impact indicator further comprises:

determining a first representation characterizing data of a first type from one or more sensor devices of said at least one sensor network;

determining a second representation characterizing data of a second type from one or more sensor devices of said at least one sensor network;

determining a first privacy impact indicator for the data of the first type;

determining a second privacy impact indicator different than the first privacy impact indicator for the data of the second type; and providing the first and second representations and their respective associated first and second privacy impact indicators for juxtaposed presentation in the user interface of the user device.

12. The apparatus of claim 1 wherein controlling access to information relating to at least portions of the data by one or more third party service providers based at least in part on user permission feedback comprises:

receiving data generated by one or more of the sensor devices;

computing one or more predicates based at least in part on the received data; and providing a given one of the third party service providers with access to at least one of the one or more predicates in a manner consistent with the user permission feedback.

13. The apparatus of claim 1 wherein controlling access to information relating to at least portions of the data by one or more third party service providers based at least in part on user permission feedback comprises:

receiving data generated by one or more of the sensor devices;

applying at least one function to the received data to generate derived data; and disclosing at least portions of the derived data to a given one of the third party service providers in a manner consistent with the user permission feedback.

14. The apparatus of claim 1 wherein said at least one function applied to the received data to generate the derived data comprises at least one of:

an obfuscation function configured to obfuscate at least a portion of the received data from at least one of the sensor devices; and a combination function configured to combine at least a portion of the received data from one of the sensor devices with one or more other portions of the received data from one or more other ones of the sensor devices.

15. A method comprising:

determining a representation characterizing data from one or more sensor devices of at least one sensor network;

determining a privacy impact indicator for the data;

providing the representation and its associated privacy impact indicator for presentation in a user interface of a user device; and controlling access to information relating to at least portions of the data by one or more third party service providers based at least in part on user permission feedback relating to the representation and its associated privacy impact indicator as presented in the user interface of the user device;

wherein the method is performed by at least one processing device comprising a processor coupled to a memory.

16. The method of claim 15 wherein determining the representation, determining a privacy impact indicator for the data, and providing the representation and its associated privacy impact indicator further comprises:

determining a first representation characterizing data of a first type from one or more sensor devices of said at least one sensor network;

determining a second representation characterizing data of a second type from one or more sensor devices of said at least one sensor network;

determining a first privacy impact indicator for the data of the first type;

determining a second privacy impact indicator different than the first privacy impact indicator for the data of the second type; and providing the first and second representations and their respective associated first and second privacy impact indicators for juxtaposed presentation in the user interface of the user device.

17. The method of claim 15 wherein controlling access to information relating to at least portions of the data by one or more third party service providers based at least in part on user permission feedback comprises:

receiving data generated by one or more of the sensor devices;

applying at least one function to the received data to generate derived data; and disclosing at least portions of the derived data to a given one of the third party service providers in a manner consistent with the user permission feedback.

18. A computer program product comprising a non-transitory processor-readable storage medium having stored therein program code of one or more software programs, wherein the program code when executed by at least one processing device causes said at least one processing device:

to determine a representation characterizing data from one or more sensor devices of at least one sensor network;

to determine a privacy impact indicator for the data;

to provide the representation and its associated privacy impact indicator for presentation in a user interface of a user device; and to control access to information relating to at least portions of the data by one or more third party service providers based at least in part on user permission feedback relating to the representation and its associated privacy impact indicator as presented in the user interface of the user device.

19. The computer program product of claim 18 wherein determining the representation, determining a privacy impact indicator for the data, and providing the representation and its associated privacy impact indicator further comprises:

determining a first representation characterizing data of a first type from one or more sensor devices of said at least one sensor network;

determining a second representation characterizing data of a second type from one or more sensor devices of said at least one sensor network;

determining a first privacy impact indicator for the data of the first type;

determining a second privacy impact indicator different than the first privacy impact indicator for the data of the second type; and providing the first and second representations and their respective associated first and second privacy impact indicators for juxtaposed presentation in the user interface of the user device.

20. The computer program product of claim 18 wherein controlling access information relating to at least portions of the data by one or more third party service providers based at least in part on user permission feedback comprises:
  receiving data generated by one or more of the sensor devices;
  applying at least one function to the received data to generate derived data; and
  disclosing at least portions of the derived data to a given one of the third party service providers in a manner consistent with the user permission feedback.

* * * * *